US007627570B2

(12) United States Patent
Bosloy et al.

(10) Patent No.: US 7,627,570 B2
(45) Date of Patent: Dec. 1, 2009

(54) HIGHLY SCALABLE SUBSCRIPTION MATCHING FOR A CONTENT ROUTING NETWORK

(75) Inventors: Jonathan Bosloy, Kanata (CA); Charles Mitchell, Nepean (CA); Edward Funnekotter, Ottawa (CA); Jason Whelan, Ottawa (CA)

(73) Assignee: Solace Systems, Inc., Ottawa, ON (CA)

( * ) Notice: Subject to any disclaimer, the term of this patent is extended or adjusted under 35 U.S.C. 154(b) by 281 days.

(21) Appl. No.: 11/224,045

(22) Filed: Sep. 13, 2005

(65) Prior Publication Data

US 2006/0059165 A1 Mar. 16, 2006

Related U.S. Application Data

(60) Provisional application No. 60/608,864, filed on Sep. 13, 2004.

(51) Int. Cl.
*G06F 17/30* (2006.01)
(52) U.S. Cl. .................... 707/6; 707/101; 707/104.1
(58) Field of Classification Search ............... 707/6, 707/104.1
See application file for complete search history.

(56) References Cited

U.S. PATENT DOCUMENTS

| 5,778,371 | A  | * | 7/1998 | Fujihara ............... 707/100 |
| 5,829,025 | A  | * | 10/1998 | Mittal ................. 711/122 |
| 5,881,278 | A  | * | 3/1999 | Tran et al. ............ 712/242 |
| 6,189,068 | B1 | * | 2/2001 | Witt et al. ............ 711/3 |
| 6,243,760 | B1 | * | 6/2001 | Armbruster et al. .... 707/E17.12 |
| 6,504,819 | B2 | * | 1/2003 | Fowler et al. ......... 370/230 |
| 6,560,681 | B1 | * | 5/2003 | Wilson et al. .......... 711/144 |
| 6,606,625 | B1 | * | 8/2003 | Muslea et al. .......... 707/6 |
| 6,728,753 | B1 | * | 4/2004 | Parasnis et al. ........ 709/203 |
| 6,785,228 | B1 | * | 8/2004 | Vandette et al. ........ 370/230 |
| 6,810,526 | B1 | * | 10/2004 | Menard et al. ......... 725/46 |
| 7,103,181 | B2 | * | 9/2006 | Ananth ................ 380/37 |
| 7,200,110 | B1 | * | 4/2007 | Burns et al. ........... 370/225 |
| 2001/0018697 | A1 | * | 8/2001 | Kunitake et al. ........ 707/517 |
| 2002/0004820 | A1 | * | 1/2002 | Baldwin et al. ........ 709/206 |

(Continued)

FOREIGN PATENT DOCUMENTS

WO WO 03/39105 8/2003

OTHER PUBLICATIONS

Hauswirth, et al., "A component and communication model for push systems", Proceedings of the 7th European software engineering conference held jointly with the 7th ACM SIGSOFT international symposium on Foundations of software engineering, Dec. 1999, ACM Press, p. 20-38.*

(Continued)

*Primary Examiner*—Khanh B Pham
(74) *Attorney, Agent, or Firm*—Marks & Clerk; Richard J. Mitchell

(57) ABSTRACT

A method of matching subscriptions to published documents in a content-routed network involves receiving subscription information, receiving published documents, storing the subscription information and the published documents in memory, instructing an accelerator of the locations in memory of the published documents, transferring portions of the stored published documents from the memory to the accelerator on an as-needed basis, providing the subscription information to the accelerator, and processing the portions in the accelerator to perform subscription matching in the accelerator independently of other functions in the content-router. The accelerator preferably includes a pipeline. In this way, efficiently highly scalable subscription matching can be performed efficiently on a very large number of subscriptions.

40 Claims, 16 Drawing Sheets

U.S. PATENT DOCUMENTS

| | | | |
|---|---|---|---|
| 2002/0056100 | A1* | 5/2002 | Shimomura et al. ............ 725/39 |
| 2002/0059224 | A1* | 5/2002 | McConnell et al. ............. 707/5 |
| 2003/0018692 | A1* | 1/2003 | Ebling et al. ................ 709/108 |
| 2003/0193676 | A1* | 10/2003 | Lapstun ....................... 358/1.8 |
| 2004/0076154 | A1 | 4/2004 | Mizutani et al. |
| 2004/0111420 | A1* | 6/2004 | Hofstee et al. ............... 707/100 |
| 2004/0114810 | A1* | 6/2004 | Boliek et al. ................ 382/232 |
| 2005/0010653 | A1 | 1/2005 | McCanne |
| 2005/0067498 | A1* | 3/2005 | Smith .......................... 235/494 |
| 2005/0097514 | A1* | 5/2005 | Nuss ........................... 717/114 |
| 2005/0108518 | A1* | 5/2005 | Pandya ........................ 713/151 |
| 2005/0135418 | A1* | 6/2005 | Betts et al. ................... 370/469 |
| 2005/0137998 | A1* | 6/2005 | Betts et al. ...................... 707/1 |
| 2005/0138038 | A1* | 6/2005 | Betts et al. ..................... 707/10 |
| 2005/0152286 | A1* | 7/2005 | Betts et al. ................... 370/255 |
| 2006/0026162 | A1* | 2/2006 | Salmonsen et al. ............ 707/10 |

OTHER PUBLICATIONS

Motorola, "Integrated Datacasting Solutions for Digital Television", Jun. 1999, Motorola, XP-0002204351, p. 1-13.*

Jones, et al., "Garbage Collection: Algorithms for Automatic Dynamic Memory Management", Dec. 1996, John Wiley & Sons, p. xxiv, 15, 210, 219, 229.*

Department of Computer Science, Iowa State University., "Specification and Verification Component Based Systems", Oct. 2004, ACM SIGSOFT 04, ACM Press, 153 pages.*

Kittitornkun et al, "Mapping Deep Nested Do-Loop DSP Algorithms to Large Scale FPGA Array Structures", Apr. 2003, IEEE Transactions on Very Large Scale Integration (VLSI) Systems, vol. 11, No. 2, p. 208-217.*

Aksoy et al, "Research in Data Broadcast and Dissemination", Dec. 1998, 15 pages.*

Labovitz et al, "Internet Routing Instability", Oct. 1998, IEEE Trans. on Networking, vol. 6, No. 5, p. 515-528, <Retrieved from IEEE Explore Jan. 31, 2009>.*

Fuhr, "Probabilistic Datalog: Implementing Logical Information Retrieval for Advanced Applications", Jan. 2000, Journal of the American Society for Information Science, p. 95-110, <Retrieved from internet Jan. 28, 2009>.*

Chatterjee et al, "Recursive Array Layouts and Fast Matrix Multiplication", Nov. 2002, IEEE Transactions on Parallel and Distributed Systems, vol. 13, No. 11, p. 1105-1123, <Retrieved from IEEE Explore Jan. 28, 2009>.*

Castro et al, "SCRIBE: A large-scale and decentralized application-level multicast infrastructure", Oct. 2002, IEEE Journal on Selected Areas in Communications, p. 100-110, <Retrieved from IEEE Explore Jan. 31, 2009>.*

Crainiceanu et al, "Querying Peer-to-Peer Networks Using P-Trees", Aug. 2004, Seventh Intl. Workshop on the Web and Database, WebDB 2004, p. 1-6, <Retrieved from ACM Portal Jan. 31, 2009>.*

Lo et al, "Recursive Neural Filters and Dynamical Range Transformers", Mar. 2004, Proceedings of the IEEE, vol. 92, No. 3, p. 514-535, <Retrieved from IEEE Explore Jan. 31, 2009>.*

Chawathe et al, "A Case Study in Building Layered DHT Applications", Aug. 2005, ACM SIGCOMM'05, p. 1-10, <Retrieved from ACM Portal Jan. 31, 2009>.*

Papemmanouil et al, "SemCast: Semantic Multicast for Content-based Data Dissemination", Apr. 2005, Proceedings of the 21st Intl. Conf. on Data Engineering (ICDE 2005), p. 1-12, <Retrieved from IEEE Explore Jan. 31, 2009>.*

Diao et al, "Path Sharing and Predicate Evaluation for High-Performance XML Filtering", Dec. 2003, ACM TODS, ACM Press, p. 467-516, <Retrieved from ACM Portal May 6, 2009 -this is a date publication stamped version of AAPA YFilter article copy undated ref Jun. 4, 2008>.*

Chand et al "A Scalable Protocol for Content-based Routing in Overlay Networks" Network Computing and applications NCA 2003, 2nd IEEE International Symposium, Apr. 16-18, 2003, Proceedings, pp. 123-130.

Taylor, et al, "Scalable IP Lookup for Programmable Routers", INFOCOM 2002, 21st Annual Joint Conference of the IEEE Computer and Communications Societies, Jun. 23-27, 2002, Proceedings vol. 2. pp. 562-671.

Sheldon, "Content Routing: A Scalable Architecture for Network-based Information Discovery", Massachusetts Inst. of Science, Thesis, Oct. 11, 1995 [retrieved on Jul. 12, 2005].

Fengyun et al "Efficient Event Routing In Content-based Publish-subscribe Service networks", INFOCOM 2004, 23rd Annual Joint Conference of the IEEE Computer and Communications Societies, Mar. 7-11, 2004, Proceedings vol. 2, pp. 929-940.

Virgillito et al, On Event Routing in Content-based Publish/subscribe Through Dynamic Networks, Distributed Computing Systems, FIDCS 2003, The 9th IEEE Workshop on Future Trends, May 28-30, 2003, Proceedings, pp. 322-328.

Gupta et al, "The View Selection Problem for XML Content Based Routing", ACM SIAMOD/ PODS 2003 Conference, San Diego, CA Jun. 9-12, 2003 [retrieved on Jul. 12, 2005].

A Routing Scheme for Content-Based Networking, Antonia Carzaniga et al, University of Colorado, Department of Computer Science, Technical Report CU-CS-953-03, Jun. 2003.

Processing XML Streams with Deterministic Automata and Stream Indexes, Todd J. Green et. al, ACM Transactions on Computational Logic, vol. ??, No. 4, 12, 2004.

XML Extensible Markup Language, WC3 Recommendation Feb. 4, 2004.

XML Path Language, WC3 Recommendation, Nov. 1999.

Efficient Filtering of XML Documents for Selective Dissemination of Information, Mehmet Atmel, Proceedings of 26th VLDB Conference, Nov. 2000.

Path Sharing and Predicate Evaluation for High-Performance XML filtering Yanlei Diao et al., ACM Transactions on Database Systems, Mar. 2003.

Efficient Filtering of XML Documents with XPath Expressions, Chee-Yong Chang et al., Bell Laboratories ,Lucent Technologies, Dec. 2002.

Deep Packet Inspection using Parallel Bloom Filters, Sarang Dharmapurikar et al., Computer Science and Engineering Department, Washington University in Saint Louis, Jan. 2004.

Exclusion Based Signature Matching for Intrusion Detection, Evangelos P. Markatos et al, Foundation for Research and Technology, Hellas, Nov. 2002.

Deterministic String Matching Algorithms for Intrusion Detection, Nathan Tuck et al, Department of Computer Science and Engineering, University of California, Mar. 2004.

* cited by examiner

HIGHLY SCALABLE SUBSCRIPTION MATCHING FOR A CONTENT ROUTING NETWORK

CROSS REFERENCE TO RELATED APPLICATION

This application claims the benefit under 35 USC 119(e) of prior U.S. provisional application No. 60/608,864 filed Sep. 13, 2004, the contents of which are herein incorporated by reference.

FIELD OF THE INVENTION

This invention relates to the field of implicit or content routing in digital communications networks, and in particular to a highly scalable method and apparatus for subscription matching for content routing.

BACKGROUND OF THE INVENTION

Content-based networks are described in A. Carzaniga, M. J. Rutherford, A. L. Wolf, A routing scheme for content-based networking, Department of Computer Science, University of Colorado, June 2003.

The field of "Implicit Routing" (or "content routing") is an emerging networking technology. Implicit Routing is the act of forwarding customer data based on the content, rather than a networking header specifying an explicitly addressed destination.

FIG. 1 illustrates an exemplary content-routed network 1. The exemplary content-routed network 1 is composed of plurality of content-routers 2, 3, 4 and 5, a plurality of publishers 11, 12 and 13, and a plurality of subscribers 21, 22, 23, 24, 25, 26, 27 and 28.

A content router is a digital communications networking device which forwards content based on inspection of the contents of a message or document, rather than on an explicit destination address in the networking header of a packet or frame. An example of such a device is the 3200 Multiservice Message Router from Solace Systems, Inc. Content routers must have connections between themselves so that they can communicate with each other and exchange both information needed to control the network, as well as to carry the content received from publishers from one content router to the next, in order to deliver it to the subscribers in the network that are interested in the content. In FIG. 1, link 43 connects content routers 2 and 3; link 46 connects content routers 3 and 4; link 48 connects content routers 4 and 5; and link 49 connects content routers 2 and 5. Such a link could be accomplished using a variety of technologies, examples of which are:

- A Transmission Control Protocol (TCP) connection across an IP network
- An MPLS circuit across an MPLS network
- A direct physical link, such as a serial line, Ethernet link, SONET link, etc.
- A virtual circuit across an Asynchronous Transfer Mode (ATM) network
- A virtual circuit across a Frame Relay network
- A virtual layer 2 circuit across an Ethernet network
- Wireless Local Area Network as per 802.11 (e.g. 802.11a, 802.11b, or 802.11g)

A publisher is a computer, user or device that can insert content into the network. Another name commonly used in the literature is an event source or a producer. A publisher connects to a content router over a link, using a variety of techniques as explained above, and then the publisher can inject content into network 1. For example, link 41 connects publisher 11 to content router 2.

A subscriber is a computer, user or device that has expressed interest in some specific content. Another name commonly used in the literature is event displayers or consumers. A subscriber connects to a content router over a link, using a variety of techniques as explained above, and then the subscriber can receive content from the network 1. For example, link 42 connects subscriber 22 to content router 2.

FIG. 1 also illustrates an example of content from publisher 11 being injected into the content routed network 1. Publisher 11 sends a document 61A to content router 2. Such a document can be delivered using a variety of protocols, such as TCP, HTTP, SMTP, etc. Content router 2 receives the document, and matches the contents of the document against its forwarding table. The forwarding table is comprised of a series of expressions that indicates matching conditions against the contents of received documents. For example, for documents formatted as Extensible Markup Language (XML) (refer to Extensible Markup Language (XML) 1.0 (Third Edition)", W3C Recommendation 4 Feb. 2004, W3C (World Wide Web Consortium)) a suitable subscription syntax is XML Path Language (XPath) (refer to reference "XML Path Language (XPath) Version 1.0", W3C Recommendation 16 Nov. 1999, W3C (Word Wide Web Consortium)).

The manner in which a content router learns of subscriptions from other routers in the network, and routes an incoming document to the correct set of egress links, is outside the scope of the present invention. One such scheme is described in our co-pending application Ser. No. 11/012,113 entitled "Implicit Routing in Content Based Networks", as well as to "A. Carzaniga, M. J. Rutherford, A. L. Wolf, A routing scheme for content-based networking, Department of Computer Science, University of Colorado, June 2003", the contents of both which are herein incorporated by reference.

In FIG. 1, publisher 11 sends document 61A over link 41 to content router 2. Content router 2 compares the full content of the document against its internal content forwarding table, and computes that locally attached subscriber 22 requires a copy of the document, but local subscriber 21 does not. In addition, one or more subscribers that are preferentially reachable via link 43 require a copy of the document, while no subscribers that require a copy of the document are preferentially reachable over link 49. As a result, content router 2 sends a copy 61B of the document over link 42 towards subscriber 22, and sends a copy 61C of the document over link 43 towards content router 3. Content router 3 repeats the process, and sends a copy 61D of the document over link 44 to subscriber 23, a copy 61E over link 45 to subscriber 25, and a copy 61F over link 46 towards content router 4. Finally, content router 4 repeats the process and delivers a copy 61G of the document over link 47 to subscriber 26. Note that a single copy of the document is sent over a link between content routers, regardless of the number of subscribers downstream that require the document.

In the prior art, research has been undertaken into algorithms for efficiently matching large numbers of XPath Expressions (or similar) against XML documents for use in document filtering systems or publish/subscribe content routing systems. For example:

[XFilter] "Efficient filtering of XML documents for selective data dissemination", M. Altinel and M. Franklin, Proceedings of VLDB, pages 53-64, September 2000.

[XTrie] "Efficient filtering of XML documents with XPath expressions", Chee-Yong Chan, Pascal Felber, Minos Garofalakis, Rajeev Rasogi; Proceedings of the International Conference on Data Engineering, 2002.

[YFilter] "Path Sharing and Predicate Evaluation for High-Performance XML Filtering", Yanlei Diao, Mehmet Altinel, Michael J. Franklin, Hao Zhang, Peter Fischer; ACM Transactions on Database Systems, 28(4):467-516, 2003.

[DFA_SIX] "Processing XML Streams with Deterministic Automata and Stream Indexes", Todd J. Green, Ashish Gupta, Gerome Miklau, Makoto Onizuka, Dan Suciu, May 11, 2004.

The algorithm in [XFilter] uses a finite state machine (FSM) per query approach, and thus does not scale to a very large number of subscriptions. For example, with just 50,000 subscriptions, the filtering time of a single document takes over 1 second. In addition, [XFILTER] only dealt with single-path structural matches of XPath expressions, and did not support predicates, including conditions on attribute values, and the content of text nodes. Structural-only matching is not suitable for content routed networks.

The algorithm in [XTRIE] supports more complex XPath expressions, and factors out common sub-strings of the subscriptions and indexes them using a trie data structure. [XTrie] focus on an algorithm for structural matches only (including path predicates), and does not satisfactorily describe algorithms suitable for text and attribute matching (value-based predicates) over a large subscription database.

[YFilter] utilizes a non-deterministic finite automaton (NFA) which allows for a relatively small number of machine states for large number of path expressions, the ability to support complicated document types, including nested recursion, and allows for incremental construction and maintenance. The main NFA supports structural matching, using a single run-time stack to track the current active set of states, and to allow back-tracking to the last active set of states when the end of an XML element is reached. [YFILTER] also proposes two approaches to extend the algorithm to support value-based predicates. The first is "Inline", which applies tests for the value-based predicates during NFA processing, and the second is "Selection Postponed" (SP), which first runs the NFA for structural matching, and then applies selection predicates in a post-processing phase. The "Inline" approach extends the information stored in each state of the NFA via a table per state that stores information about each predicate to be tested. Such simple tables are not scalable, as a large number of queries could be testing predicates at the same state. Moreover, the book-keeping data structures proposed are inefficient and not scalable. With the second approach proposed, SP, predicate evaluation is delayed until the end, with the advantage that predicate evaluation is only carried out for subscriptions that have already matched structurally against the document. However, this approach requires temporarily storing data from elements, such as the text portion, which can be arbitrarily large. In addition, the algorithm in [YFilter] requires post-processing to handle nested predicates.

The algorithm of [DFA_SIX] uses a single Deterministic Finite Automaton (DFA) to represent a large number of XPath expressions to achieve a constant throughput, independent of the number of XPath expressions. The DFA is formed by first converting the XPath expressions into an NFA, and then converting the NFA into a single DFA. The NFA is constructed in a manner similar to [YFILTER]. [DFA_SIX] concludes that building an eager DFA, i.e. simply based on the XPath subscription database, in not scalable, due to an exponential explosion in the number of required states, and instead the DFA must be built lazily, i.e. on demand as documents are processed. The lazy construction means that only required states, based on the structure of input documents seen, is constructed, instead of all states that would be required to process any arbitrary document. The lazy construction results in the algorithm running much slower until it is "trained", i.e. until the required DFA construction phase is complete. The [DFA_SIX] algorithm avoids a state explosion by training only on actual documents received, and depending upon the fact that the documents will follow a few DTDs which will limit the number of states actually needed. However, the algorithm could be simply attacked by sending a stream of arbitrarily structured XML documents that do not follow a few DTDs. This will cause a state explosion. Also, the [DFA_SIX] algorithm does not handle changes in the subscription database easily, since the DFA must be rebuilt, and the performance during the lazy building phase is low.

None of the prior art techniques discuss how the algorithms utilized can be efficiently adapted to a hardware implementation. Looking at the history of IP routers as an example, these devices started out as software running on general-purpose UNIX workstations, then evolved to specialized devices, but still performing the processing in software, then there was an evolution to hardware-based forwarding, using Field Programmable Gate Arrays (FPGA), Application Specific Integrated Circuits (ASIC), or specialized network processors. The XML content-matching prior art discussed above applies to software implementation running on general purpose workstations. For example, [DFA_SIX] reported throughput of 20 to 27 Mbits per second, using the lazy DFA approach, in the steady state once the construction phase was complete. In order to provide very high performance (e.g. Gigabit per second throughput or higher) and a very large subscription database, a specialized hardware implementation is needed. This also requires algorithms specifically optimized for a hardware implementation.

A recently announced hardware acceleration device for performing XPath evaluation against XML documents is the "RAX (Random Access XML) Content Processor" from Tarari, Inc. An example of the use of the device for a content-based routing application is given in the whitepaper "RAX Random Access XML: Fundamentally Changing How XML is Used and Processed", Tarari Inc., 2004. The white paper describes a classification application used for content routing, and provides benchmark data to illustrate the performance of the RAX hardware acceleration. The benchmark was based on input XML documents with an average size of 8.8 Kbytes. The benchmark only used 63 XPath matching rules, which is orders of magnitude too low for a scalable content routing network, where hundreds of thousands or perhaps one million subscriptions are needed. The benchmark reported a throughput of 2652 messages per second on a Xeon P4 Single CPU running at 2.4 GHz. This represents a throughput of approximately 187 MBits per second. When the benchmark was run on an IBM Pentium symmetric multiprocessor platform, the reported throughput was 5118 messages per second, or approximately 360 Mbits per second. A much more scalable solution is needed.

SUMMARY OF THE INVENTION

The invention provides a method of content-routing or implicit routing across a plurality of content routers that provides for a highly scaleable handling of a large number of subscriptions that must be matched against XML documents.

The invention utilizes specially designed hardware, based on silicon devices such as ASICs or FPGAs, along with an algorithm optimized to handle a very large set of XPath subscriptions. The algorithm is based on the NFA tree approach of [YFILTER], but uses a very different approach to handle evaluation of value-based predicates and nested predicates.

In accordance with one aspect of the invention there is provided a method of matching subscriptions to published documents in a content-routed network, comprising receiving subscription information; receiving published documents; storing said subscription information and said published documents in memory; instructing a subscription matching accelerator of the locations in memory of said published documents; transferring portions of said stored published documents from said memory to said accelerator on an as-needed basis; providing said subscription information to said accelerator; and processing said portions in said accelerator to perform subscription matching in said subscription matching accelerator independently of other functions performed within the content-router.

It will be understood that in the context of the invention the term document includes any content capable of being published over a content-routed network, for example, multi-media and the like. Also, it will be apparent that the sequence of the steps recited in the above method is not critical. For example, it doesn't matter whether the subscription information is transferred to the accelerator before or after the portions of the stored published documents.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

Figure 1:
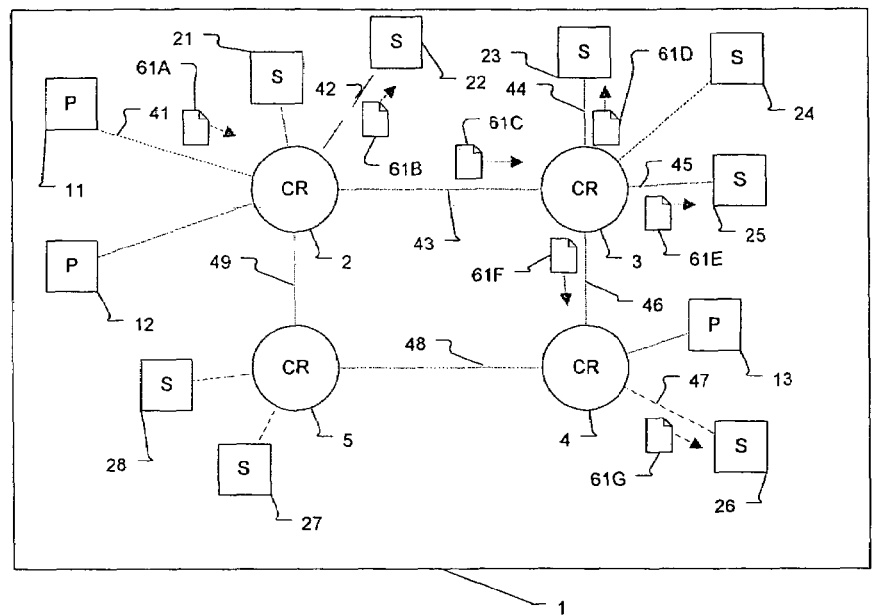
FIG. 1 shows one example of a Content-Routed Network.

In an exemplary embodiment, a content router routes documents formatted as Extensible Markup Language (XML) (refer to "Extensible Markup Language (XML) 1.0 (Third Edition)", W3C Recommendation 4 Feb. 2004, W3C (World Wide Web Consortium) and to "Extensible Markup Language (XML) 1.1, W3C Recommendation 4 Feb. 2004, W3C (World Wide Web Consortium)) and utilizes subscriptions based on XML Path Language (XPath) (refer to reference "XML Path Language (XPath) Version 1.0", W3C Recommendation 16 Nov. 1999, W3C (Word Wide Web Consortium)). Publishers connect to the content router via HTTP over TCP, although other connection methods are possible such as SMTP, FTP, TCP, etc.

The content router utilizes XPath expressions (XPE) to match subscribers' interests against a received XML document. Normally, XPath expressions are utilized in XML technologies to address parts of an XML document. In Content Routing subscriptions, XPaths are used to match published documents; if an XPath expression successfully addresses a portion of the published document, then the subscription matches the document.

The following exemplary XML document is used in further examples of XPath expression matching:

Exemplary XML Document

```
<?xml version="1.0" encoding="UTF-8"?>
<Invoice>
    <InvoiceNumber>10235678</InvoiceNumber>
    <InvoiceDate>2004-07-30T09:00:00</InvoiceDate>
    <InvoiceParty>
        <BuyerParty>
            <Name>Acme Enterprises</Name>
            <Street>123 Main Street</Street>
            <City>New York</City>
            <State>NY</State>
        </BuyerParty>
        <SellerParty>
            <Name>Doe Company</Name>
            <Street>123 Any Street</Street>
            <City>Sunnyvale</City>
            <State>CA</State>
        </SellerParty>
    </InvoiceParty>
    <InvoiceDetail>
        <PartNumber>1234A67-90</PartNumber>
        <Description>Electric Motor, one horsepower, continuous duty
        </Description>
        <UnitPrice currency="USD">323.56</UnitPrice>
        <Quantity>1</Quantity>
        <Total currency="USD">323.56<Total>
    </InvoiceDetail>
</Invoice>
```

Table 1 provides examples of XPath Expressions that could be used in subscriptions in a Content Routed network. Each XPath Expression (XPE) 151 has an associated Subscriber ID 150, indicating which subscriber a published document should be delivered to if it matches the matching criteria of the XPE 151. In the example, subscriber ID 1 has two XPEs 152 and 153, which both match the exemplary XML document above. When at least one XPE for a subscriber matches a published document, the document is delivered once to the subscriber. Subscriber ID 2 has two XPEs 153 and 154, neither of which matches the exemplary XML document above. It can be seen that XPEs can match both the structure of an XML document (i.e. the tags that mark up the content of the document), and match the content of the document, both in attributes of tags (for example, the "currency" attribute of tag "Total"), and match the content of tags, such as the numeric value in "Total", or part of the "Description" tag.

TABLE 1

Exemplary XPath Expressions for Subscriptions

| Subscriber ID (150) | Xpath Expression (151) |
|---|---|
| 1 (152) | /Invoice/*[Total>100] |
| 1 (153) | //InvoiceDetail[Description[contains(test( ), "motor")]][Total>50] |
| 2 (154) | //InvoiceDetail[PartNumber="1234A67-90"][Quantity>1] |
| 2 (155) | /Invoice[//State]//Total[@currency="USD"][.>500] |

Note that XML documents and XPath Expressions can also refer to XML document tags that are namespace qualified, refer to "Namespaces in XML", W3C Recommendation 14 Jan. 1999, W3C (World Wide Web Consortium), and "Namespaces in XML 1.1", W3C Recommendation 4 Feb. 2004, W3C (Word Wide Web Consortium). Namespaces were not used in the examples above, but full support of namespaces in an XML Content Routed network is required. Note that the use of namespaces in XML documents is optional. As an example, the XML tag below (a fragment of an XML document) is namespace qualified:

<prefix:ExampleTag xmlns:prefix='http://www.example.com/schema'/>

When the XML document is processed, the prefix must be expanded to the full namespace definition, and concatenated with the local part ("ExampleTag" in this example) of the qualified name to form the expanded name. A unique separator such as a space can be inserted between the two parts to ensure uniqueness of expanded names vs. non-namespace qualified names, since a space cannot be a component of a namespace or of a local part of a tag. For example, the above tag name can be expanded to "http://www.example.com/schema ExampleTag". This expanded name would be used when matching XPath Expressions to XML documents. Or, the expanded name can be considered a tuple, i.e. (name="ExampleTag", namespace="http://www.example.com/schema"). In a similar manner, XPath Expressions can also use prefixes with namespace definitions. The namespace prefix serves as a short-form for the typically long namespace string.

Figure 2:
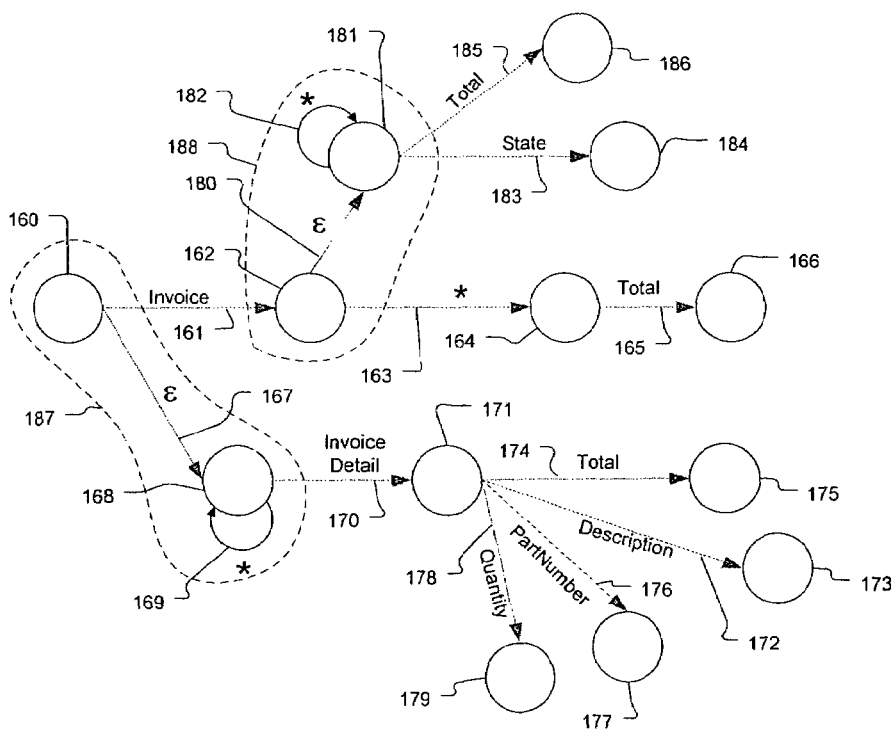
FIG. 2 shows the NFA for the subscriptions of Table 1.

A Non-Finite Automaton (NFA), as is known in the art, is used to build a state machine that represents the structural components of the collection of XPath Expressions to be matched against published documents. Structural components within predicates are treated independently, and are tied together using a unique transactional construct that is explained later. The XPEs of Table 1 are shown in NFA form in FIG. 2. Note that the basic structure of the NFA from FIG. 2 is taken from the prior art technique described in [YFilter] referenced earlier. The basic NFA only takes care of structural components of the XPath expression. Handling of attributes, and the text component of elements, is handled via other data structures described later.

The method in which the NFA is constructed for the basic structural components of XPEs is now described. The NFA starts with a single state 160 of FIG. 2, which is the root of the NFA. The first XPE 152 of Table 1 is then added. Each step name is added as an outgoing arc, leading to a new state. The NFA forms a directed graph. In XPE 152, the first step from the root of the XPE is "Invoice". Such a transition does not yet exist from state 160, so transition 161 is added, leading to a new state 162. The next step "*" (representing a wildcard) is then considered. Such a transition does not yet exist out of state 162, so a new transition 163 is added, leading to new state 164. Finally, the predicate "[Total>100]" is considered. This looks for a child element "Total" from the previous step with a content value greater than 100. Since an outgoing transition for "Total" does not yet exist from state 164, a new transition 165 is added, leading to a new state 166.

Next, XPE 153 of Table 1 is added to the NFA of FIG. 2. The intial "//" indicates an XPath descendent-or-self location, containing the current document node and all descendents (children, grandchildren, etc.). This construct is handled in the NFA by adding an Epsilon or empty transition 167 from state 160 to new state 168. State 168 is a self-loop state, and has a self-loop transition 169 which matches any document tag (the "*" indicates a wildcard). Then, from state 168, an outgoing transition 170 for "InvoiceDetail" is added, leading to new state 171'. This construct matches an "InvoiceDetail" element at any level in the XML document from the root. The empty transition 167 is followed without any input being necessary, as is known in the art for NFA. XPE 153 then looks for two child elements, "Description" and "Total". A new transition 172 is added for "Description", leading to new state 173, and a new transition 174 is added for "Total", leading to new state 175.

Next, XPE 154 of Table 1 is added to the NFA of FIG. 2. The leading "//InvoiceDetail" re-uses the existing states and transitions 160, 167, 168, 169, 170 and 171. Transition 176 and state 177 are added for the "Part Number" predicate, and transition 178 and state 179 are added for the "Quantity" predicate.

Next, XPE 155 of Table 1 is added to the NFA of FIG. 2. State 160, transition 161 and state 162 are re-used for the first step "/Invoice". Then, the Epsilon transition 180, state 181 with self-loop wildcard transition 182, transition 183 and new state 184 are added for the predicate "//State". Finally, for "//Total", transition 185 is added off of the self-loop state 181, leading to new state 186.

While the creation of the NFA of FIG. 2 is prior art, the manner in which the processing of the NFA is realized is of key concern, for a technique is required which leads to a high performance hardware implementation. In addition, the prior art does not describe suitable techniques for handling predicates, included nested paths, attribute values, and text values, in an efficient and scalable manner, and there is no consideration given to implementation in hardware.

To efficiently realize an NFA, a number of key data structures are utilized, consisting of those which hold subscription information that is to be matched, and those which hold run-time information which is created and utilized only as part of processing a published document.

Figure 3:
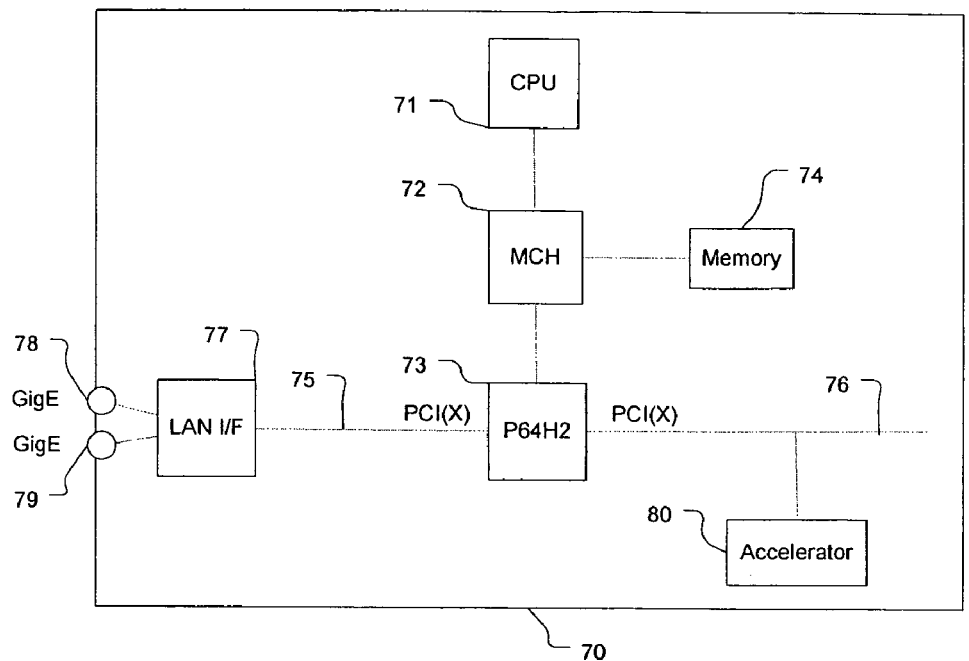
FIG. 3 shows the system architecture.

High performance and high scalability of subscription matching against XML documents is provided by a specialized hardware assembly added to a standard compute platform. The system architecture is shown in FIG. 3. The Content Routing system 70 consists of one or more CPUs 71, such as the Intel Xeon processor. The CPU 71 is supported by a chipset, which is comprised of a Memory Controller Hub (MCH) 72, such as the Intel E7501, which interfaces to the system dynamic random-access memory (DRAM) 74, and a dual 64-bit PCI/PCI-X controller 73, such as the Intel P64H2. The PCI/PCI-X controller 73 provides two PCI busses, 75 and 76. On one PCI bus is a dual channel gigabit Ethernet controller 77, such as the Intel 82546EB, which provides two gigabit Ethernet ports 78 and 79 to allow the system to connect to external equipment, such as an IP network (not shown). Note that other elements of the system that are not relevant to the invention details are not shown, such as the south bridge component of the chipset, and associated I/O controllers for disk drives, keyboard, mouse, video, etc. A custom hardware acceleration card, 80, is connected to one of the PCI busses (PCI 76 in the figure), and provides the acceleration function for high performance, high scale subscription matching as will be described further below. The composition of such a compute platform, aside from the specialized acceleration card, is well known in the art.

The high level information flow through the system will now be described. The Content Routing system receives information about subscriptions, both from locally attached subscribers, and from the Content Routing protocol running between Content Routers. The protocol involved is the XML Subscription Management Protocol (XSMP), which is described in our copending patent application Ser. No. 11/012,113. This subscription information is processed into a series of data structures in memory 74, which are then written to the accelerator 80. The details of the data structures are described in detail below. This information tells the accelerator 80 which subscriptions it is to match a received document against.

A document is received from a publisher through one of the Ethernet interfaces 78 or 79. Under control of the CPU 71, the TCP and HTTP protocols are processed, and the contained XML document is placed into memory 74. The processing of TCP and HTTP protocols is well known in the art and is not discussed further. Once the published XML document has been received into memory 74, it is ready to be processed by the acceleration card 80. The CPU 71 instructs the acceleration card 80 of the location of the document to be processed, via writing to control registers on card 80 via PCI bus 76. The document may reside in memory 74 in a series of non-contiguous buffers, and so the address of each buffer involved (in order from the beginning of the XML document to the end), and the amount of data in each buffer, is given to the acceleration card 80. The acceleration card 80 then extracts the document from memory 74 via a Direct Memory Access (DMA) operation, and the CPU 71 is not involved in this data transfer. The accelerator 80 pulls in the document data on an as-needed basis as the document is processed, and the entire document does not need to reside on the accelerator 80 at the same time. This allows very large documents to be processed that do not have to fit into the memory of the accelerator 80. The accelerator 80 processes the document, and compares the content to the subscription information that has been provided to it earlier by CPU 71. A list of matches, if any, are determined by the accelerator 80 and are read by the CPU 71 and written into memory 74. CPU 71 can then use this match information to determine the set of egress links that the document must be sent on. This can be a link to a locally attached subscriber, or to another Content Router, as described above.

The copies of the document transmitted by the Content Router are sent via Ethernet ports 78 or 79, preferentially using HTTP over TCP.

Figure 4:
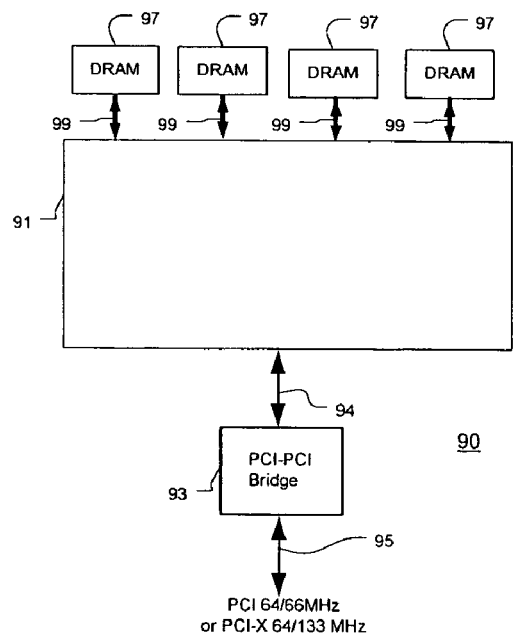
FIG. 4 shows the accelerator card main components.

FIG. 4 shows the main components of the accelerator card 90. The card has a CMOS silicon device, chip 91. Chip 91 can be implemented in several CMOS silicon technologies such as FPGA, structured ASIC, standard ASIC or full custom IC. Note also that chip 91 can be implemented using more than a single device. The number of chips 91 utilized depends on the level of integration possible in given CMOS technology. Some technology factors influencing that decision are the amount of pins available for a given chip package as well as the amount of intergration possible for a given CMOS technology. A PCI to PCI bridge 93 bridges between the system PCI bus 95 and the internal PCI bus 94, which connects to chip 91. This allows chip 91 to communicate with the system over the PCI bus 95. The PCI buses 94, 95 can be 64 bit, 66 MHz (PCI) or 64 bit, 100 or 133 MHz PCI-X or other variations. Chip 91 has a plurality of independent dynamic random access memory (DRAM) blocks 97. Note that a DRAM block such as 97 can be composed of a number of memory devices, such as using two 18-bit devices in parallel to form a 36-bit wide memory interface. Further more, several DRAM technologies are suitable for this particular application such as DDR1, DDR2, FCRAM and RLDRAM. The circuitry required to interface to such memory devices is well known in the art. Additionally, static RAM technology can be used in place of DRAM technology. The DRAM block 97 connects to chip 91 over memory bus 99. The number of DRAM devices and the number of DRAM interfaces are a function of the DRAM technology used for the implementation. For example FIG. 4 shows a total of 4 physical DRAM interfaces 99. It is possible to implement this invention using 2 DRAM interfaces running at twice the speed and twice the capacity. It is also possible to use twice as many lesser capacity devices and to run them at half the speed. The process of mapping logical memories into physical memories is well known in the art. In the following text all references to memories pertains to logical memories and the mapping of these logical memories into physical memories is left out as it does not contribute to further understanding of the herein described invention.

Figure 5:
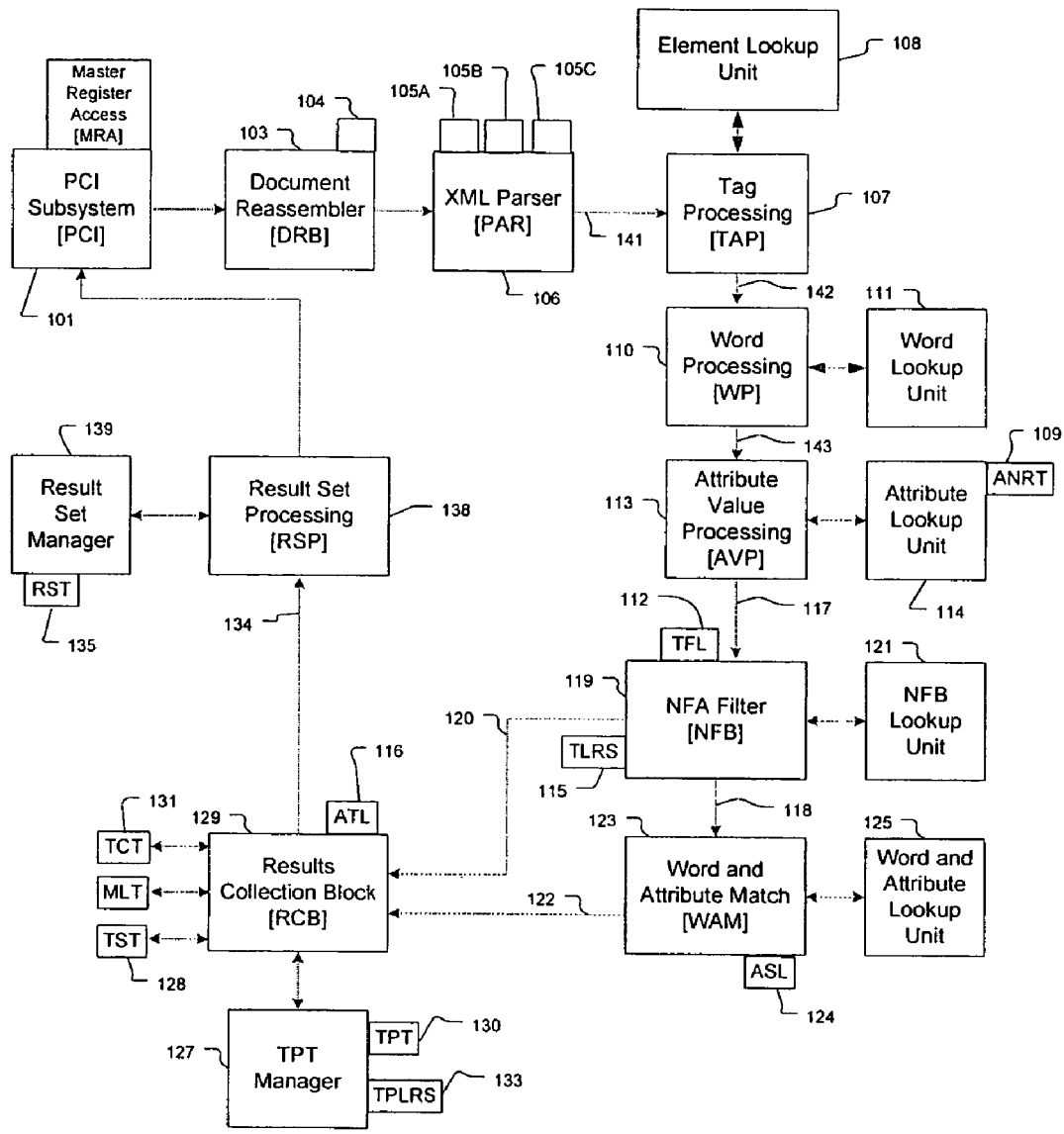
FIG. 5 shows the details of the accelerator card processing pipeline.

FIG. 5 shows details of the document processing blocks present on chip 91. Chip 91 has a PCI subsystem 101 which interfaces to the card's PCI bus 94. Associated with the PCI subsystem 101 is master register access blocks 102, which contains the general configuration registers that can be accessed via the card's PCI bus 94. These registers allow the host system to program the accelerator card's 80 functions. The implementation of a PCI subsystem 101 and configuration registers within a chip is well known in the art and is not discussed further.

The Document Re-assembler (DRB) block 103 is responsible for pulling the document to be processed from main memory 74 via Direct Memory Access (DMA) as described earlier. A DMA request FIFO 104 is used to hold the information about each document fragment to be transferred, allowing the document to reside in the host memory in a series of non-contiguous blocks. Examples of the information required is the start address in the host memory 74 and the size of the fragment, whether the fragment is the first one of an XML document or the last one of an XML document, and a document ID identifying which XML document the fragment belongs to. Note that information about document fragments for each document must be sent in order, and the first document fragment of a subsequent document follows the last document fragment of the preceding document. However, the request FIFO 104 can hold information for more than one document. DRB block 103 implements a standard DMA function as is known in the art. The document ID is an important piece of information, as the entire event flow downstream from DRB block 103 has every event tagged with the document ID. This allows downstream blocks to pipeline multiple documents (i.e. a block could be processing the end of one document and the start of the next document simultaneously within different stages of the same pipeline). The document ID is also the mechanism by which the results produced by the acceleration card are correlated back to a particular input document. The DRB block 103 also generates a Start Document event at the start of each document, and an End Document event at the end of each document.

The XML Parser (PAR) block 106 is responsible for parsing the document which involves extracting the character encoding from the XML document, well-formedness checking, attribute value normalization, entity replacement, character folding, and identifying elements of interest to downstream logic. Note that the PAR block 106 is a non-validating XML processor and does not require any validation checks (i.e. adherence to an XML schema or DTD) although the checks that are performed by the block are not limited to well-formedness. The PAR block 106 consumes the entire XML document and relays document content and tags along with classification information to the Tag Processing (TAP) block 107 in a streaming fashion.

The PAR block 106 carries out a standard stream-based XML parsing function, as is known in the art. However, instead of utilizing a standard SAX parsing interface logic, it utilizes an optimized algorithm and interfaces to downstream blocks for efficient realization in hardware, and to optimize for the content routing application.

At the front end of the PAR block 106, the character stream is converted into a 21-bit Unicode character stream. The encoding of the document can be determined via auto-detecting the encoding and by the XML encoding declaration statement, as is known in the art. The characters are then converted to an internal 21-bit Unicode format. For example, the input document may be encoded in UTF-8, and the 21-bit Unicode characters are extracted from the UTF-8 encoding. The 21-bit format allows the full range of Unicode characters to be handled. Note that the input format may also be in a non-Unicode encoding, such as US-ASCII and ISO-8859-1. Such encodings are mapped into Unicode. As part of this process of converting the external encoding to the internal 21-bit Unicode format, the encoding of each character is checked to make sure that it conforms to the rules for the encoding type in use. If there is a violation, the document is invalid, processing of the document stops, and an error code is returned to the system.

The PAR block 106 utilizes three lookup tables (105A, 105B and 105C) to categorize each character in the document in order to validate characters and to ease the task of document parsing.

The first lookup table 105A handles Unicode characters which lie in the Basic Multilingual Plane (BMP), which comprises the most commonly used characters by the languages of the world. Refer to "The Unicode Standard, Version 4.0", The Unicode Consortium, August 2003. The BMP consists of the first 65,536 Unicode character code points in the range of 0 to 65,535. The lookup table 105A is organized as a table of 65,536 rows by 8 bits wide, and is indexed by the Unicode character value in the range of 0 to 65,535. Each entry consists of the information shown in Table 2 below. The XML10_CLASS is a 2-bit value that indicates the classification of the Unicode character when the XML document version is 1.0 (as determined by parsing the XML prolog and seeing an XML version declaration of 1.0, or when no version declaration is present). The XML11_CLASS is a 2-bit value that indicates the classification of the character for XML documents of version 1.1 (determined by an XML version declaration of 1.1). Both XML10_CLASS and XML11_CLASS categorize each character into one of four categories as shown in Table 2. This allows the PAR block 106 to efficiently determine whether a character is invalid for XML, whether a character is a valid name start character (for example, valid as the start of the name of an XML tag or elsewhere in the tag), or whether the character is a valid name character (for example, valid within the name of an XML tag but not as the first character). Examples of invalid XML characters are those that fall out of the definition of a valid XML character. Valid XML characters that are not valid name or name start characters are given classification 0. This lookup table 105A also has a third field called CHARFLD_CLASS. This field provides additional information about the Unicode character, namely:

Whether the character is a combining character. Combining characters add to the preceeding character, e.g. accents. An example of a combining character is a "combining diaeresis".

Whether the character does not need any case folding, or whether the character needs a certain offset to result in case folding. Case folding is an operation where uppercase characters are normalized into lower case characters so that a case-insensitive search can be performed.

TABLE 2

Character Classification Lookup Table 105A Entry Contents

| XML10_CLASS (2 bits) This field contains the XML version 1.0 specific classification information. | XML11_CLASS (2 bits) This field contains the XML version 1.1 specific classification information. | CHARFLD_CLASS (4 bits) Case folding operator indicates how to get the regularized character. |
|---|---|---|
| Value Meaning | Value Meaning | Value Meaning |
| 0 No XML1.0 specific classification required | 0 No XML1.1 specific classification required | 0 Combining Character |
| 1 Character represents a valid NAME character. | 1 Character represents a valid NAME character. | 1 No case folding necessary |
| 2 Character represents a valid NAME START character. Note that a character of this type is also a valid NAME character | 2 Character represents a valid NAME START character. Note that a character of this type is also a valid NAME character | 2 Increment Unicode by 1 |
| | | 3 Increment Unicode by 32 |
| | | 4 Decrement Unicode by 8 |
| | | 5 Increment Unicode by 48 |
| | | 6 Increment Unicode by 26 |
| | | 7 Increment Unicode by 16 |
| | | 8 Increment Unicode by 80 |
| 3 Character is not a valid XML character | 3 Character is not a valid XML character | 9-15 Reserved |

Characters are categorized as to whether they are combining characters so that such characters can be ignored when text searches are done. This allows wider matching of words in languages that utilize accents, such as French.

Case folding is the act of converting characters to a common case (for example, converting all characters to lower case) to allow text comparisons to be done in a case-insensitive manner. Refer to "Draft Unicode Technical Report #30: Character Foldings", The Unicode Consortium, July 2004. For example, with case folding, the letter "A" becomes "a". Case folding for Unicode normally requires the use of very large lookup tables. When attempting to do this operation in hardware with limited amounts of high-speed memory, a more efficient method is needed. As a result, instead of using the normal Unicode method of a large lookup table (e.g. 65,536 entries), indexed by the input Unicode character, to yield the output Unicode character (16-bits wide for the BMP), an offset method is used. The CHARFLD_CLASS returns a code indicating what type of offset should be applied to the Unicode character to effect case folding. For example, for Latin characters "A" through "Z", an offset of +32 will map the characters to "a" through "z". So, the Unicode characters "A" through "Z" (U+0041 through U+005A using the standard Unicode hex notation), would have a CHARFLD_CLASS of 3, as per Table 2 above. The current Unicode character set contains a total of 870 characters that require case folding. The offset method, with the values in Table 2 covers 656 of the 870 characters, and covers all of the major languages of the world that are of interest. Thus, this method allows a very compact memory table to be used to effectively perform Unicode case folding.

Note that the lookup table 105A of Table 2 only handles Unicode characters in the BMP, which while only a small portion of the Unicode character range, is where all the characters of interest reside. However, characters outside of the BMP are also handled. There are no instances of combining characters or case folding outside of the BMP, so such characters can default to a CHARFLD_CLASS of 1 (no case folding necessary). For XML 1.0, all characters in the range of hexadecimal 10000 to hexadecimal 10FFFF are valid XML characters, but not valid name or name start characters, and so they default to an XML10_CLASS of 0. For XML 1.1, characters in the range hexadecimal 10000 to hexadecimal #EFFFF are valid name start characters and default to an XML11_CLASS of 2. Characters of hexadecimal F0000 through 10FFFF are valid XML characters and default to an XML11_CLASS of 0. These rules are applied using combinatorial logic.

In summary, Table 2 above allows a compact table 105A of only 8 bits in width to categorize Unicode characters in four ways: XML version 1.0 name and validity information, XML version 1.1 name and validity information, combining character, and case folding.

The PAR block 106 also utilizes an ASCII lookup table 105B to further optimize the parsing function. All XML meta-characters are ASCII characters, and special ASCII characters are looked at by the parser at many different places. The lookup table 105B is 128 entries deep and 4 bits wide. 128 entries cover the valid ASCII character code range of 0 through 127. Four bits was chosen as the size of the code to trade off the width of the code vs. the number of symbols of interest that is encoded. Four bits allows 15 special symbols, plus a value to cover all other characters. The ASCII characters covered, and the encoding used, is shown in Table 3 below. For example, if a less-than sign character is encountered (Unicode value U+0003C), an ASCII class of 1 results. This is done by storing a value of 1 in the 61$^{st}$ entry of the lookup table 105B (since 3C hexadecimal is 60 decimal, an the table 105B is indexed starting at index zero). The ASCII Class Code allows the parser to do a 4-bit comparison instead of wider comparison when looking for the 15 special symbols that were chosen. The symbols were chosen based on the number of times the hardware circuitry must make comparisons against them.

TABLE 3

ASCII Class Codes for lookup table 105B

| Class | Char | Unicode | Description |
|---|---|---|---|
| 0 | Other than those below | Other than those below | No special classification |
| 1 | < | U+0003C | Less than |
| 2 | ! | U+00021 | Exclamation point |
| 3 | - | U+0002D | Minus sign |
| 4 | > | U+0003E | Greater than |
| 5 | ? | U+0003F | Question mark |
| 6 |   | U+00020 | Whitespace |
|   |   | U+00009 |   |
|   |   | U+0000D |   |
|   |   | U+0000A |   |
| 7 | [ | U+0005B | Open square bracket |
| 8 | ] | U+0005D | Close square bracket |
| 9 | % | U+00025 | Percentage sign |
| 10 | ; | U+0003B | Semi-colon |
| 11 | # | U+00023 | Hash mark |
| 12 | " | U+00022 | Double Quote |
| 13 | = | U+0003D | Equal sign |
| 14 | & | U+00026 | Ampersand |
| 15 | ' | U+00027 | Single Quote |

Another optimization scheme used for ASCII characters is to send a single bit along with the 21-bit Unicode value for the character within the parser block 106 which indicates whether or not it is falls within the range of 0 to 127, i.e. if the top 14 bits are all zero in the 21-bit Unicode value. This allows comparisons for ASCII characters outside of the special 15 symbols of Table 3 above to also be compared against in a more compact manner. To check for a given ASCII character without a special ASCII class code, a comparison is done against only the bottom 7 bits of the value, along with checking that the ASCII indicator bit is set. This results in an 8-bit comparison instead of a 21-bit comparison.

The PAR block 106 is responsible for fully parsing the XML document. This involves many state machines to look for sequences of characters that indicate different portions of the XML document. An efficient method to carry out such XML parsing in hardware is needed to reduce the hardware resources consumed.

Consider the XML declaration in the prolog of an XML document, an example of which is:

<?xml version="1.0" encoding="ISO-8859-1"
    standalone="yes" ?>

Figure 6:
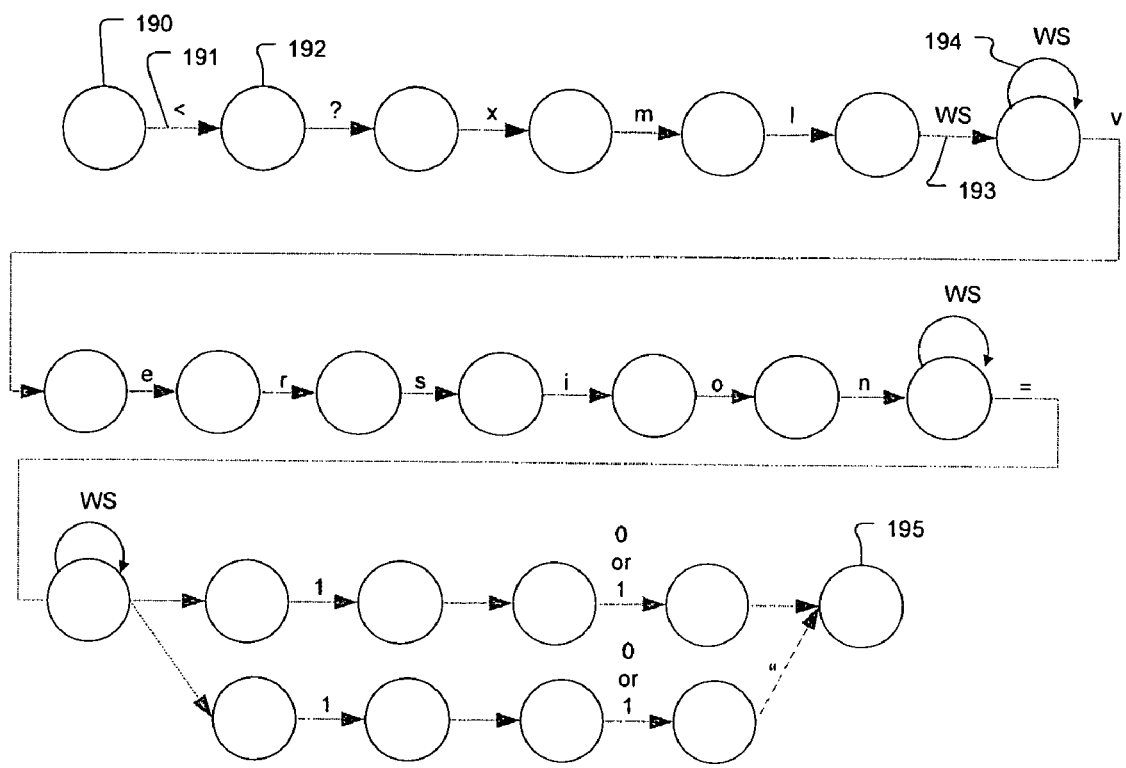
FIG. 6 shows a prior-art state machine example.

A typical prior-art state machine to implement this sort of parsing is shown in FIG. 6. Only a portion of the state machine is shown, to parse the start of the prolog including the required version declaration (handling both XML version 1.0 and 1.1). This approach requires a large number of states, and a large amount of combinatorial logic to compare the various conditions. For example, state 190 is active when the start of the prolog is being waited for. Transition 191 accepts a '<' character, leading to state 192. Transition 193 looks for whitespace, i.e. Unicode values U+0020 or U+0009 or U+000D or U+000A. Transition 194 indicates that additional whitespace characters are absorbed, and the state remains active until a transition out of the state. State 195 is reached after the version portion of the prolog has been successfully received, and this state would continue to handle the rest of the prolog (not shown). This state machine approach requires significant combinatorial logic to compare the various characters. While the technique mentioned above of using a register to hold the condition of whether the top 14 bits of the 21-bit Unicode character can reduce the amount of combinatorial logic, it is still significant. In addition, the more states that must examine a condition such as the next input character, the more fan-out occurs, and this leads to the requirement of use buffers, and the logic runs slower. Note that in FIG. 6, transitions involving error conditions, such as for an unexpected input character, is not shown. Typically these would go to an error state, indicating that the document is not correctly formatted. This example state machine would also undertake other actions once the version number is known, such as setting a register to indicate whether the document is XML version 1.0 or 1.1, for use with the character classification logic described above.

The number of states can be reduced by using on chip memory to hold information about a sequence being searched for. A reduction in the number of states reduces the amount combinational logic, at the cost of using small memory, but is generally a more efficient way of implementing a parsing state machine. The state machine for this approach is shown in FIG. 7, and the associated memory structure is shown in FIG. 8.

Figure 8:
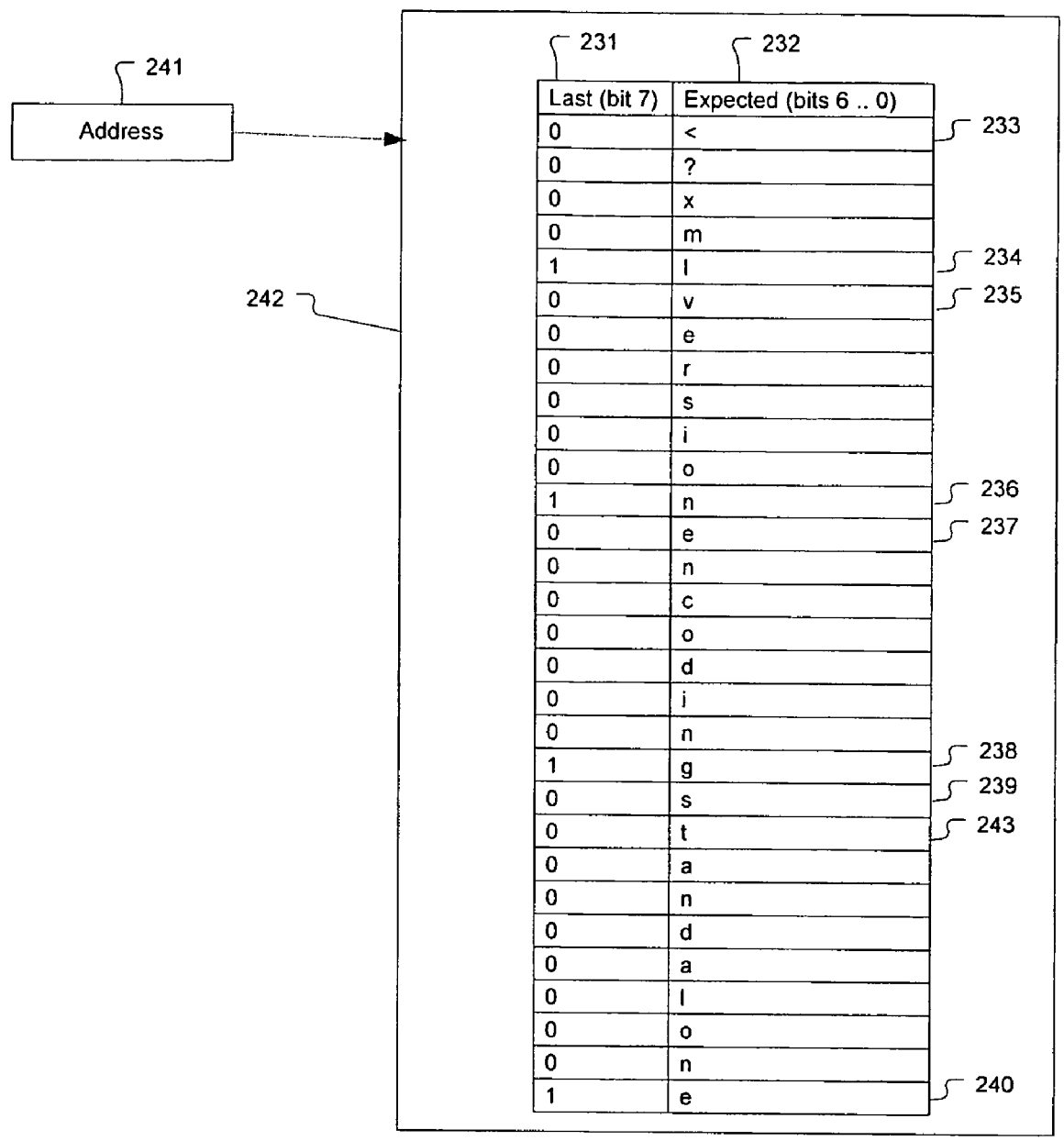
FIG. 8 shows the memory associated with the state machine of FIG. 7.

In FIG. 8, an 8-bit wide memory 242 is utilized, composed of two fields: a "last" bit 231, and an expected character 232 composed of 7 bits. An associated address register 241 is used to index into the memory. This register has to be wide enough to hold the required number of bits of address, depending on the amount of data placed into the memory. In the example of FIG. 8, a 5 bit address is sufficient. The expected field 232 holds a series of characters which indicates the pattern being sought by the state machine. The last bit 231 indicates if a character is not the last one in the sequence (value of 0) or is the last one (value of 1). Note that the memory can hold a sequence of patterns. Entries starting at 233 and ending at 234 hold the pattern "<?xml". Entries starting at 235 and ending at 236 hold the pattern "version". Entries starting at 237 and ending at 238 hold the pattern "encoding". Entries starting at 239 and ending at 240 hold the pattern "standalone". These patterns are used as part of parsing the XML prolog, an example of which was shown above.

Figure 7:
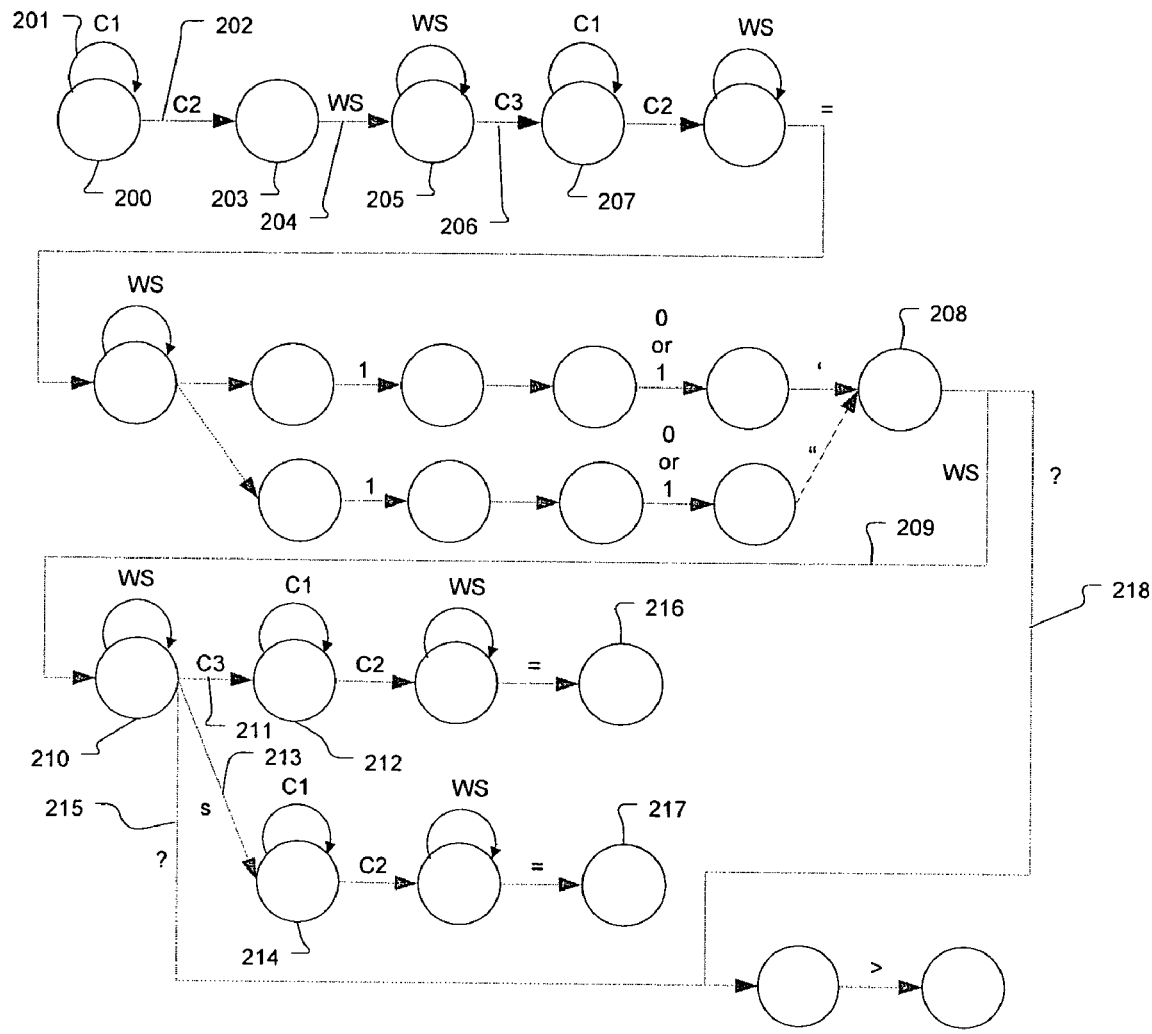
FIG. 7 shows a state machine example using internal memory.

In FIG. 7, the prolog state machine starts at state 200. In addition, the address register 241 of FIG. 8 is initialized to a value of 0, pointing to entry 233 in the memory. State 200 remains active, following arc 201 back to itself, as long as condition C1 is met:

C1: is_ascii and (next_char[6 . . . 0]==memory[address].expected) and (memory[address].last==0)

where next_char is the next 21-bit character from the input document, is_ascii is the condition that verifies that the top 14 bits of the next_char are all zero, as described above, next_char[6.0] is the bottom 7 bits of the next character, memory is memory 242, address is address register 241, expected is the 7-bit field 232, and last is the 1-bit field 231. This indicates that as long as the next character in the input pattern is received, and the character is not the last in the pattern, state 200 remains active.

The address register 241 increments after each received input character. So, after the initial character "<" of the prolog is received, address register 241 will now contain 1.

State 200 follows transition 202 to state 203 under condition C2, which is defined as:

C2: is_ascii and (next_char[6 . . . 0]==memory[address].expected) and (memory[address].last ==1)

This indicates that the last expected character in the pattern has been received, which is entry 234 of FIG. 8. At this point, the pattern "<?xml" has been received, and address register 241 now, contains 5, pointing to entry 235 of FIG. 8 in memory 242. So, the memory is ready to compare the next expected pattern of "version"

State 204 collects one whitespace, which is mandatory, which causes transition 204 to state 205, and then state 205 collects any further optional whitespace. Transition 206 to state 207 occurs under condition C3, which is defined as:

C3: is_ascii and (next_char[6 . . . 0]==memory[address].expected) Note that it is not necessary to check the last flag, as it is known that the next pattern has more than one character in it. State 207 repeats the logic described above for state 200 to accept the pattern "version". The next set of states after 207 (up to state 208) then accept the version number as in the prior art example.

State 208 accepts optional whitespace after the version field has been fully parsed (transition 209), and reacts to the optional end of the XML prolog (transition 218). State 210 accepts additional optional whitespace after the version. The set of transitions out of state 210 are special in that the "encoding" field is optional, as is the "standalone" field. However, if both are present, "encoding" must come first. Transition 211 to state 212 will result if the input character is an "e", which matches entry 237 in the memory of FIG. 8. This indicates that "encoding" is expected. Transition 213 is followed if the input character is an "s", leading to state 214. Note that this transition uses a comparison against a fixed 7-bit value instead of the comparing to an entry in memory 242. This is because address register 241 is being used to point to entry 237, since two different patterns can occur at this point in time. If transition 213 is taken, address register 241 is incremented by 9 instead of by the usual 1 to point to entry 243 of FIG. 8, which is the "t" in "standalone", since the "s" has just been received. Then, state 214 can follow the rest of the pattern using memory 242 as described above. As a third possibility, transition 215 can be followed if a "?" is received, again using a hard-coded comparison value (which can be less than 7 bits if the character has been encoded using one of the special character codes of Table 3) instead of memory 242. This indicates that neither "encoding" nor "standalone" is present.

Note that there are additional states (not shown) beyond state 216 to handle the rest of the encoding field after the "=", plus further states for the optional standalone field; and there are additional states after state 217 (not shown) to handle the rest of the standalone field after the "=". In addition, error transitions for unexpected inputs out of every state are not shown. Typically these would go to an error state, indicating that the document is not correctly formatted.

Figure 9:
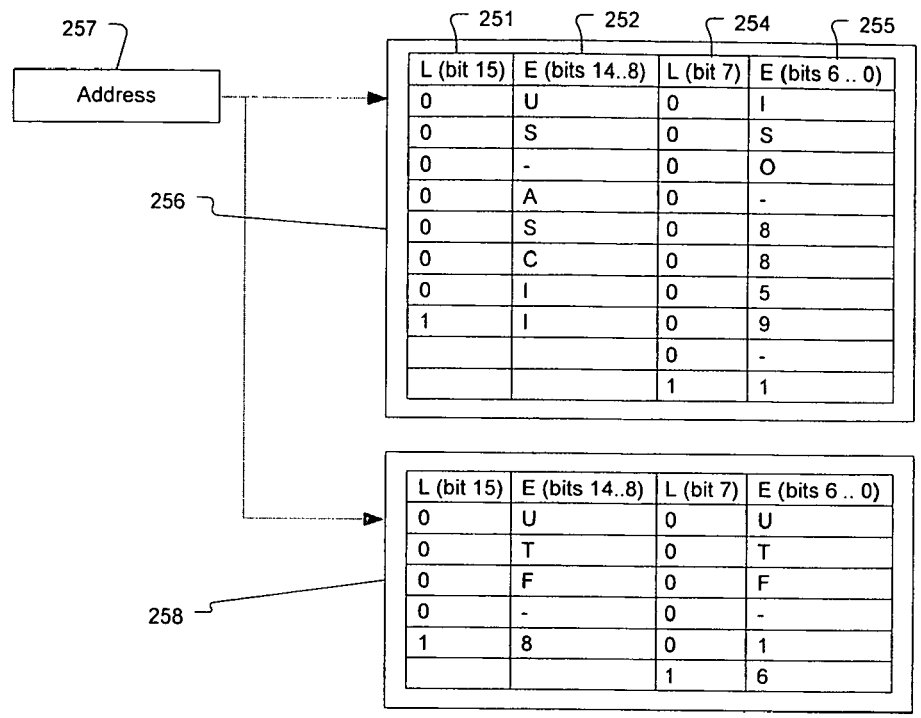
FIG. 9 shows the use of multiple memories in parallel.
Figure 10:
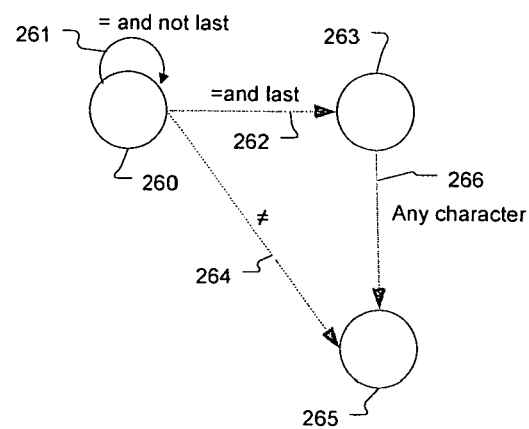
FIG. 10 shows the encoding name sub state machine.

FIG. 9 shows another use of memories to efficiently match multiple allowable patterns in parallel. For example, in the XML prolog, the encoding field has multiple valid values, such as "US-ASCII", "ISO-8859-1", "UTF-8", "UTF-16", etc. In FIG. 9, memory 256 is 16 bits wide, which allows two independent patterns to be stored in the same memory. Fields 251 (Last) and 252 (Expected) occupy the top 8 bits, and have the same usage as described for FIG. 8. Fields 254 (Last), and 255 (Expected) occupy the lower 8 bits, and have the same usage as described for FIG. 8. Note that an even wider memory could be utilized, allowing more patterns per memory. Memory 258 holds another two patterns. More memories (not shown) can be used to hold further patterns. All memories for the same purpose share a common address register 257, which is initialized to zero, thus pointing to the first character of each pattern being compared against. In the example of FIG. 9, when the encoding portion of the example prolog string is being parsed, once the leading quote (single or double) has been parsed, four sub-state machines can be enabled, each looking for a particular pattern. One state machine uses the top 8 bits of memory 256, one uses the bottom 8 bits of memory 256, one uses the top 8 bits of memory 258, and one uses the bottom 8 bits of memory 258. As input characters are received, the address register 257 is incremented. One instance of the sub-state machine is shown in FIG. 10. The initial state is state 260. This state remains active as long as the expected pattern continues to be received, and the last character of the pattern has not been found. This is shown in transition 261. When the last expected character has been seen, the state machine follows transition 262 to state 263. If an unexpected character not matching the pattern is seen, the state machine follows transition 264 to state 265. In state 263 (match state), any further character follows transition 266 to non-match state 265. The logic of using the memory to hold the expected pattern is similar to that described above. One exception is that for encoding names, lower or upper-case characters are acceptable. So, the comparison of the bottom 7 bits of the input character and the 7 bit expected pattern is done in a case-insensitive manner. Input characters in the range of 'a' through 'z' are first converted to 'A' through 'Z' before the comparison is performed. Also, the top 14 bits are checked to see if they are all zero as described earlier. When the parent state machine (such as in FIG. 7) receives the closing quote of the encoding name, it checks to see if any of its sub state machines of FIG. 10 have reached state 263, indicating a pattern match. Note that the last state reached is checked, not the current state upon the new input character (single or double quote). At most one sub-state machine can have reached the match upon the closing quote. If none have reached the match state, then the encoding name is invalid.

Figure 11:
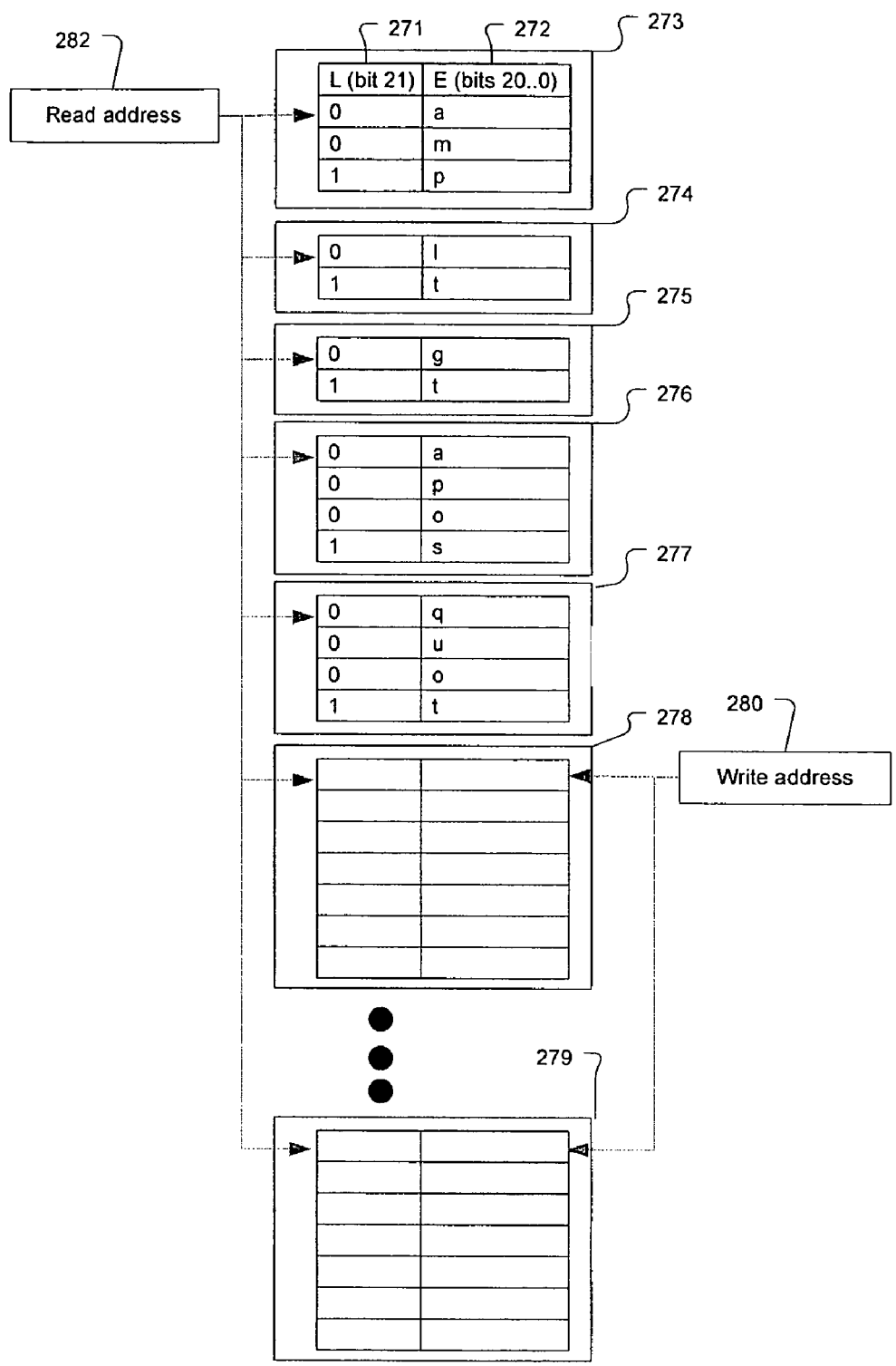
FIG. 11 shows parallel memories for entity names.

Another use of parallel memories is to efficiently match entity names that need to be expanded. In XML, a Document Type Definition (DTD) can be used to define an entity name with an associated pattern, and elsewhere in the XML document this entity name can be referenced, and must be expanded to the pattern. A highly efficient method is needed to quickly determine if a referenced entity name has been previously defined or not. In the preferred embodiment, support is provided for 21 entity definitions, five of which are pre-loaded with the pre-defined entity names as specified in the XML 1.0 specification, and 16 for dynamically declared entity definitions. This is shown in FIG. 11. Each memory, such as 273, has two fields: 1-bit last 271, and 21 bit expected value 272. This is as described earlier, except now the expected character is a full 21 bits wide, since entity names start with any valid name start character, followed by any valid name start or name character. The five pre-defined entity names use five memories 273, 274, 275, 276 and 277, and the memories are pre-loaded with the entity name, such as "amp" for memory 273. The other 16 dynamic entity buffers use 16 memories, such as 278 and 279 (only two of the 16 memories are shown). The dynamic memories share a common write address register 280. All 21 memories share a common read address register 282. Each memory has an associate sub-state machine for matching an entity name. A dynamic-use memory, such as 278, is loaded with the entity name when an entity declaration is parsed in the DTD. An associated write enable per dynamic memory (not shown) only enables one such selected dynamic memory to be loaded with the entity name. The final character of the name is marked as last. Other registers (not shown) indicate whether a dynamic memory has been used or not, so a free memory to be used can be found when a new entity declaration is found. Note that a reduced number (even only one) of wider memories with write masks could be used instead of a larger number of narrow memories.

When an entity name is later referenced, it must be determined whether the entity name is valid or not. This is done by using 21 sub state machines, one associated with each memory of FIG. 11. These state machines operate in a similar manner as described before in FIG. 10, using a common read address register 282 to match, in parallel, the received entity name. This allows a highly efficient method for matching the defined entity names, both pre-defined names and dynamically defined names.

The PAR Block 106 also utilizes another lookup table 105C, called the ISO-8859-1 character regularization table, to handle case folding, accent stripping etc. of characters when ISO-8859-1 encoding is used. This table 105C is used to regularize ISO-8859-1 characters with the top bit set (the bottom 128 characters, in the range of 0 to 127, can be handled by the tables described earlier). Special handling is done for ISO-8959-1 since it is a very common encoding scheme used today. The lookup table 105C has 128 entries of four bits wide, and is shown in Table 5. The four bits hold a code to indicate what the mapped character should be. This code is defined in Table 4 below. In Table 4, the CHAR_CODE field indicates the 4 bit value, in the range of 0 to 15 decimal. The encoding field indicates the output character(s) that is to be produced for the CHAR_CODE value, and the Unicode field gives the Unicode code point for the character(s). For example, for CHAR_CODE of 1, the character "i" is to be output in place of the input character. A CHAR_CODE of zero indicates that the input character is to be left alone. Note that for a CHAR_CODE of 3, two output characters are produced in place of a single input character.

TABLE 4

CHAR_CODE Encoding for lookup table 105C

| CHAR_CODE | Encoding | Unicode | Description |
| --- | --- | --- | --- |
| 0 | n/a | n/a | Interpreted as no character regularization necessary. |
| 1 | i | U+0069 | |
| 2 | a | U+0061 | |
| 3 | ae | U+0061 U+0065 | Multi-character output |
| 4 | c | U+0063 | |
| 5 | e | U+0065 | |
| 6 | n | U+006E | |
| 7 | o | U+006F | |
| 8 | u | U+0075 | |
| 9 | y | U+0079 | |
| 10-15 | n/a | n/a | Reserved |

Table 5 below shows the ISO-8859-1 character regularization table 105C, which is 4 bits wide, in order to hold a CHAR_CODE value as defined in Table 4 above. This table 105C is only use for ISO-8859-1 character with a code point of 80 hex or above, and 80 hex is subtracted from the code point (i.e. top bit set to zero) before indexing into the table. Note that indexes 80 hex through 9f hex are not shown, as these are invalid ISO-8859-1 characters, and the upstream logic that converts characters to internal 21-bit characters would have aborted the document is such a malformed character was seen. The table can be filled with 0 for these entries. As an example, for an ISO-8859-1 character of c0 hex, the lookup table 105C provides a value of 2, indicating that the input character should be replaced with an output character of "a" as per Table 4 above. This both folds the input upper case character to lower case, and strips the accent at the same time.

This scheme provides this functionality with a very small lookup memory. The ISO-8859-1 lookup table 105C provides an example of this regularization technique. Note that other such lookup tables can be used to handle other character encodings, and a larger lookup table can be used to handle pre-composed Unicode character regularization.

TABLE 5

ISO-8859-1 Character Regularization Table 105C

| Input ISO-8859-1 Character | 4-bit CHAR_CODE |
|---|---|
| U+0a0 ( ) | 0 |
| U+0a1 ( ¡ ) | 1 |
| U+0a2 (¢) | 0 |
| U+0a3 (£) | 0 |
| U+0a4 (¤) | 0 |
| U+0a5 (¥) | 0 |
| U+0a6 (¦) | 0 |
| U+0a7 (§) | 0 |
| U+0a8 (¨) | 0 |
| U+0a9 (©) | 0 |
| U+0aa (ª) | 0 |
| U+0ab («) | 0 |
| U+0ac (¬) | 0 |
| U+0ad (-) | 0 |
| U+0ae (®) | 0 |
| U+0af (¯) | 0 |
| U+0b0 (°) | 0 |
| U+0b1 (±) | 0 |
| U+0b2 (²) | 0 |
| U+0b3 (³) | 0 |
| U+0b4 (´) | 0 |
| U+0b5 (µ) | 0 |
| U+0b6 (¶) | 0 |
| U+0b7 (·) | 0 |
| U+0b8 (¸) | 0 |
| U+0b9 (¹) | 0 |
| U+0ba (º) | 0 |
| U+0bb (») | 0 |
| U+0bc (¼) | 0 |
| U+0bd (½) | 0 |
| U+0be (¾) | 0 |
| U+0bf (¿) | 0 |
| U+0c0 (À) | 2 |
| U+0c1 (Á) | 2 |
| U+0c2 (Â) | 2 |
| U+0c3 (Ã) | 2 |
| U+0c4 (Ä) | 2 |
| U+0c5 (Å) | 2 |
| U+0c6 (Æ) | 3 |
| U+0c7 (Ç) | 4 |
| U+0c8 (È) | 5 |
| U+0c9 (É) | 5 |
| U+0ca (Ê) | 5 |
| U+0cb (Ë) | 5 |
| U+0cc (Ì) | 1 |
| U+0cd (Í) | 1 |
| U+0ce (Î) | 1 |
| U+0cf (Ï) | 1 |
| U+0d0 (Ð) | 0 |
| U+0d1 (Ñ) | 6 |
| U+0d2 (Ò) | 7 |
| U+0d3 (Ó) | 7 |
| U+0d4 (Ô) | 7 |
| U+0d5 (Õ) | 7 |
| U+0d6 (Ö) | 7 |
| U+0d7 (×) | 0 |
| U+0d8 (Ø) | 0 |
| U+0d9 (Ù) | 8 |
| U+0da (Ú) | 8 |
| U+0db (Û) | 8 |
| U+0dc (Ü) | 8 |
| U+0dd (Ý) | 9 |
| U+0de (Þ) | 0 |
| U+0df (ß) | 0 |
| U+0e0 (à) | 2 |

TABLE 5-continued

ISO-8859-1 Character Regularization Table 105C

| Input ISO-8859-1 Character | 4-bit CHAR_CODE |
|---|---|
| U+0e1 (á) | 2 |
| U+0e2 (â) | 2 |
| U+0e3 (ã) | 2 |
| U+0e4 (ä) | 2 |
| U+0e5 (å) | 2 |
| U+0e6 (æ) | 3 |
| U+0e7 (ç) | 4 |
| U+0e8 (è) | 5 |
| U+0e9 (é) | 5 |
| U+0ea (ê) | 5 |
| U+0eb (ë) | 5 |
| U+0ec (ì) | 1 |
| U+0ed (í) | 1 |
| U+0ee (î) | 1 |
| U+0ef (ï) | 1 |
| U+0f0 (ð) | 0 |
| U+0f1 (ñ) | 6 |
| U+0f2 (ò) | 7 |
| U+0f3 (ó) | 7 |
| U+0f4 (ô) | 7 |
| U+0f5 (õ) | 7 |
| U+0f6 (ö) | 7 |
| U+0f7 (÷) | 0 |
| U+0f8 (ø) | 0 |
| U+0f9 (ù) | 8 |
| U+0fa (ú) | 8 |
| U+0fb (û) | 8 |
| U+0fc (ü) | 8 |
| U+0fd (ý) | 9 |
| U+0fe (þ) | 0 |
| U+0ff (ÿ) | 9 |

The PAR block 106 parses the entire XML document (in a streaming fashion) and produces a stream of output events 141 to the next block, the Tag Processing (TAP) block 107 of FIG. 5. Characters that are output by the PAR block 106 are converted first to UTF-8, using well-known methods. This means that from this point on, each character is a stream of bytes, and each character is encoded in 1 to 4 bytes, depending on the 21-bit Unicode value to be encoded. Along with each byte of the character is a 5 bit classification code, indicating boundaries of interest to the downstream block. Table 6 below shows the main output signals 141 of the PAR block.

TABLE 6

Main Output Signals 141 of PAR Block

| Signal Name | Description |
|---|---|
| CHAR | XML Document Character (encoded in UTF-8). Sent one byte at a time, along with the information below. |
| CLASS | Character Classification. |
| | Bit    Character Attribute |
| | 5    Start/End boundary type<br>    0 indicates a start for that classification type<br>    1 indicates an end for that classification type |
| | 4:0    Classification Code (see table below) |
| | Code    Character Attribute |
| | 0    Start Tag boundary |
| | 1    Empty Tag Boundary (note that due to the nature of Empty Tag syntax, this code can only be an end boundary) |

TABLE 6-continued

Main Output Signals 141 of PAR Block

| Signal Name | Description | |
|---|---|---|
| | 2 | End Tag boundary |
| | 3 | Element Name (Namespace Prefix) boundary |
| | 4 | Element Name boundary |
| | 5 | Attribute Name (Namespace Prefix) boundary |
| | 6 | Attribute Name boundary |
| | 7 | Attribute Value boundary |
| | 8 | Namespace Declaration Boundary |
| | 9 | Namespace Declaration Value Boundary |
| | 10 | Word Boundary (within content) |
| | 11-15 | Reserved |
| DOC_ID | Document ID. This is the host processor assigned document ID that is carried with the document through all processing. | |
| ERROR_CODE | Error Code. This field contains information about the first error that has occurred before this point in the processing of the document. | |
| BYTE_COUNT | Document Byte Count. | |

The PAR Block 106 completely parses all markup in the XML document, and only sends downstream markup that the downstream blocks require. In addition, within the character stream 141 sent, boundaries of interest are marked. Markup such as processing instructions and comments are stripped by the PAR block 106, markup such as entity references are replaced by the defined entity text, the prolog and the DTD are completely removed. The boundaries of tags, along with the boundaries of the prefix portion, the boundaries of attribute names and values within tags are marked so that the downstream block does not have to parse to find these boundaries. The tag encapsulation characters "<" and "/>" are stripped, since the classification code now indicates such boundaries. In the text portion of elements, all white space are removed, and the start and end boundary of each word is indicated. Within attribute values, all leading and trailing white space are removed, and white space between words is normalized to a single space character. Note that the characters of tag names and attribute names are not regularized, but the characters within element text and attribute values are normalized (e.g. case folded, accents stripped), using the lookup tables previously described. In addition, the parser has taken care of ensuring that the input XML document is well formed, with a few exceptions: It has not yet been verified that the element name in the end tag matches the name in the start tag, it has not been verified that all namespace prefixes used are properly defined, and it has not yet been verified that fully expanded attribute names within an element are unique. These checks are the responsibility of the Tag processing (TAP) block 107 of FIG. 5.

The TAP block 107 receives the character stream and associated data 141 shown in Table 6 above. The TAP block 107 is responsible for producing unique numeric handles for each of the elements within the document (element names and attribute names). Note that XML namespaces are supported and each element is properly expanded with the active or declared namespace. Part of this process requires that the TAP block 107 be aware of the hierarchy within the document and will perform some of the well-formedness checks that the parser is unable to complete (e.g. start/end tag name consistency). The process of producing handles involves doing a lookup of that element in an element handle table.

There are several prior art ways of doing word lookup in a table. This invention uses what is known in that art as a hash look-up. The elements being looked-up up consist of words of UTF-8 characters. For a given element, a hash value is computed and looked up in the element hash table (via Element Lookup Unit 108). A hash table lookup returns an element handle and some associated data. The detailed description of how such a circuit is implemented is considered prior art and is not discussed further.

As part of resolving namespace prefixes to create expanded names for tag and attribute names, the TAP block 107 uses parallel memories in a similar manner to those described above for entity name handling (FIG. 11). This allows rapid parallel matching of a namespace prefix reference to the associated namespace string.

The hash calculated by the TAP block 107 (described above) is dispatched to the Element Lookup Unit 108. The Element Lookup Unit 108 is responsible for performing the hash lookup and resolving any collisions that could have occurred. The handle and associated data resulting from the hash lookup is returned to the TAP block 107 which then replaces the element name characters with the retrieved handle. For element names, events are always sent out regardless of the success of the lookup (one non-match handle is reserved for those that do not succeed). Attribute names and their associated attribute values that do not produce a match are consumed by the TAP block 107. In the special case where the handle match is not of VALID_ELEMENT_HANDLE type, the general case 'no match found' handle is produced. In all other cases, the handle returned by the Element Lookup Unit 108 is used.

The result of a successful look-up of an element or attribute name by the Element Lookup Unit 108 is a unique handle number. In the case where a handle for an attribute is matched, a set of flags are also returned. Table 7 details the results returned from Element Lookup Unit 108 of an element or attribute lookup. The values of the various flags are set by CPU 71 when the lookup entries are being populated and take into consideration the reference to the various attributes found in the XPEs. Note that if there is no matching handle for an element name, a special reserved handle with a value of 0 is used to represent an unknown element. This is done since in an XPE a step of * (wildcard) can be used to match any element, and thus unknown elements (i.e. not specifically named in any XPE) must still generate a handle to potentially match against a wildcard.

TABLE 7

Detailed Results of Element Lookup returned from Element Lookup Unit 108

| Element or attribute look-up result fields | Description |
|---|---|
| HAS_EXISTENCE_CHECK | This bit is set for attributes that have one or more subscriptions that perform existence checks on the attribute (i.e. they don't care about the value of the attribute, but they do care that the attribute is present) |

TABLE 7-continued

Detailed Results of Element Lookup returned from Element Lookup Unit 108

| Element or attribute look-up result fields | Description |
| --- | --- |
| HAS_ATTR_TEXT_COMP | This bit is set for attribute names that have a text comparison that some subscription cares about. |
| HAS_NUM_COMP | This bit is set for attribute names that have a numerical comparison that some subscription cares about. When this bit is set, there must be a valid NUMERICAL_RANGE_TBL_ROOT_INDEX. This bit is set for element names when there is a numerical comparison being performed by one or more subscriptions in the text area of the element. |
| NUMERICAL_RANGE_TBL_ROOT_INDEX | The index to the root of the numerical range table (see Table 14 below), only valid if HAS_NUM_COMP flag set. |
| HANDLE | The element or attribute handle to be produced. |

The use of numeric handles instead of element or attribute name strings serves to greatly reduce the amount of data that must be passed to downstream processing blocks, since instead of a potentially very long string of characters (especially in the presence of namespaces), a small numeric handle and a small number of associated flags is instead generated. In addition, in an NFA, there are normally many active states, and a new stimulus such as a new element must be passed to each state to be processed. Instead of passing an entire tag string as in the prior art, the numeric handle is instead generated once and processed in each state, resulting in much more efficient processing.

The TAP Block 107, after having resolved all tag names, produces a modified event stream 142 to the next downstream block. The main outputs 142 are a message type and associated data, as shown in Table 8 below. At this point, element names and attribute names have been converted to numeric handle values.

TABLE 8

Main Output Signals 142 of TAP Block 107

| Signal Name | Description |
| --- | --- |
| MSG_TYPE | Message Type. This field indicates the type of data being passed across this interface.<br><br>Encoding  Event Type<br><br>0  Start Document Event<br>1  End Document Event<br>2  Start Element Event<br>3  End Element Event<br>4  Start Word Character<br>5  End Word Character<br>6  Start Attribute Value Character<br>7  End Attribute Value Character<br>8  Character<br>9  Attribute Name Event<br>10  Abort Document Event<br>11-15  Reserved |
| DATA | This field carries different data depending on the message type. The following table shows data elements sent for the various message types.<br><br>Message Type  MSG_TYPE  DATA<br><br>All Document Event  0, 1, 10  Unused<br>Start Element Event  2  Element handle<br>End Element Event  3  Unused<br>All Character Events  4, 5, 6, 7, 8  UTF8 character<br>Attribute Name  9  Attribute name |

TABLE 8-continued

Main Output Signals 142 of TAP Block 107

| Signal Name | Description |
| --- | --- |
|  | Event handle, Attribute has existence check (1 bit flag), Attribute has a numerical comparison (1 bit flag), Numerical range table root index, Attribute name existence match (1 bit flag) |
| DOC_ID | Document ID. This is the host processor assigned document ID that is carried with the document through all processing. |
| ERROR_CODE | Error Code. This field contains information about the first error that has occurred before this point in the processing of the document. |

The Word Processing (WP) block 110 of FIG. 5 identifies words in the various sections of the document (content and attribute values, the latter is treated as one logical word) that produce a word or prefix match event. The WP 110 generates as many look-up per word as there are characters in a word. For example, if a word "technology" is present in the document, a look-up key will be calculated byte by byte of the UTF-8 byte stream for the word, and after each byte a lookup is dispatched to the Word Look-up Unit 111. This allows a full word match to occur, or a prefix match. For example, a subscription may request a match for the word "tech*", where the asterisk is taken to mean a wildcard match for the balance of the word. Another subscription may be requesting a match for the word "technology". In the word look-up unit 111, an entry will be populated for the string "tech" and for the string "technology". The WP block 110 is also responsible for recognizing floating point (FP) numbers in the attribute value sections of the document (and in certain cases, content sections of the document as well), converting it to a numerical format and sending FP events to the Attribute Value Processing (AVP) block 113.

The Word Look-up Unit 111 performs the hash lookup similar to the Element Look-up Unit 108. A search key is generated by the WP 110 for every prefix of a word. The generation consists of computing a hash function against the prefixes. The keys are then passed to the Word Look-up Unit 111. Again the details of the hash look-up is considered prior art and is not explained further. The result of the lookup consists of a word handle and a set of flags used by subsequent steps of the document processing process. The WP block 110 then forwards the matching word events to the Attribute Value Processing (AVP) block 113. The WP block 110 will consume any words that do not produce a match. For attribute value lookups that do not produce a match, the entire name-value pair is consumed unless the "attribute existence flag" is set in which case only the attribute value is consumed.

In the prior art for text searching, many different algorithms have been in use. An overview of the prior art, along with a proposed algorithm for signature matching in intrusion detection systems, is given in "Exclusion-based Signature Matching for Intrusion Detection", E. Markatos, S. Antonatos, M. Polychronakis, K. Anagnostakis, IASTED International Conference on Communications and Computer Networks (CCN), 2002; and in "Deterministic Memory-Efficient String Matching Algorithms for Intrusion Detection", N. Tuck, T. Sherwood, B. Calder, G. Varghese. Many of the algorithms assume a smaller set of patterns to be matched, such as up to two thousand, as opposed to the very large number of patterns that can be sought by a large number of subscriptions in a content routing network. Because of the very large number of patterns, external memory typically has to be used, as opposed to using on-chip memory to hold data structures for a small set of patterns.

Another example of prior art is found in "Deep Packet Inspection using Parallel Bloom Filters", S. Dharmapurikar, P. Krishnamurthy, T. Sproull, J. Lockwood, IEEE Micro, Volume 24, Issue 1, Pages 52-61, Jan-February 2004. This paper cites an FPGA prototype that searches for 10,000 intrusion detection patterns at a rate of 2.4 Gbps. While this approach may be suitable for intrusion detection, it has a number of shortcomings for content routing applications: the number of search patterns is far too low, and a large amount of FPGA internal memory is consumed, which is suitable for a dedicated FPGA for just this purpose, but not when this function is only one of several needed to be implemented as part of a larger content routing engine.

Another technique to search for a large number of patterns is to construct a finite automaton, as is known in the art, where each new input character is applied against the current state, and a transition is followed to the next state if such a transition exists for the input character. Such a structure can be used to hold a large number of search patterns. An issue with this approach when using external memories is that there is a large latency time between when a read operation is done to the external memory, and the result is returned. Since the next active state depends upon the value of the lookup returned, the next input character cannot be handled until the previous memory read completes. This is true for other data structure approaches such as a trie. On-chip memory is suitable, but this limits the number of search patterns supported to an unacceptably small level.

With the hash used in the WP block 110 described above, a lookup can be dispatched to the Word Look-up Unit 111, and upon receiving the next character (on the next clock cycle for single byte characters), another hash lookup can be dispatched, without waiting for the results from any previous hash lookups. This is because each hash lookup is independent, and the results from one are not needed for any subsequent lookups. This allows lookups to be dispatched at a high rate, without being affected by the relatively long access latencies to external memory.

The format of the information stored in the hash table managed by the Word Lookup Unit 111 is now described. Table 9 below shows common data which is used in the hash table. Each entry has a unique numeric handle to represent the word (when matched). A set of flags provide rules on the use of the entry, such as whether it applies to the text areas of the document, whether it applies to the attribute areas of the document, and whether a prefix match is allowed (vs. only a full match, i.e. must be at the end of the word boundary when the lookup occurs). The structure of Table 9 is returned upon a successful lookup.

TABLE 9

Word Look-up results data structure returned from Word Lookup Unit 111

| CIS Field | Description |
| --- | --- |
| WORD_MATCH_ALLOWED | This bit is set to one if there is a subscription that is searching for this word within a text area of the document. |
| ATTR_VALUE_ALLOWED | This bit is set to one if there is a subscription that is searching for this word within an attribute value. This bit prevents the generation of word events for words that are only relevant to attribute values. |
| PREFIX_ALLOWED | This bit is set if the match is allowed to be a prefix. For example, if the entry represents the word "cold" and at least one subscription is searching for "cold*", then this bit would be set to indicate that a prefix match is allowed to occur. |
| HANDLE | The word handle produced. A unique handle for each unique word referenced by at least one subscription. |

When a match is found by the Word Look-up Unit 111 a final check must be performed to ensure that the match is valid. If the lookup was for a prefix (i.e. before the last character of the word was reached), then the PREFIX_ALLOWED flag must be set, indicating that at least one subscription is interested in this prefix match. If the word comes from the text portion of an element, then the WORD_VALUE_ALLOWED flag must be set, indicating that at least one subscription is interested in this word in an element text. If the word comes from an attribute value, then the ATTR_VALUE_ALLOWED flag must be set, indicating that at least one subscription is interested in this word in the value of an attribute.

In parallel to the above word matching, the WP block 110 also attempts to convert the entire text area of an element, or the entire value of an attribute, to a floating point number. This is carried out if the character sequence represents a valid floating point number, such as "123.45". A valid floating point number is a sequence of characters including a leading (optional) "+" or "−" sign, digits 0 through 9, and a single (optional) decimal point, followed by more digits 0 through 9. In addition, a single "," can be used instead as a decimal point (European style). As an example, in the sample XML document above, there is an element "<Total currency="USD">323.56</Total>". In this case, the text "323.56" can be successfully converted to a floating point number, in parallel with the hashing algorithm described above. This floating point number can be used for numerical comparisons against attribute values or element text by the Attribute Value Processing (AVP) block 113 of FIG. 5. The floating point value, if one is produced, is in extended precision floating point number representation. Note that when a floating point number is successfully created from the text area of an element, it is treated as if it came from an anonymous attribute of the element so that the AVP block 113 can treat all such numeric values in a consistent manner. A reserved attribute handle is used to represent the anonymous attribute.

The main output 143 of the WP block 110 is shown in Table 10 below. At this point, all character data has been removed, and has been replaced with any resulting word events, word prefix events, attribute value events, and floating point events.

TABLE 10

Main Output Signals 143 of WP Block 110

| Signal Name | Description |
|---|---|
| MSG_TYPE | Message Type. This field indicates the type of data being passed across this interface. |
| | Encoding   Event Type |
| | 0   Start Document Event |
| | 1   End Document Event |
| | 2   Start Element Event |
| | 3   End Element Event |
| | 4   Word Event |
| | 5   Word Prefix Event |
| | 6   Attribute Name Event |
| | 7   Attribute Value Event |
| | 8   Floating Point (FP) Event |
| | 9   Abort Document Event |
| | 10-15   Reserved |
| DATA | This field carries a different handle type depending on the message type. The following table shows the format. |
| | Message Type   MSG_TYPE   DATA |
| | All Document Events   0, 1, 9   Unused |
| | Start Element Event   2   Element handle |
| | End Element Event   3   Unused |
| | Word Events   4, 5   Word handle |
| | Attribute Name Event   6   Attribute name handle, Attribute has a numerical comparison (1-bit flag), Numerical range table root index, Attribute existence match (1-bit flag) |
| | Attribute Value Event   7   Attribute value handle |
| | FP Event   8   Floating point number |
| DOC_ID | Document ID. This is the host processor assigned document ID that is carried with the document through all processing. |

TABLE 10-continued

Main Output Signals 143 of WP Block 110

| Signal Name | Description |
|---|---|
| ERROR_CODE | Error Code. This field contains information about the first error that has occurred before this point in the processing of the document. |

The Attribute Value Processing (AVP) block 113 of FIG. 5 is responsible for identifying attribute value matches for (attribute name, attribute value handle) pairs as well as identifying attribute value range matches for numerical comparisons. For attribute and attribute value text, this process is essentially the combination of the previously calculated attribute name handle and attribute value handle into a single lookup. The lookup is performed by calculating a hash function over the combined attribute name handle and attribute value handle. The hash table contains an entry for every (attribute handle name, attribute value handle) pair that at least one subscription is looking for. Note only equality operators are supported. This hash along with any floating point (FP) events received is sent to the Attribute Look-up Unit 114 for resolution.

Attribute value range matches are also resolved by the Attribute Look-up Unit 114. The FP events are resolved using the attribute value numerical range table (ANRT) 109, described below. The final attribute value match results are sent back to the AVP block 113 which dispatches the match events to the NFA block 119.

The AVP Block 113 also checks for numeric comparisons (floating point) when one or more subscriptions has requested a numeric comparison against a given attribute name or element tag name. This is done in parallel with the lookups in the attribute look-up described above. The numerical processing is done using an Attribute Numerical Range Table (ANRT) 109. Note that this table is used also for numerical comparisons in the text portion of element tags; this is treated as a logical anonymous attribute within the element as explained earlier. A special attribute handle is reserved for this purpose, and generated by the WP block 110.

The ANRT 109 groups all numerical comparisons on a given attribute name (represented by a unique handle for the attribute name). For example, consider the set of subscriptions in Table 11 below, which are all the subscription that reference attribute "attr1":

TABLE 11

Example Subscriptions Involving Numerical Comparison

| Subscription Number | XPath Expression |
|---|---|
| 1 | /a[@attr1 > 5] |
| 2 | /b[@attr1 = 2] |
| 3 | /c/d[@attr1 < 10] |
| 4 | /a[@attr1 >= 8] |
| 5 | /a[@attr1 < 5]/e |

The subscriptions are converted to a set of ranges, uses the notation that "[" and "]" indicates that the range endpoint in inclusive, and "(" and ")" indicates that the range endpoint is exclusive. For example, (5, 10] he range is 5<x<=10. The resulting set of ranges is shown in Table 12 below. Each unique set of subscriptions (in the "Subscriptions Satisfied by Range" column below) is given its own unique attribute match handle.

TABLE 12

Example Numerical Ranges

| Range | Subscriptions Satisfied by Range |
|---|---|
| [−∞, 2) | 3, 5 |
| [2, 2] | 2, 3, 5 |
| (2, 5) | 3, 5 |
| [5, 5] | 3 |
| (5, 8) | 1, 3 |
| [8, 10) | 1, 3, 4 |
| [10, ∞] | 1, 4 |

Figure 12:
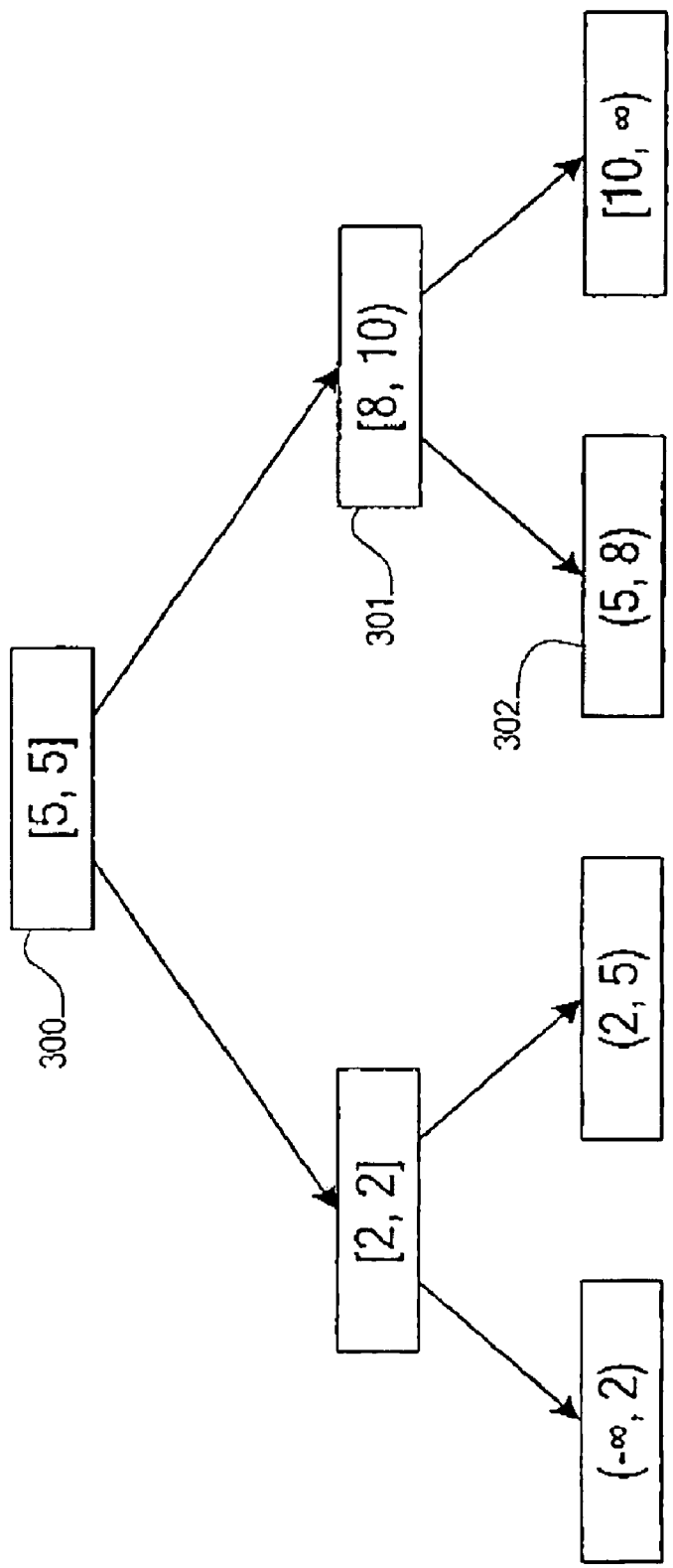
FIG. 12 shows a prior art balanced binary tree.

The ranges could be kept in a simple balanced binary tree, as is known in the art. An example of such a tree is shown in FIG. 12. At runtime, when a document specifies, for example, the attr1=7, searched to find the range that satisfies that attribute value. In this case, the root node 300 would be checked. Since 7 falls outside of its range on the high side, the right-hand child node 301 must be checked. 7 is still outside this range, but this time it is on the low side. The left-hand child node 302 is then checked and a match is found. The Attribute Match handle associated with that entry is retrieved. An issue with this prior art implementation is that the tree must be kept in external memory due to the very large number of subscriptions to be supported in a Content Routed network application. Memory latency becomes a major issue when traversing such a tree, since when a child node must be checked, a new probe to memory is done, and the results must come back before further traversal of the tree can be performed. This causes low performance.

Figure 13:
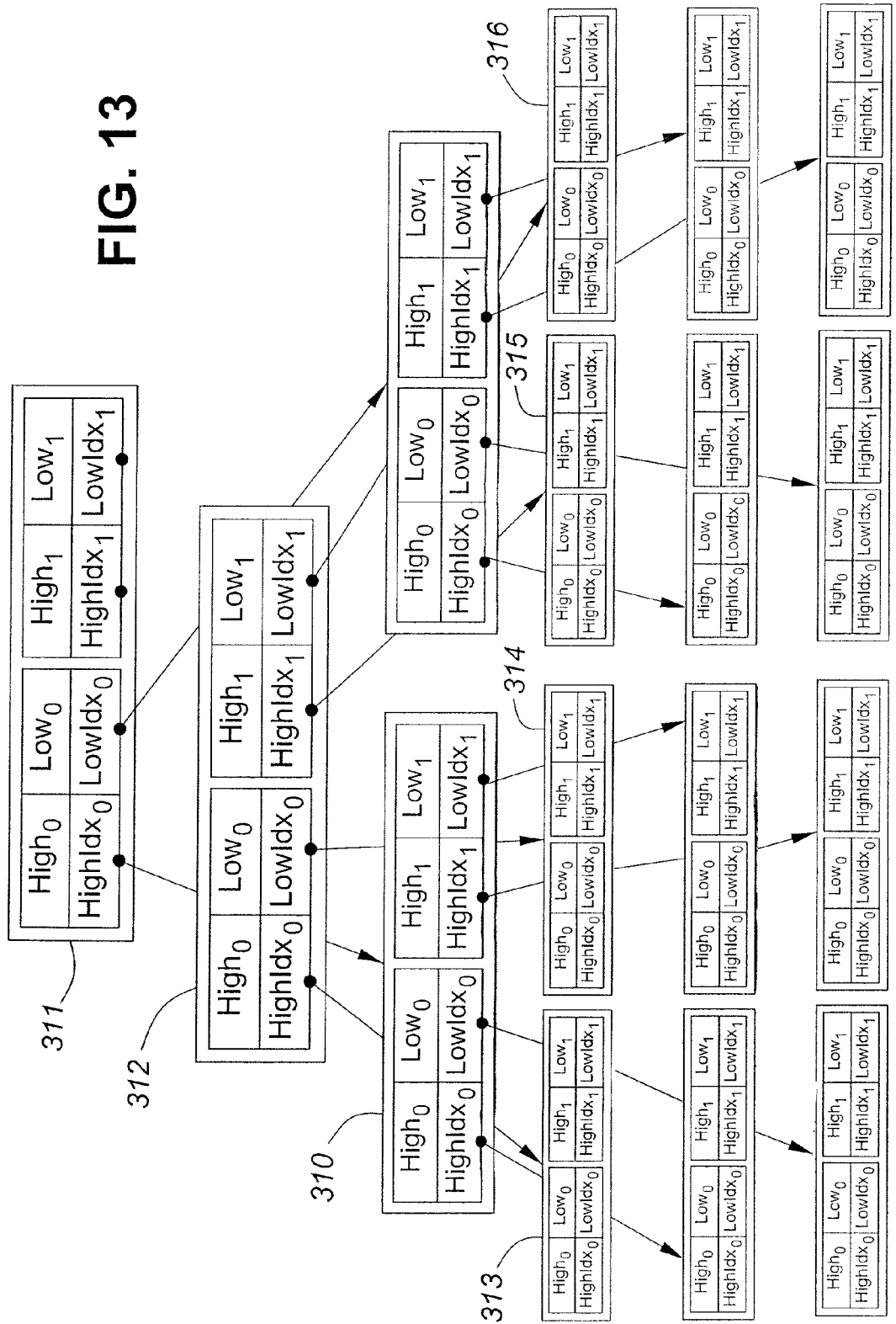
FIG. 13 shows the attribute numerical range table.

The ANRT 109 instead uses an optimized tree which improves efficiency by hiding some of the memory latency when reading tree node from the external memory. The ANRT optimized tree is shown in FIG. 13. Note that in all figures involving the ANRT, the high range is on the left, and the low range is on the right, of a range pair. Key differences between the ANRT tree storage and a normal binary tree are:

1. Immediate siblings are kept in the same ANRT entry, such as entry 310. This means that each entry has two ranges. Each entry still has two children, but these children each contain two ranges as well
2. The root node 311 only uses the first location within an ANRT entry, i.e. only entry 0 of the root node is used, and not entry 1.
3. The root node 311 and its child entry 312 are kept in contiguous memory within the ANRT.
4. Each entry contains pointers to its four grandchildren and does not contain any pointers to its children. For example, entry 312 has pointers to its four grandchildren 313, 314, 315, and 316.

By keeping siblings within the same ANRT entry and having pointers to the grandchildren, the logic does not have to wait until the comparisons are done on a node before fetching that node's child. A node can be read from memory and then its child entry can be read immediately. This cuts the read memory latency in half, doubling runtime performance. Since a parent does not contain pointers to its children, the root node and its child entry must be stored in contiguous memory within the ANRT so that it is possible to know the address of the root's child.

Figure 14:
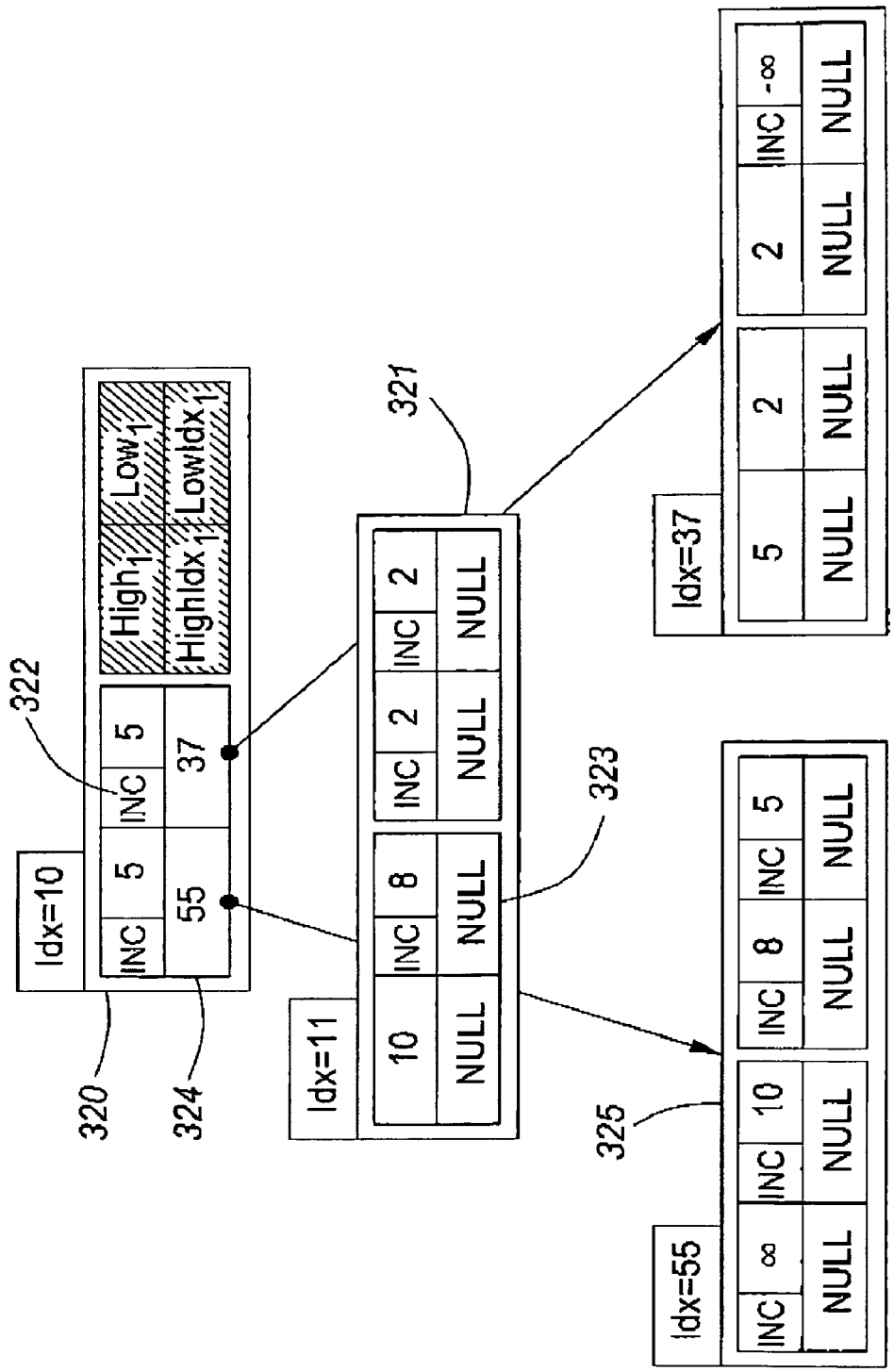
FIG. 14 shows an example of one attribute numerical comparison tree.

FIG. 14 shows one example of an ANRT tree, using the example subscriptions of Table 11 above, and the resulting numerical ranges of Table 12 above. The root node 320 is at index 10 within the ANRT. This index is provided by the result of the element look-up done in the TAP 107 block (NUMERICAL_RANGE_TBL_ROOT_INDEX of Table 7). Note that the root node's child 321 is always in the next ANRT entry, contiguous in memory. In this example it is index 11. Note that only entry 0 of the root node 320 is used. In the ANRT entry, the INC field 322 indicates that the range field is inclusive. A grandchildren pointer value of NULL, such as 323, indicates that there are no grandchildren to point to. In this example, in the worst case the logic would have to perform 3 memory reads to find the answer.

Repeating the example of a document having "attr1=7", a search for 7 is performed in the ANRT example of FIG. 14. Previously, the TAP block would have resolved attribute name "attr1" to a unique attribute name handle, and since there are numerical comparisons associated with this attribute, the root index value of 10 would also have been provided along with the handle. A read of the root entry 320 at index 10 is dispatched to the external memory, immediately followed by a read to the entry at index 11, contiguous in memory. Since the two entries are contiguous in memory, the read of the entry 321 at index 11 can be dispatched before the read result from the entry 320 at index 10 is returned from memory. When the read result of entry 320 is returned from memory, the ranges of entry 0 are examined (left side of the entry 320 in the figure). Since the search value of 7 is on the high side of the range (5, 5], the high grandchild pointer 324 is used, which contains an index of 55. A memory read of ANRT entry 325 at index 55 is issued, in a speculative manner. The read is speculative since it is not known if this entry will be needed until the entry 321, for which a read was earlier dispatched to memory, is processed. However, the speculative dispatch is key to reducing memory latency. When the read for ANRT entry 321 returns from memory, sub-entry 0 is consulted, since the high side is needed due to the earlier range compare of ANRT entry 320. The search value 7 is outside of the range [8, 10) on the low side, so the low side of the child of ANRT entry 321 (grandchild of ANRT entry 320) is needed. A read of this ANRT entry has already been earlier dispatched to memory. When the read of ANRT entry 321 returns from memory, the range of sub-index 1 is consulted, since the parent range compare was out of range on the high side. The search value of 7 falls within the range (5, 8), so the matching range has been found. The Attribute Match handle associated with that sub-entry 1 of ANRT entry 321 is retrieved.

Figure 15:
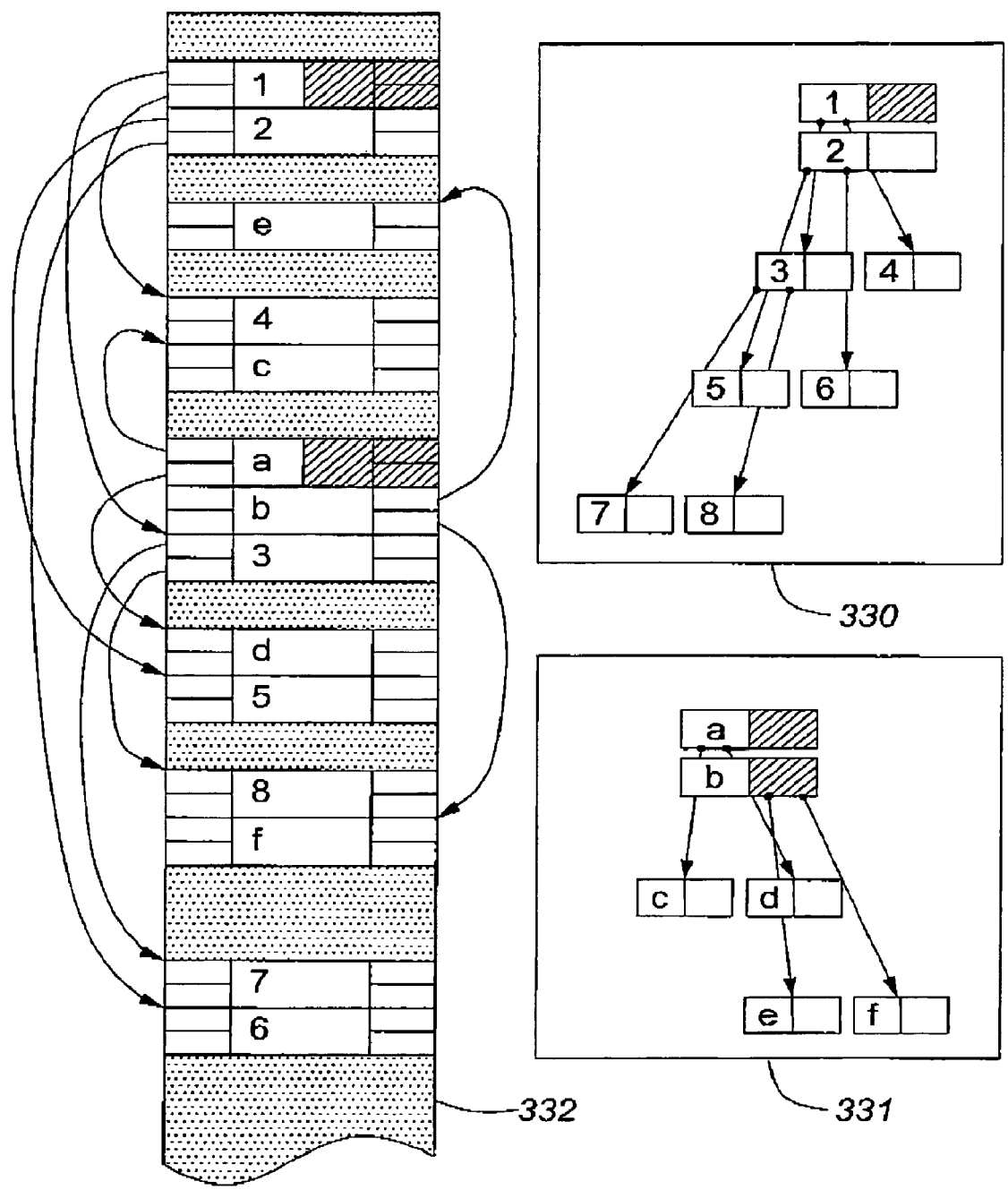
FIG. 15 shows an example of two attribute numerical comparison trees stored in memory.

FIG. 15 provides an example of two independent attribute numerical comparison trees, 330 and 331, representing numerical comparisons against two different attribute handles, being stored in the ANRT table 332 of FIG. 15. It should be noted that there is no requirement for the trees to be balanced, but if the trees become too unbalanced the lookup performance will suffer unnecessarily. The controlling software running on CPU 71 of FIG. 3 can utilize a re-balance threshold, to decide when a given tree has become too unbalanced and must be re-balanced. When re-balancing is necessary, a new tree can be constructed in the background into the memory, and when it is ready to be used by the hardware, the NUMERICAL_RANGE_TBL_ROOT_INDEX value of the newly created tree simply has to be written to the Element Hash Table, and the hardware will begin to use the new, balanced tree for the attribute handle involved.

Table 13 below shows the Attribute Range Information Structure (ARIS), which is used in the ANRT 109 table entry.

TABLE 13

Attribute Range Information Structure (ARIS) Format used in ANRT 109

| ARIS Field | Description |
| --- | --- |
| HIGH_CHILD_VALID | Set if the child of this entry on the high side is valid |
| LOW_CHILD_VALID | Set if the child of this entry on the low side is valid |
| RANGE_HIGH | Extended Single precision floating point number representing the high endpoint of this entries range |
| RANGE_LOW | Extended Single precision floating point number representing the low endpoint of this entries range |
| INCLUSIVE_HIGH | Set if the high end of the range is inclusive |
| INCLUSIVE_LOW | Set if the low end of the range is inclusive |
| ATTR_MATCH_HANDLE | Attribute match handle. This handle represents the list of subscriptions that are satisfied by this range |
| GRANDCHILD_IDX_HIGH | Pointer to the child entry of this node's high child |
| GRANDCHILD_IDX_LOW | Pointer to the child entry of this node's low child |

Table 14 below shows the format of an Attribute Numerical Range Table (ANRT) 109 entry. A table of such entries is stored in memory.

TABLE 14

Attribute Numerical Range Table 109 Entry Format

| ANRT Field | Description |
| --- | --- |
| ATTR_RANGE_INFO_0 | Contains a single Attribute Range Information Structure (see Table 13 above for ARIS contents). |
| ATTR_RANGE_INFO_1 | Contains a single Attribute Range Information Structure (see Table 13 above for ARIS contents). |

The main outputs 117 of the AVP block 113 of FIG. 5 are shown in Table 15 below.

TABLE 15

Main Output Signals 117 of AVP Block 113

| Signal Name | Description |
| --- | --- |
| EVENT_TYPE | This signal carries the event type. The encoding is:<br>Encoding  Event<br>0  Start Document Event<br>1  End Document Event<br>2  Start Element Event<br>3  End Element Event<br>4  Word Event<br>5  Word Prefix Event<br>6  Attribute Match Event<br>7  Abort Document Event<br>8-15  Reserved |
| DATA | This signal contains the data that is associated to the event. The data type depends on the event type. The following table indicates the associated data type for each event.<br>Message Type  EVENT_TYPE  DATA<br><br>All Document Events  0, 1, 7  Unused<br>Start Element Event  2  Element handle<br>End Element Event  3  Unused<br>Word Events  4, 5  Word handle<br>Attribute Match Event  6  Attribute match handle |
| DOC_ID | Document ID. This is the host processor assigned document ID that is carried with the document through all processing. |
| ERROR_CODE | Error Code. This field contains information about the first error that has occurred before this point in the processing of the document. |

The NFB block 119 is responsible for receiving XML document events and performing an NFA state machine in order to determine if these events match the structural portion of subscriptions (i.e. the NFB block 119 is not involved in matching portions of subscriptions that involve attribute values (word or numeric) or tests for existence of attributes, nor is it involved in text matches). However, the NFB block 119 is responsible for informing the Word and Attribute Match (WAM) block 123 about which states are interested in word and attribute matching. It is also responsible for informing the Results Collection (RCB) block 129 when transaction states are entered and when structural matches occur. The NFB block 119 is based on the prior art [YFILTER] referenced earlier (structural matching aspects of [YFILTER] only, not predicate handling). However, the NFB block 119 has significant new algorithms to allow the NFA to be implemented very efficiently.

The NFA states, and allowed transitions between states, are stored and referenced using the NFB Look-up unit 121. The NFB State Information Structure is shown in Table 16 below. A key change from a standard NFA is that a self loop state, and the preceding state which leads to the self loop state with an empty (epsilon) transition, are collapsed into a single NFB State Information Structure entry in memory. This allows optimized access to both states, since by definition an empty (epsilon) transition can be immediately taken, as is known in the art for non-finite automaton, and so the data for both states is initially needed at the same time. For example, in the NFA example of FIG. 2, a single NFB State Information Structure is used for state 162 and state 181, denoted by the grouping 188. Similarly, a single entry is used for states 160 and 168, denoted by grouping 187. In Table 16, fields ending with "_SL" denote that the field applies to the self-loop state. The two states that share a single NFB State Information Structure have related state numbers—the most significant bit is set for a self-loop state, and cleared for the related preceding state, so that the two state numbers can be computed from each other. Note that the two states are still independent, and each state has its own outgoing transitions. For example, in FIG. 2, state 160 has separate outgoing transitions from state 168.

TABLE 16

NFB State Information Structure returned from NFB Lookup Unit 121

| NSIS Field | Description |
| --- | --- |
| FROM_STATE_NUM | The state number that this hash entry is for. It will be compared with the state number that was used to create the hash key in order to ensure that this entry is an exact match. |
| ELEMENT_HANDLE | The element handle that this hash entry is for. It will be compared with the element handle that was used to create the hash key to ensure that this entry is an exact match. |
| STATE_NUM | The number of the next state that we will enter when we follow this transition. Note that this is the base state number (for the non-self loop state). The associated self-loop state number is this state number with the top bit set. |
| IS_TRANSACTION_STATE | Set to 1 if this is a transaction state (note that the state number is the index into the transaction start table, see Table 29 below). |
| HAS_NO_ELEMENT_CHILDREN | Set to 1 if this state has no element children. This means that there are no "normal" transitions out of this state. Note that epsilon and star transitions do not count as "normal" transitions. |
| HAS_STAR_TRANSITION_SL | Set to 1 if this state has an outgoing star-transition (Self-loop State) |
| HAS_STAR_TRANSITION | Set to 1 if this state has an outgoing star-transition (Normal State) |
| SINGLE_ELEMENT_HANDLE_SL | If non-zero, this field indicates the element handle for that single child. (Self-loop State) |
| SINGLE_ELEMENT_HANDLE | If non-zero, this field indicates the element handle for that single child. (Normal State) |
| HAS_SELF_LOOP | Set to 1 if this state has a self-loop state hanging off it |
| HAS_WORD_MATCHES | Set to 1 if this state has word matches, but only at the current document level. |
| HAS_WORD_DEC_MATCHES | Set to 1 if this state has descendant word matches. This means that the matches aren't confined to the same level in which they started (contains(., "...")) |
| HAS_ATTR_MATCHES | Set to 1 if this state has attribute matches that it cares about |
| MATCH_LIST_HANDLE | Pointer to the start of the structural match list. |

The main purpose of the NFB State Information Structure of Table 16 above is to determine if there is an outgoing transition for a current active state to a new state, given an element handle in a start element event (see Table 15 above). A look-up is performed on a given current state number, and the element handle, to see if there is a matching NFB State Information Structure. The FROM_STATE_NUM and ELEMENT_HANDLE fields are the components of the key that is referenced. The STATE_NUM field indicates the destination state of the transition. The various flags, such as HAS_ATTR_MATCHES, give information about the destination state.

While FIG. 2 and the associated description above explained how the NFA is used to match structural components, most of the complexity of matching a set of XPath subscriptions against an XML document involves handling of predicates, including nested paths. The innovative algorithm used to accomplish this function, along with the optimized hardware implementation techniques, is now described.

With a subscription, there is the concept of full matches and partial matches. Full matches are used for simple subscriptions which either have no predicates, or have one predicate at the end of the subscription. For example, with a simple structural-only subscription "/Invoice/*/Total", the states involved would be, using FIG. 2, 160 as the root state (which always has the special state number of zero), then an outgoing transition 161 for the element "Invoice", which would have an associated unique element handle number assigned, then state 162, then the outgoing transition 163 for the element "*", which would use the reserved wildcard element handle, then state 164, then the outgoing transition 165 for the element "Total", which would have an associated unique element handle assigned, and finally the terminal state 166. For the terminal state 166 for the subscription, the MATCH_LIST_HANDLE field would contain the handle of a match list which includes this subscription as being matched if that state is reached. This simple subscription involves no special book-keeping as it does not consist of any parts that need to be reconciled to determine if a full subscription match has occurred.

An example of a structural partial match can be seen from subscription 155 of Table 1. The "[//State"] predicate is an example of a structural partial match component—when the state 184 of FIG. 2 is reached that represents this component, only a portion of the overall subscription has been satisfied. In state 184 of FIG. 2, representing that a "//State" component has been found under "/Invoice", the MATCH_LIST_HANDLE field would contain the handle of a match list which includes this subscription as being partially matched if that state is reached, as opposed to a full match as for the previous example.

The organization of the execution stack (ES) (354 of FIG. 17), which is used by NFB block 119 to track all states that are currently alive in the NFA while it is being executed for a document, is now described. A state that is "alive" exists somewhere on the execution stack 354. Note that there is also the concept of a state being "active", which for a "normal" (non self-loop state) means that the state exists at the current document level. All "self-loop" states on the execution stack 354 are always active. The states are organized as two distinct groups within the ES 354: self-loop states and normal states. The ES 354 maintains an independent stack for each of these two groups. The normal states 355 are added to the beginning of the ES memory 354 and grow towards the end. The self-loop states 356 are added to the end of the ES memory 354 and grow towards the beginning of the memory. The ES memory 354 is considered full when the two stacks meet in the middle.

Note that though the states are named Normal and Self-loop, the Self-loop entries actually represent one Normal state and one Self-loop state. The Normal state that shares the entry with the Self-loop state is the Self-loop state's parent state (i.e. the state that has the epsilon transition pointing to this self-loop state). All Self-loop states have one of these parents, so every Self-loop entry within the ES 354 represent both a Normal and Self-loop state. During processing, the logic will iterate over all self-loop states within the ES 354 and for each self-loop state that is at the same level as the current document level, it will also process the Normal state within each of those entries.

Memory management of the ES 354 memory is performed as follows. As states are added to the stack, the logic uses the appropriate free pointer (either the normal state free pointer or the self-loop free pointer) and writes the state information to that slot in the stack. When the state has been written to the stack, the free pointer is then incremented (or decremented for self-loop states as this stack grows downward in memory). Each time a new start element event is received, the current free pointer for both the normal and self-loop states is written to the ES Level Recovery Stack (ELRS) 350. The ELRS 350 maintains the normal and self-loop free pointers for each document level. As end elements are received, the logic simply reads the head of the ELRS 350 and reinitializes the free pointers to the values read from the memory—effectively freeing all states that were placed on the ES 354 at the previous document level. This represents an extremely efficient method of allocating and freeing execution stack 354 resources associated with a given document level. In addition, placing self-loop states in their own execution stack 356, as opposed to using a single execution stack as in the prior art, avoids having the self-loop states, which are continuously active as one descends deeper into the XML document, from being copied continuously onto the top of a single execution stack. Note that a document level represents the level of nesting of elements within a document level. For example, for the exemplary XML document "<a><b><c></c><d></d></b></a>", the "<a>" element is at document level 1, the "<b>" element is at document level 2, and the "<c>" and "<d>" elements are both at document level 3.

The Execution Stack 354 entry format is shown in Table 17 below.

TABLE 17

Execution Stack (ES) 354 Entry Format

| ES Field | Description |
| --- | --- |
| STATE_NUM | State number for this state. (same base number for both normal and self-loop states). |
| HAS_NO_ELEMENT_CHILDREN | Set to 1 if this state has no element children. This means that there are no "normal" transitions out of this state. Note that epsilon and star transitions do not count as "normal" transitions. |
| HAS_COLLISION_TRANSITION_SL | Set to 1 if at least one of the outgoing collisions hits a hash table collision for the self-loop state. |
| HAS_COLLISION_TRANSITION | Set to 1 if at least one of the outgoing collisions hits a hash table collision for the normal state. |
| HAS_STAR_TRANSITION_SL | Set to 1 if the self-loop state has an outgoing star-transition |
| HAS_STAR_TRANSITION | Set to 1 if the normal state has an outgoing star-transition |
| SINGLE_ELEMENT_HANDLE_SL | Element handle for the single output transition - helps avoid unnecessary lookups. |
| SINGLE_ELEMENT_HANDLE | Element handle for the single output transition - helps avoid unnecessary lookups. |

TABLE 17-continued

Execution Stack (ES) 354 Entry Format

| ES Field | Description |
| --- | --- |
| TRANS_ID | Dynamically allocated number that represents a unique active transaction - index into the active transaction list table - see Table 21 below. |

The ES Level Recovery Stack 350 entry format is shown in Table 18 below.

TABLE 18

Execution Stack Level Recovery (ELRS) Stack 350 Entry Format

| ELRS Field | Description |
| --- | --- |
| NORMAL_STATE_PTR | Pointer to the first state on the Normal Execution Stack for a particular level |
| SELF_LOOP_STATE_PTR | Pointer to the first state on the Self-loop Execution Stack for a particular level |

It will this be appreciated that the described NFA automation combines a self-loop state and predecessor state into a signal data structure, caches a handle when there is only one outgoing arc, indicates whether a collision occurs for any outgoing arcs to reduce memory bandwidth, flags whether a destination state needs to be added to execution stack, splits an execution stack into normal states and self-loop states, and use a level recovery stack to free allocated memory in the execution stack.

The method of tracking portions of a complex XPath expression, and tracking the partial results, is now described. A state is considered a "transaction" state if it represents a branching point in the XPath expression where the various branches must be matched for the overall XPath expression to be matched to a document. Referring back to the XPE expressions of Table 1, and the associated NFA of FIG. 2, consider exemplary XPE 152. This example XPE does NOT require any transaction states, as there is only a single predicate at the end of the XPE, and there are no branching points in the XPE. Next, consider exemplary XPE 153. There is a branching point after the "InvoiceDetail" element, since the XPE calls for two sub-components: a child element "Description" containing certain text and a child element "Total" with a numerical constraint on the element text. The two children can appear in either order, and both conditions must be met for the overall subscription to be satisfied. The state representing having reached the "InvoiceDetail" element, which is state 171 of FIG. 2, is a transaction state, and has the IS_TRANSACTION_STATE flag of Table 16 set. Note that self-loop states are never transaction states, but the "normal" state portion of a self loop state can be a transaction state.

XPEs can also involve multiple nested transactions. For example, in XPE 155 of Table 1, there are two branching points. The first is at the "Invoice" element, since it is looking for both a child (at any document level below) of "State", and is also looking for a child (at any document level below) of "Total". This makes state 162 of FIG. 2 a transaction state. In addition, looking at the "Total" element of the XPE, there are two conditions that must be met: a comparison on an attribute "currency", and a numerical condition on the text of the element. This makes state 186, which represents the "Total" element, a transaction state also, and this transaction is a sub-transaction of the first transaction in the XPE. The nesting of transactions allows the relationships to be properly tracked as a document is processed, ensuring that the specified conditions are met on the same element in the face of repeated elements. Examples of XML documents and subscriptions that make this sort of matching complex is provided in the [YFilter] document referenced.

A bit map is used to track the required components of each instance of a transaction for a given subscription, where the bit map is preferentially 8 bits wide, although other widths could be used. For example, continuing the example of XPE 155, state 186 is a transaction state which requires two components: a currency attribute with a text value of "USD", and the text value of the Total element having a numeric value exceeding 500. Each of these conditions is given a unique bit number within a given transaction state for a given subscription. For example, the attribute check could be configured to set bit 0 (represented by an attribute partial match for a transaction at NFA tree level 3), and the element text check could be configured to set bit 1 (represented by a word partial match for a transaction at NFA tree level 3). Then, for the subscription, the transaction configuration information associated with state 186 (described in more detail later), has an expected bit map of 0x3 hex (bit 0 and bit 1 both set) in order for this transaction to be satisfied. However, satisfying this transaction is not enough, as there is a parent transaction for the subscription, for transaction state 162. So, when the transaction for state 186 for the subscription is satisfied, the configuration information specifies that a parent transaction must be updated, and that bit 0 of the parent transaction must be set. The parent transaction is referenced by the NFA tree level of the transaction, which for state 162 is NFA tree level 2. In addition to having the child transaction satisfied, the transaction of state 162 for the subscription must also have another condition satisfied, namely that there is a child element "State" at any level below the "Invoice" element. This condition is represented by a structural partial match, indicating that the transaction at NFA tree level 2 should be updated by setting bit 1 when this condition is met. The transaction configuration for the subscription at state 162 has a required bit map of 0x3 hex, indicating that both bit 0 and bit 1 must be set for the transaction to be satisfied. There is no parent transaction specified in this case, since once this transaction is satisfied, the subscription is fully satisfied.

Note that the bit map approach can also be used to handle more complex XPEs without a change to the hardware logic. For example, the XPE "/a[((@attr1=1) or (@attr2=2)) and (@attr3=3)]" can also be handled. There is one transaction state for this subscription, with no parent transaction needed. The transaction has an expected bit map of 0x3 hex to be satisfied. The partial match condition generated by "attr1" having a value of 1 of element "a" sets bit 0 within the bit map maintained for the transaction instance. The partial match condition generated by "attr2" of element "a" having a value of 2 also sets bit 0 within the bit map maintained for the transaction instance. Thus, either condition is acceptable. The partial match condition generated by "attr3" of element "a" having a value of 3 sets bit 1 within the bit map maintained for the transaction instance. When both bit 0 and bit 1 is set, the transaction is satisfied, and since there is no parent transaction, the subscription is fully satisfied.

The NFB block 119 of FIG. 5 is responsible for allocating a transaction ID (TRANS_ID) each time it enters a transaction state. A TRANS_ID is used to uniquely represent each instance of a transaction state. Due to the operators such as "//" in XPEs, and due to the fact that elements can be repeated and nested among themselves in XML documents, a given transaction state can be entered multiple times as the levels of an XML document are descended, and each time a transaction state is entered a new, unique TRANS_ID (unique among all transaction states currently alive) is allocated. This allocation is done using a Transaction ID Free List (TFL) 112, along with a Transaction ID Level Recovery Stack (TLRS) 115. The allocation scheme is done in such a way to make allocation and de-allocation extremely efficient. A free list is used, utilizing a linked list, with a register holding the head of the list. When a TRANS_ID is allocated, the entry at the head of the free list 112 is read and the NEXT_PTR field is used to update the head pointer register. An important note is that the NEXT_PTR for the allocated entry is not changed—it still points to the next entry in the free list. The pointer is left this way so that if more entries are allocated for the same document level, all entries for that level will already be linked together. After each allocation, the TLRS 115 entry for that document level must be updated to contain a pointer to the first entry for the document level, the last entry for the document level and a count of the number of entries currently allocated for that level. A global count of the total number of Transaction IDs allocated is also incremented.

Deallocation always is performed for all TRANS_IDs associated with a single document level simultaneously, in response to an End Element Event. Since the TFL 112 and TLRS 115 together contain both the free list of entries and individual lists for each document level, freeing all the entries for a level involves changing the current tail entry of the free list to point to the head of that level's list. The global tail pointer must also be changed to point to the last entry of the list being freed. The global count of the total number of TRANS_IDs allocated is decremented by the COUNT field that was stored in the TLRS 115 associated with the document level being freed. Deallocation can be performed extremely efficiently with a minimum of operations regardless of the number of transactions states that had been entered during the document level just ending.

The allocation is performed as an LRU (least-recently used) with 32 reserved unallocated entries. This will guarantee that a TRANS_ID that is just being freed will not be used again until there are at least 32 different TRANS_IDs allocated. The LRU scheme is required to ensure that all pending matches are applied against a transaction before that transaction ID is allocated again.

The format of an entry in the TFL 112 is shown in Table 19 below, and the format of an entry of the TRANS_ID Recovery Stack is shown in Table 20 below. There is one TLRS 115 entry for each supported document level (e.g. up to 63 in the preferred embodiment).

TABLE 19

TRANS_ID Free List (TFL) 112 Entry Format

| TFL Field | Description |
|---|---|
| HEAD_PTR | Pointer to the next free entry in the free list. |
| TAIL_PTR | Pointer to the last free entry in the free list. |

TABLE 20

TRANS_ID Level Recovery Stack (TLRS) 115 Entry Format

| TLRS Field | Description |
|---|---|
| COUNT | The number of transaction IDs allocated for this document level. |
| HEAD_PTR | Pointer to the first entry that was allocated for this document level. |
| TAIL_PTR | Pointer to the last entry that was allocated for this document level. |

Another data structure known as the Active Transaction List (ATL) 116 holds the relationships between nested transaction states. As the NFB block 119 of FIG. 5 performs its processing function, each time a transaction state is entered it allocates a single transaction ID (TRANS_ID) as previously explained. This TRANS_ID is used as an index into the ATL 116 to retrieve information relevant to that transaction. The transaction state and any states entered from that state maintain this transaction ID so that when matches occur, the transaction ID can be used to set the appropriate bitmaps. This is fine until a second transaction state is entered from a state that is already maintaining a transaction ID. To avoid having each state maintain all the transaction IDs for all previous transaction states, the ATL 116 is used to link these transaction IDs together. Each state that has seen a transaction in its past has a transaction ID that points to the head of a list of transaction IDs. This allows each state to only keep one transaction ID.

Figure 16:
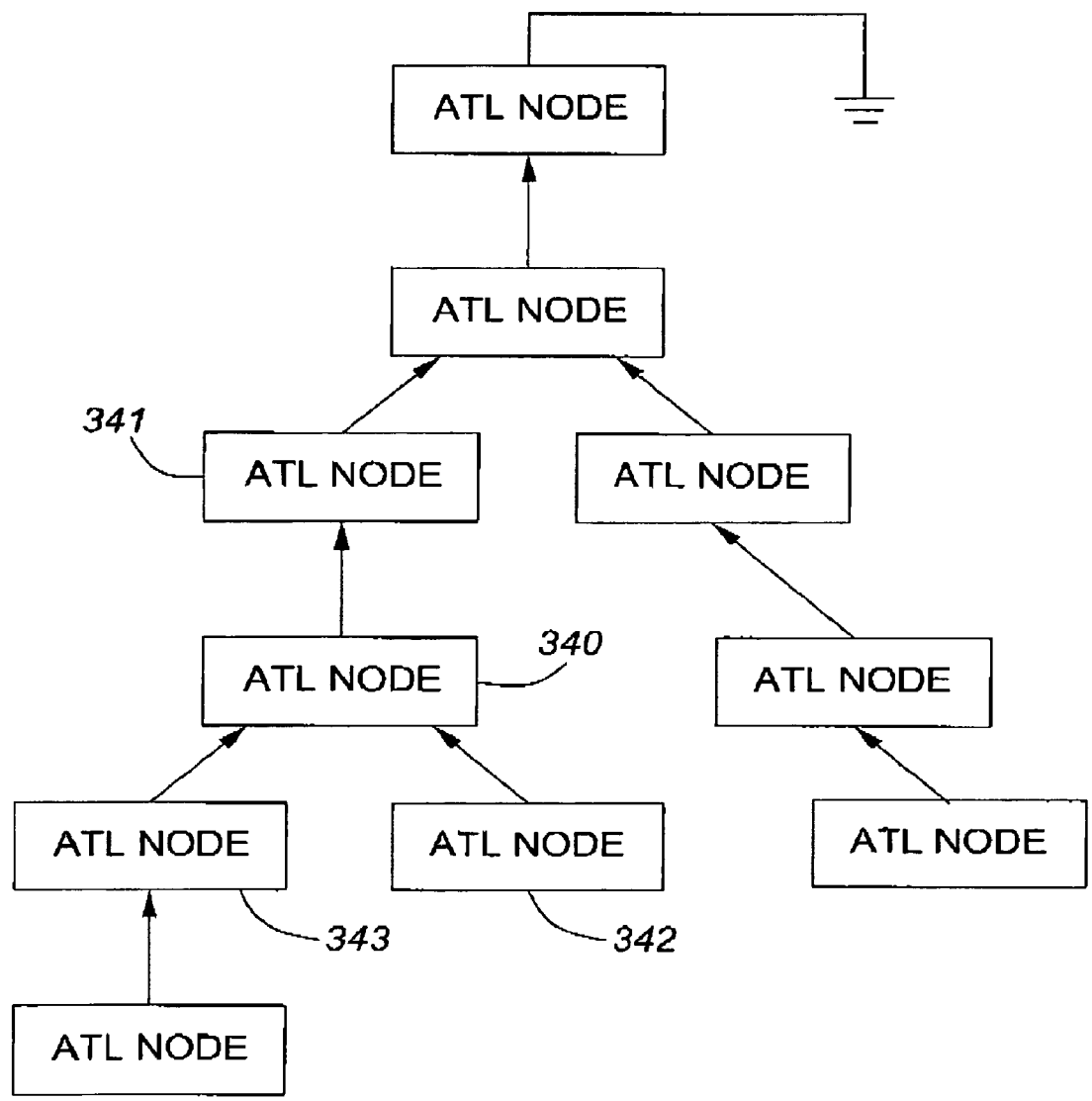
FIG. 16 shows an example Active Transaction List structure.

The ATL 116 is maintained by the Results Collection (RCB) block 129. An example ATL 116 list structure is shown in FIG. 16. The lists are singly linked lists where any one node may have many nodes pointing to it, but it will only point to one node itself. For example, node 340 points to a single predecessor node 341, but is pointed to by two successor nodes 342 and 343. This structure is suitable for the purpose of tracking transactions because as documents are processed, a single state may spawn two new active states due to a single start element (e.g. a state has both "foo" and "*" outgoing transitions and a "foo" start element event is received, causing both outgoing transitions to be followed). When this occurs, it is required that the current list of active transactions be shared between the two new active states. If both of these two new active states were transaction states, then they would both allocate new entries in the ATL 116 with both entries pointing to the same predecessor ATL 116 node.

The format of an entry in the ATL 116 is shown in Table 21 below. This data includes an index (TPT_IDX) into the Transaction Progress Table (TPT) 130, which is described later. This allows the logic to determine where to set a progress bit when a partial match occurs. The data also includes a pointer to the parent ATL node (PARENT_PTR) and an NFA tree level number (NFA_LEVEL) that indicates the level of the NFA tree in which the transaction resides. The NFA tree level is determined by the level in the NFA tree. For example, in FIG. 2, state 160 and state 168 are at NFA tree level 1 (note that these two states are grouped together as explained earlier), states 162 and 181 are at NFA tree level 2 (again, grouped together), and state 171 is also at NFA tree level 2. States 186, 184, 164, 175, 173, 177 and 179 are at NFA tree level 3, and state 166 is at NFA tree level 4. Transaction IDs, which are used to index into the ATL, are allocated by the NFB block, as described earlier. The ATL 116 is maintained by the Results Collection (RCB) block 129 of FIG. 5. The RCB 129 is described later.

ELRS entry is initialized with the contents of the previous level. The associated element handle of the Start Element event is used to drive the NFA state machine. The ES 354 determines the set of currently active states to be operated upon. This includes all self-loop states, since all self-loop states remain active until they are popped off of the self-loop execution stack 356. In addition, the self-loop states are also associated with the predecessor non-self loop state (connected with an Epsilon transition) as previously explained.

TABLE 21

Active Transaction List (ATL) 116 Entry Format

| ATL Field | Description |
| --- | --- |
| TPT_ALLOC_ERROR | This bit is set if a TPT 130 entry was not allocated for this transaction. When an entry is read with this bit set, the document must be marked with an error and aborted. This occurs if the hardware runs out of resources for TPT 130 entries, which is highly unlikely. |
| NFA_LEVEL | Indicates the level of the NFA tree that corresponds to this entry |
| TPT_IDX | Pointer to the Transaction Progress Table entry |
| PARENT_PTR | Points to the parent entry in the ATL list, which is the pointer the previous ATL node. |
| TRANSACTION_NUM | A unique number that is tied to this transaction. It is used to determine if the TPT 130 sub-entry is initialized. If this number is the same as the one in the TPT 130 sub-entry, then the logic knows that the TPT 130 sub-entry has been initialized. Otherwise, the sub-entry is deemed to be invalid and it must be initialized before proceeding. One value (zero) is reserved so that the TPT 130 sub-entry can be initialized at start-up to a value (zero) that would never occur in normal operation. The size of this field is picked so that it will never rollover with realistic usage. |

The TRANSACTION_NUM field of the ATL 116 is a key component of the efficient operation of the partial progress tracking logic. Each transaction is given a unique number (different from the TRANS_ID), from a very large number space, e.g. with a number 52 bits in width or wider. These numbers are never re-allocated. The width is designed so that the number will never roll over in normal operation, i.e. it will not roll over for a number of years. The time horizon is such that the time will not be exceeded before the hardware is restarted, e.g. for a system upgrade event, etc. The use of this number is explained later when the TPT 130 usage is described.

Figure 17:
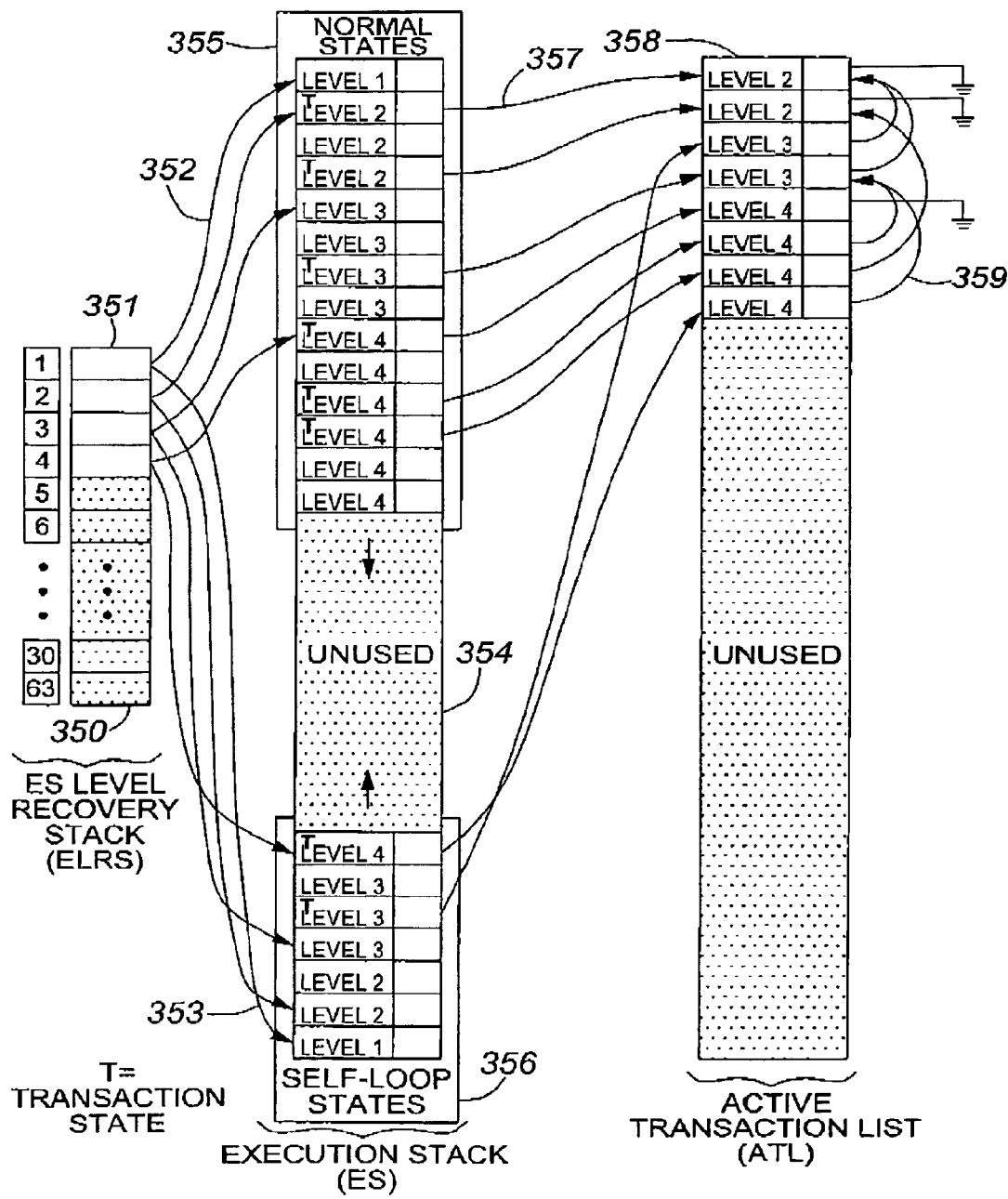
FIG. 17 shows the Execution Stack (ES), ES Level Recovery Stack and Active Transaction List.

The relationship between the Execution Stack 354, the ES Level Recovery Stack 350, and the Active Transaction List is shown in FIG. 17. The ES Level Recovery Stack (ELRS) 350 contains a number of entries, such as the maximum of 63 entries shown, which supports an XML document up to a document depth of 63. Other maximum depths can be supported, but more hardware resources are consumed with a larger maximum depth. An ELRS entry, such as 351 for document level 1, contains two pointers per entry indicating the first normal (pointer 352) and self-loop (pointer 353) stack entry for that document level. Within the Execution Stack (ES) 354, the normal state stack 355 grows down from the start of ES memory, while the self-loop stack 356 grows up from the end of ES memory. Each transaction state in the ES points, such as with pointer 357, to one ATL entry within the ATL 358. Each ATL node points to a single parent (such as via pointer 359), or is terminated indicating a full match when this transaction is satisfied. A given ATL may have zero or many other ATL entries pointing to it.

When the NFB block 119 of FIG. 5 receives a Start Element event, new level is allocated in the ES Level Recovery Stack 350 for the new document level (a start element means we are descending one level in the XML document). The new The set of self-loop states at the current document level in the ELRS 350, are also active non-self loop states (normal states). In addition, all normal states at the current document level are also active. The element handle is used along with each active state, in turn, to determine the next set of active states. For a normal state, the ES entry (see Table 18 above) is first examined. If the HAS_NO_ELEMENT_CHILDREN flag is set, then it is known that this state has no normal transitions, and thus the element handle is not needed for this state. This optimization avoids an NFB lookup for states with no outgoing transitions, or those with only an epsilon or a "*" (wildcard") outgoing transition. The SINGLE_ELEMENT_HANDLE field is examined as another optimization. This field contains a non-zero value if there is a single outgoing transition, which is true for a large majority of states in a complex NFA, since many subscriptions can have unique leaves at the edge of the NFA. For example, in FIG. 2, state 164 has a single outgoing transition 165. For these cases, the outgoing element handle is pre-cached in the ES, so it can immediately be compared against the element handle of the event. If there is a mismatch, then there is no need to perform an NFB lookup to find the destination state. Only if there is a match is the NFB lookup performed to fetch the destination state information. This avoids unnecessary NFB lookups by the NFB Lookup Unit 121 of FIG. 5. The HAS_STAR_TRANSITION flag is another optimization. Any state can have an outgoing "*" transition (which matches any element handle), but few will actually have such a transition. Without this optimization, an extra NFB lookup for the special "*" transition would have to be performed against every active state. With this flag, this lookup is only performed for states which are known to have an outgoing "*" transition. For self-loop states, the above logic is also used, but the fields of interest in Table 16 are those which end in the "_SL" suffix as previously described. Also, when NFB lookups are performed for a self-loop state, the top bit of the STATE_NUM field is set, to distinguish a self-loop state number from the state number of it predecessor grouped state.

When a NFB lookup is performed, there will either be no match (against the key composed of a (state number, element handle) pair), or there will be a match. A match indicates that there is a next state for the event. For the case of a match, processing is performed on the destination state. If the NFB State Information Structure (see Table 16) has any of the HAS_WORD_MATCHES, HAS_WORD DEC_ MATCHES, or HAS_ATTR_MATCHES flags set (multiple may be set at once), then this indicates that this new state is of interest to the Word and Attribute Match (WAM) block 123 of FIG. 5. As a result, an event is sent from the NFB block 119 to the WAM block 123 indicating that a new state has been entered of interest to the block, and the information about the type of word match (same document level only vs. all contained text of this element and its children), and whether any attribute matches are being performed for this state, is indicated. These flags are not stored in the ES of the NFB block 119 since they are only used by the WAM block 123. If the IS_TRANSACTION_STATE flag is set, then a transaction state is being entered. The NFB Block 119 allocates a new transaction ID (TRANS_ID) as previously described, and sends this along with the previous TRANS_ID (TRANS_ID of the ES entry that led to this new state) to the RCB block 123 in a "New Transaction" event. This allows the RCB to set up for a new transaction. If the MATCH_LIST_HANDLE of the NFB State Information Structure is not the null handle, then there are one or more matches that occur by entering this state. This information is communicated to the Results Collection (RCB) block 129 of FIG. 5. This information is not used by the NFB block 119 and thus is not stored in the ES. If the HAS_SELF_LOOP flag is set, then a new entry is allocated in the self-loop portion 356 of the ES 354, and the required information is copied into it. Otherwise, a determination is made to see whether an entry in the normal state portion 355 of the ES 354 is necessary. Leaf nodes which have no outgoing transitions are not needed to be stored in the ES, since it is already known that no further outgoing transitions can result from such a state. This is determined by checking if both the HAS_NO_ELEMENT_CHILDREN flag is set and the HAS_ STAR_TRANSITION flag is clear. If an ES entry is needed for the normal state, then one is allocated (in the normal state stack 355) as previously described. Thus, it can be seen that the NFB block 119 of FIG. 3 executes the NFA state machine, with a number of optimizations previously described to make this execution extremely efficient.

The events 118 dispatched from the NFB block 119 of FIG. 5 to the WAM block 123 are shown in Table 22 below. Note that most of the events 143 from the AVP block 113, while being processed by the NFB 119, also flow through to the WAM 123. The "Add State Message" is generated by the NFB block 119 as previously described.

TABLE 22

Main Output Signals 118 of NFB Block 119 to WAM Block 123

| Signal Name | Description |
|---|---|
| MSG_TYPE | Message Type. This field indicates the type of message being sent on this interface.<br>0: Start Document Event<br>This message indicates that a new document is starting.<br>1: End Document Event<br>This message indicates that the current document is finished.<br>2: Start Element Event<br>This message is sent each time the NFBblock receives a start element event.<br>3: End Element Event<br>This message is sent each time the NFB block receives an end element event.<br>4: Word Event Message<br>This message indicates the prefix of a word that has been found in the current document.<br>5: Word Prefix Event Message<br>This message indicates the prefix of a word that has been found in the current document.<br>6: Attribute Match Event Message<br>This message is sent each time the NFB block receives an Attribute Match Event.<br>7: Abort Document Event Message<br>Indicates that the current document has been aborted.<br>8: Add State Message<br>This message is sent each time the NFB block enters a state that contains text or attribute matching. |
| HANDLE_STATE_NUM | Handle or State Number. The meaning of this field depends on the type of message.<br>For Add State messages, this field contains the state number being added.<br>For Word or Attribute Match Events, this field contains the handle number. |
| WORD_STATE_TYPE | Word state type. This field indicates the type of word matches that should be applied to this state.<br>0: No words should be matched to this state<br>1: Single level word matches should be matched to this state<br>2: Nested level word matches should be matched to this state |
| ATTRIBUTE_STATE | Attribute state. This bit is set if the state should be checked for attribute matches.<br>0: Attribute matches must not be checked against this state<br>1: Attribute matches must be checked against this state |

TABLE 22-continued

Main Output Signals 118 of NFB Block 119 to WAM Block 123

| Signal Name | Description |
| --- | --- |
| DOC_ID | Document ID. This is the host processor assigned document ID that is carried with the document through all processing. |
| ERROR_CODE | Error Code. This field contains information about the first error that has occurred before this point in the processing of the document. |

The events 120 dispatched from the NFB block 119 of FIG. 3 to the RCB block 129 are shown in Table 23 below. Note that most of the events 117 from the AVP block 113, while being processed by the NFB 119, also flow through to the RCB 129. The "New Transaction" message is generated by the NFB block 119 as previously described.

The WAM block 123 is responsible for keeping track of all states that are concerned with Words or Attribute Match Events. The block receives Add State messages from the NFB block 119 as described earlier. Each Add State message indicates if the state is concerned with Word matches, Attribute Matches or both. States concerned with Word matches are

TABLE 23

Main Output Signals 120 of NFB Block 119 to RCB Block 129

| Signal Name | Description |
| --- | --- |
| MSG_TYPE | Message Type. This field indicates what type of data is being carried in this message.<br>0: Start Document<br>This message is sent at the start of each document. This allows the RCB to do any cleanup required at the beginning of a document.<br>1: End Document<br>This message is sent at the end of each document. This allows the RCB to do any cleanup required at the end of a document. It also allows the RCB to send a document complete message to the Results Set block in FPGA 100 of FIG. 5.<br>2: Start Element<br>This message is sent each time the NFB block receives a start element.<br>3: End Element<br>This message is sent each time the NFB block receives an end element.<br>4: New Transaction<br>This message is sent each time the NFB block enters a transaction state.<br>5: Structural Match<br>This message is sent each time the NFB block has a structural match.<br>7: Abort Document<br>This message is sent each time the NFB block receives either an end document event where the NFB is in a bad state or when the NFB block received an Abort Document event itself. |
| TRANS_ID | Transaction ID. This indicates the transaction that the message applies to. This field is only valid in New Transaction and Structural Match messages. |
| PREV_TRANS_ID | Previous Transaction ID. This is the transaction ID for the parent transaction. Only valid in New Transaction messages. |
| MATCH_HANDLE_STATE_NUM | For Structural match messages this field indicates the Match List Handle to the results block so that it can perform the Match List lookup. For New Transaction messages this field carries the state number that contains the transaction. |
| EVENT_SEQ_NUM | Event Sequence Number. This field is used to keep track of the order in which events have been received. |
| DOC_ID | Document ID. This is the host processor assigned document ID that is carried with the document through all processing. |
| ERROR_CODE | Error Code. This field contains information about the first error that has occurred before this point in the processing of the document. |

The Word and Attribute Matching (WAM) block 123 of FIG. 5 is responsible for determining if any of the Word or Attribute Match events are relevant to the set of states that are active at the time the events are received. For each state that does care about an event, the WAM block 123 will send a message to the RCB block 129 with the Match List Handle that corresponds to that (state, event handle) pair.

placed on the Word Match Stack (WMS) (375 of FIG. 18) and states concerned with Attribute Matches are placed on the Attribute State List (ASL) 124. States concerned with both are put on both memory structures.

States that are placed on the Word Match stack 375 fall into two categories: single element word matches and nested element word matches. In single element word matches the WAM 123 must only match words in the same document level as the state's document level. In nested element word matches, the WAM 123 must match words in the current document level as well as in all levels below that document level. To cope with these two types of states, the WAM 123 maintains two Word Match stacks, one containing only single element word matches (374) and the other containing only nested element word matches (373). When a word event is received, all states on the nested element word match stack 373 are checked and only the states at the current document level in the single element match stack 374 are checked for single element word matches.

In a similar manner to the Execution Stack 354 described earlier, the WMS 375 creates two independent stacks within the same memory structure, each starting at opposite ends of the memory and growing towards each other. When the two stacks meet, the memory is exhausted. Memory management of the WMS 375 memory is very efficient. As states are added to the stacks, the logic uses the appropriate free pointer (either the single element match stack free pointer or the nested element match stack free pointer) and writes the state information to that slot in the stack. When the state has been written to the stack, the free pointer is then incremented (for the nested element match stack) or decremented (for the single element match stack). Each time a new start element is received, which increments the current document level, the current free pointer for both the single element match stack and the nested element match stack is written to the WMS Level Recovery Stack (WLRS) 370. The WLRS 370 maintains the nested element match stack and single element match stack free pointers for each document level. As end elements are received, which decrements the current document level, the logic reads the head of the WLRS and reinitializes the free pointers to the values read from the memory—effectively freeing all states that were placed on the WMS for the document level that has just ended.

Figure 18:
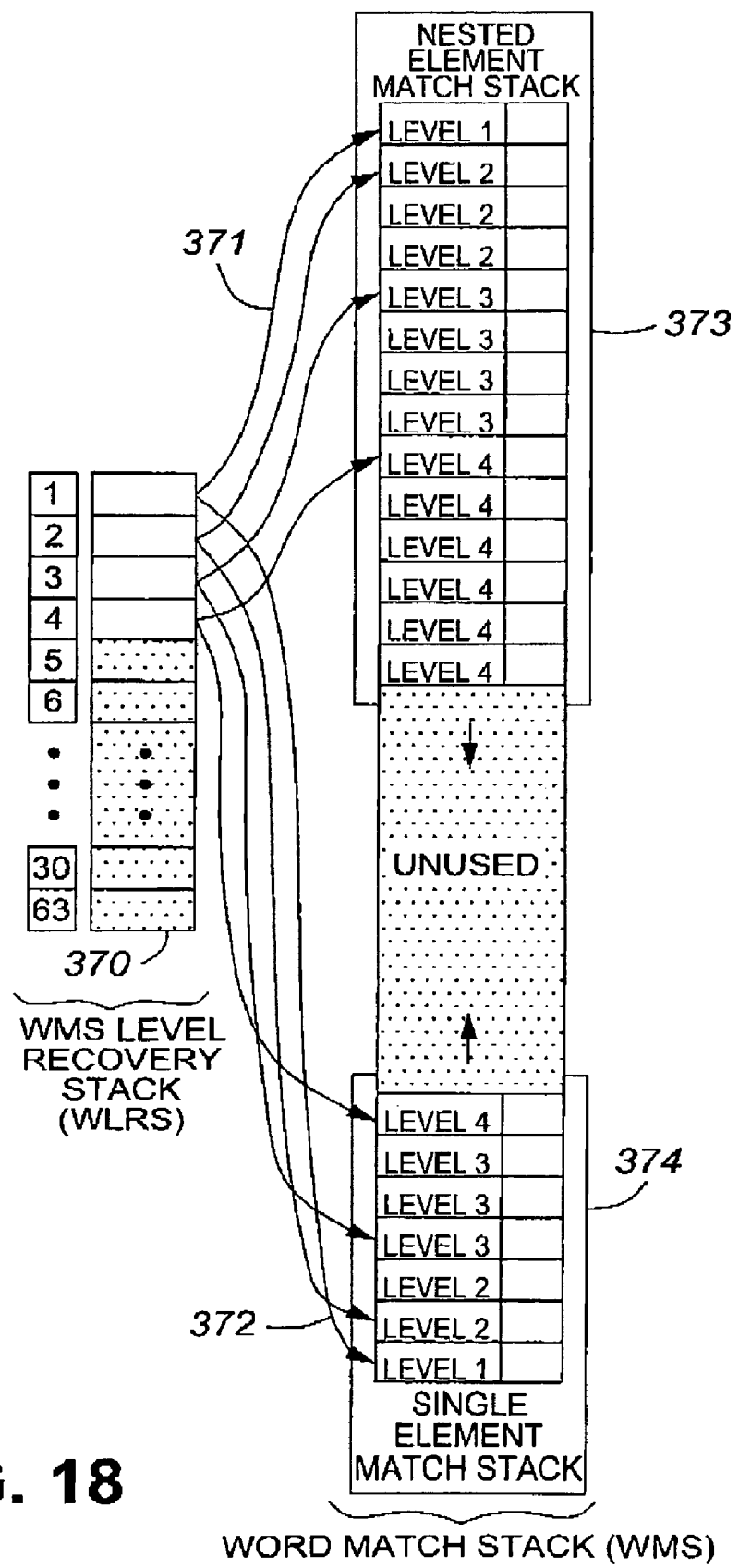
FIG. 18 shows the Word Match Stack (WMS) and WMS Level Recovery Stack.

Table 24 below shows the format of an entry in the Word Match Stack (WMS) 375 and Table 25 below shows the format of an entry in the WMS Level Recovery Stack (WLRS) 370. FIG. 18 shows the relationship between the WMS 375 and the WLRS 370. The WLRS 370 contains two pointers per entry, indicating the first nested element (e.g. pointer 371) and single element (e.g. pointer 372) match stack entries for that document level. A fixed number of document levels are supported. For example, if up to 63 entries in the WLRS 370 are supported, then an XML document with up to 63 levels of element nesting is supported. The nested element match stack 373 grows from the start of the WMS 375 memory towards the end, while the single element match stack 374 begins from the end of the WMS 375 memory and grows upwards towards the beginning.

TABLE 24

Word Match Stack (WMS) 375 Entry Format

| WMS Field | Description |
| --- | --- |
| STATE_NUM | State number that is currently performing text matches. |
| TRANS_ID | Transaction ID that the word match is for. |

TABLE 25

WMS Level Recovery Stack (WLRS) 370 Entry Format

| WLRS Field | Description |
| --- | --- |
| SINGLE_ELEMENT_STACK_IDX | Index to the first state on the Single Element Match Stack for a particular document level |
| NESTED_ELEMENT_STACK_IDX | Index to the first state on the Nested Element Match Stack for a particular documents level |

The Attribute State List (ASL) 124 is a structure that stores all the states that are interested in examining attribute matches at the current document level. States are added to the structure as a result of messages from the NFB block 119 to the WAM block 123 that indicate the state should be added to the ASL 124 (i.e. an Add State Message indicating that attribute matches must be checked against the state). When Attribute Match events are received from the NFB 119, the ASL 124 is then iterated over and each state is checked against the attribute match handle (by way of Word and Attribute match lookup unit 125) to see if that state was waiting for that attribute match handle. Any matches that occur will result in a message being sent to the Results Collection block 129. The data in the ASL 124 is considered valid until the document level changes in either direction (i.e. up or down). In other words, when a start element or end element event arrives, the entire ASL 124 structure is considered empty.

The format of each entry in the ASL 124 is shown in Table 26 below.

TABLE 26

Attribute State List (ASL) 124 Entry Format

| ASL Field | Description |
| --- | --- |
| STATE_NUM | State number that is currently performing text matches. |
| TRANS_ID | Transaction number that the attribute match is for. |

The WAM Block uses a Word and Attribute Lookup unit 125 to map a state number and a match event (word or attribute) to a resulting match list handle if such a mapping exists. The lookup unit 125 performs a hash table lookup where the key is a hash function applied to the combined word/attribute match handle, a state number, and a lookup type (attribute or word lookup). Table 27 below shows the data structure returned by the Word and Attribute Lookup unit 125.

TABLE 27

Word and Attribute Lookup 125 result data structure

| WMIS Field | Description |
| --- | --- |
| MATCH_TYPE | This bit indicates if the entry is for an attribute match or a word match. 0 = Attribute Match 1 = Word Match |
| HANDLE | The word or attribute match handle for the first entry. It will be compared with the actual handle to ensure that this entry is an exact match. |
| STATE_NUM | This field holds the state number that this hash entry is for. It will be compared with the actual state number to ensure that this entry is an exact match. |
| MATCH_LIST_HANDLE | The Match List Handle for the entry. |

When the WAM Block 123 of FIG. 5 receives an Add State message from the NFB block 119, if attribute matches are specified (see ATTRIBUTE_STATE of Table 22), then the state is added to the end of the Attribute State List (ASL) 124. If single level word matches are specified (see WORD_STATE_TYPE of Table 22), then the specified state is added to the single element match stack 374 within the WMS 375. If nested word matches are specified, then the specified state is added to the nested element match stack 373 within the WMS 375. Note that a given state can be both in the ASL and the WMS 375, i.e. a single state can involve both attribute matches and word matches. When the WAM block 123 receives a Start Element message from the NFB block 119, a new level is added to the WLRS 370 by copying the two current free pointers within the WMS 375 to the WLRS 370. Also, all entries are removed from the ASL 124. When the WAM 123 receives an End Element message from the NFB 119, it removes all states in the ASL 124. In addition, it removes all states in the current level of each of the Word Match Stacks. It does this by reading the WMS Level Recovery Table 370 to determine the first entry for the current document level in each of the Word Match Stacks. These pointers are then used to set the current free pointer for each stack, effectively (and efficiently) removing all the states in the current level. A Word Event or Word Prefix Event message from the NFB 119 causes the WAM 123 to iterate through all of its active word matching states order to check if any of those states are searching for that word. It iterates through all the non-nested element states at the current document level and the nested element states at all levels. To perform the check, the WAM 123 hashes the state number (STATE_NUM from Table 24 above) with the word handle (from the word event message of Table 22 above) along with a MATCH_TYPE of 1 (for word match) and performs a lookup via the Word and Attribute Lookup unit 125. The Word and Attribute Lookup unit 125 returns response indicating if an entry was found or not. If an entry was found, then the Match List ID (MATCH_LIST_HANDLE of Table 27) for that entry is returned to the WAM 123. Any successful match is forwarded to the RCB block 129. An Attribute Word Event messages from the NFB 119 causes the WAM 123 to iterate through its entire active attribute matching states within the Attribute State List 124 in order to check if any of those states are searching for that word. To perform the check, the WAM 123 hashes the state number (STATE_NUM field of Table 26) with the attribute match handle (from the attribute event message of Table 22 above) along with a MATCH_TYPE of 0 (for attribute match) and perform a hash lookup to the Word and Attribute Lookup unit 125. The Word and Attribute Lookup unit 125 will return a response indicating if an entry was found or not. If an entry was found, then the Match List ID for that entry is returned to the WAM 123. Any successful match is forwarded to the RCB block 129.

The events 122 dispatched from the WAM block 123 to the RCB block 129 are shown in Table 28 below.

TABLE 28

Main Output Signals 122 of WAM Block 123 to RCB Block 129

| Signal Name | Description |
| --- | --- |
| MSG_TYPE | Message Type. This field indicates what type of data is being carried in this message.<br>1: End Document<br>This message is sent at the start of each document. This allows the RCB to do any cleanup required at the end of a document. It also allows the RCB to send a document complete message to the Results Set block.<br>4: Word or Attribute Match<br>This message is sent for each word or attribute match that occurs<br>7: Abort Document<br>This message is sent each time the WAM block receives either an end document event where the WAM in a bad state or when the WAM block received an Abort Document event itself. |
| TRANS_ID | Transaction ID. This indicates the transaction that the message applies to. This comes from the TRANS_ID field of Table 24 for word matches or from the TRANS_ID field of Table 26 for attribute matches. |
| MATCH_LIST_HANDLE | Match List Handle. This field indicates the Match List Handle to the results block so that it can perform the Match List lookup. This comes from the MATCH_LIST_HANDLE field of Table 27 for the successful lookup of a word or attribute match for a given state. |
| WORD_PREFIX | When asserted this signal indicates that the match was due to the prefix of a word. This is asserted when the event into the WAM was a Word Prefix event. |
| EXACT_LEVEL | When asserted this signal indicates that the word match occurred at the same document level as the state that it matched. |
| SEQ_NUM | Event Sequence Number. This field is used to keep track of the order in which events have been received. |
| DOC_ID | Document ID. This is the host processor assigned document ID that is carried with the document through all processing. |
| ERROR_CODE | Error Code. This field contains information about the first error that has occurred before this point in the processing of the document. |

The Results Collection (RCB) Block 129 is responsible for maintaining state about partial matches for all subscriptions for the current document being processed. All the state that is maintained for the subscriptions is flushed after each document, so that subsequent documents start with a clean initial state. The RCB 129 performs two distinct operations: first it must maintain state about all the currently active transactions that are ongoing within the system; secondly, for each of these active transactions, the RCB 129 must maintain bitmaps for each subscription that exists at that transaction. As partial matches are sent to the RCB 129, it sets bitmaps and produces full matches when all required bits have been set for a particular subscription.

The RCB 129 is notified about active transactions via New Transaction messages from the NFB 119 (see Table 23 above). Each New Transaction message will cause a read from the Transaction Start Table (TST) 128 using the state number from the New Transaction message as an index. The TST entry contains information about the number of subscriptions that require partial matching at that subscription. The RCB must allocate a bitmap for each subscription in the Transaction Progress Table (TPT) 130.

Each time a transaction state is entered during document handling, a new transaction must be started. In order to find out information about this transaction, the logic must index into the Transaction Start Table (TST) 128, the format of each entry shown in Table 29 below, to find out all the relevant information about this transaction. Reading this entry provides the NFA tree level of the transaction state, as well as the number of subscriptions which have transactions in this transaction state. The TST 128 is indexed using the state number from the state that contains the transaction that is being started. This means that depth of this table is equal to the maximum number of supported states.

that the memory management of the ATL 116 is performed by the NFB 119. The ATL 116 is used to hold information about each transaction that is considered active. There is one ATL 116 entry for each active transaction. The ATL 116 entry contains information necessary to find the progress bitmaps in the TPT 130 for that transaction, as well as a pointer to its parent transaction that exists at a previous level of the NFA tree. The ATL 116 format was described in Table 21 above.

The Transaction Configuration Table (TCT) 131 is used to hold information about each transaction state for each subscription that is part of that state's transaction. Each entry indicates a required bitmap that must be satisfied for that subscription's transaction to be considered satisfied, as well as information about a parent transaction that must be updated when this subscription's transaction is considered complete. The TCT 131 is indexed using the TCT_IDX field from the Match List Table (MLT) 132, described later. Table 30 below shows the format of each entry of the Transaction Configuration Table (TCT) 131.

TABLE 30

Transaction Configuration Table (TCT) 131 Entry Format

| TCT Field | Description |
|---|---|
| REQ_BITMAP | Required Bitmap. Indicates the bits that must be set for this subscription's transaction to be complete. |
| PARENT_NFA_LEVEL | Indicates the NFA tree level of the parent transaction. If this field is set to 0, it means that there is no parent and a full match has occurred. In this case the MATCH_ID_TCT_IDX field contains the Match ID that will be sent back to the host processor. |
| PARENT_BIT_INDEX | Indicates which bit should be set in the parent's progress bitmap when this transaction is complete. Only valid if PARENT_NFA_LEVEL is not zero. |
| PARENT_SUB_OFFSET | Indicates the offset for the subscription within the parent transaction's TCT entry. Only valid if PARENT_NFA_LEVEL is not zero. |
| MATCH_ID_TCT_IDX | If this entry indicates a full match (PARENT_NFA_LEVEL = 0), then this field contains the Match ID that must be returned to the host processor. Otherwise, this field contains the index into the TCT table for the parent transaction. |

TABLE 29

Transaction Start Table (TST) 128 Entry Format

| TST Field | Description |
|---|---|
| NFA_LEVEL | Indicates the level of the NFA tree for this state |
| NUM_SUBSCRIPTIONS | Specifies the number of subscriptions for the transaction state. |

Each New Transaction message from the NFB 119 also contains a Transaction ID (TRANS_ID field of Table 23 above), which is used as an index into the Active Transaction List (ATL) 116, as explained earlier. Transaction IDs are allocated and freed by the NFB 119, which essentially means The Match List Table (MLT) 132 is used to store lists of subscriptions that have a partial or full match at a point in the filtering operation. The match could be caused by reaching a certain state within the NFB block 119 (structural match) or it could be caused by either a word or attribute match occurring within the WAM block 123. When these matches occur, the Match List Handle (retrieved from either the MATCH_LIST_HANDLE field of the NFB State Information Structure (Table 16 above) or the MATCH_LIST_HANDLE field of the WAM Match Information Structure (Table 27 above)) is used to index into the MLT 132.

The format of each entry in the MLT 132 is shown in Table 31 below. Each MLT 132 entry contains a pointer to its associated Transaction Configuration Table 131 entry as well as the subscription offset (SUB_OFFSET) that must be added to the TPT 130 address that is extracted from the ATL 116 (TPT_IDX field of Table 21 above).

TABLE 31

Match List Table 132 Entry Format

| MLT Field | Description |
|---|---|
| WORD_MATCH_PREFIX | Set if the subscription allows prefix word matches. If this is set to 0, then a word match that was the result of a prefix would be ignored. |

TABLE 31-continued

Match List Table 132 Entry Format

| MLT Field | Description |
| --- | --- |
| WORD_MATCH_EXACT_LEVEL | Indicates if this is for a text match and if that match has to be at the same level as the state that initiated the text search. This is required to differentiate between contains(text( ), "word") for a single element match and contains(.,"word") for a nested element match. This bit will be used in conjunction with the EXACT_LEVEL field within the partial match message from the WAM block (see Table 28 above). |
| BIT_INDEX | Indicates which bit should be set in the progress bitmap |
| NFA_LEVEL | Indicates the level of the NFA for the transaction for this partial match. If this field is set to 0 it means that there is no transaction, indicating a FULL_MATCH. |
| SUB_OFFSET | An offset from the Transaction Progress Index (found from the TPT_IDX field of the ATL 116 entry in Table 21 above) in the Transaction Progress Table 130. It is used to find the appropriate subscription within the TPT 130 sub-entries. |
| MATCH_ID_TCT_IDX | If this entry indicates a full match (NFA_LEVEL = 0), then this field contains the Match ID that must be returned to the host processor. Otherwise, this field contains the index into the TCT 131 table for this subscription. |

The Transaction Progress Table(TPT) 130 is responsible for maintaining information about the progress of partial matches for all the subscriptions within the system. Entries within this table 130 are allocated and freed as documents are processed. Each time the NFB block 119 of FIG. 5 enters a transaction state a message (see Table 23 above) will be sent to the RCB block 129 indicating that a transaction state has been entered. This message triggers the allocation of a TPT 130 entry by the TPT manager 127. The address to that TPT 130 entry is stored in the Active Transaction List 116 entry (see Table 21 above).

Entries within the TPT 130 are of variable size, since each entry contains a list of all the subscriptions that exist at that transaction. The RCB 129 determines the required size of the TPT 130 entry using the NUM_SUBSCRIPTIONS field from the Transaction Start Table 128 (see Table 29 above).

The format of each sub-entry in the Transaction Progress Table (TPT) 130 is shown in Table 32 below.

TABLE 32

Transaction Progress Table 130 Sub-Entry Format

| TPT Field | Description |
| --- | --- |
| CURR_BITMAP | Indicates the bits that have been set so far towards this subscription's transaction being completed. |
| TRANSACTION_NUM | This entry allows the logic to determine if the current entry has been initialized or not. If the TRANSACTION_NUM matches the logic's version of it (from the TRANSACTION_NUM field of the ATL entry of Table 21 above), then the entry is deemed to be initialized. Otherwise, the entry is known to be uninitialized and the CURR_BITMAP must be considered to have a value of zero before proceeding. The transaction number is incremented for every transaction state that is entered as previously described. |

The format of each entry in the TPT Level Recovery Stack (TPLRS) 133 is shown in Table 33 below.

TABLE 33

TPT Level Recovery Stack (TPLRS) 133 Entry Format

| TPLRS Field | Description |
| --- | --- |
| CONTIG_ALLOCATION | This is set when a level is allocated contiguously with its parent. |
| FREE_TIMESTAMP | Contains the time when this level's TPT entry that immediately followed its parent level's TPT entry was freed. |
| TPT_IDX | Pointer to the location immediately after this document level's TPT entry. |

Figure 19:
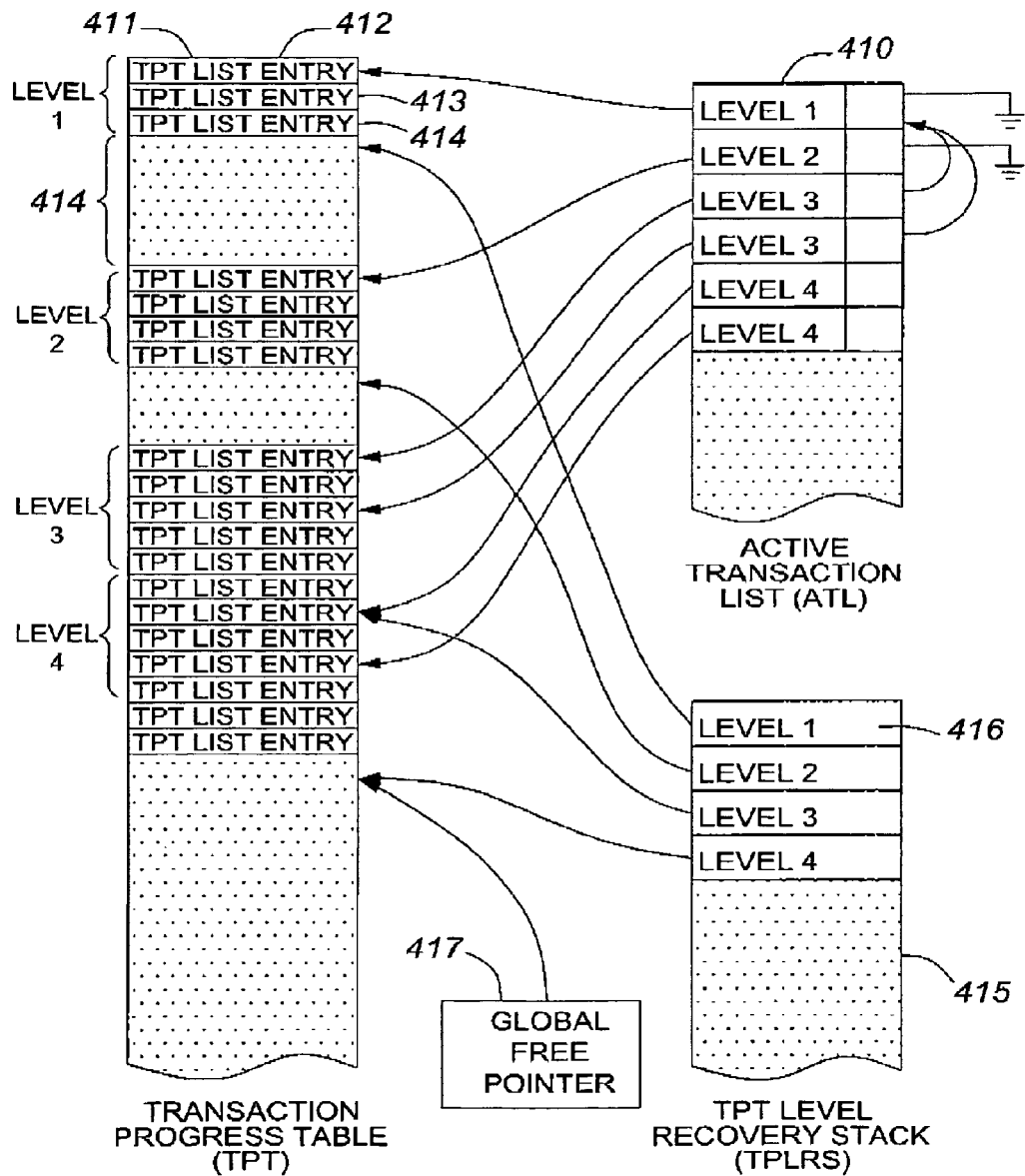
FIG. 19 shows the Transaction Progress Table (TPT) and TPT Level Recovery Stack.

FIG. 19 shows the relationship between the Active Transaction List (ATL) 116, the TPT Level Recovery Stack (TPLRS) 133, and the Transaction Progress Table (TPT) 130. Each ATL entry, such as 410, points to a unique entry in the TPT 418, such as entry 411. Each TPT entry is a contiguous block of TPT sub-entries, such as sub-entry 412, 413 and 414 for TPT entry 411. Note that TPT entry 411 is for document level 1 in the example. A range of unused entries, such as entries 414 between those currently allocated for document level 1 and document level 2, will only be re-used when the distance between level 1 and level 2 exceeds the rollback threshold, as explained later. The TPLRS 415 points to a location immediately after a document level. If a document level has no TPT entries (which occurs when a document level resulted in no transaction states being entered), then the TPLRS entry for the level points to the same entry as the previous document level. For example, the TPLRS entry 416 for document level 1 points to the next TPT entry after TPT entry 411 allocated for document level 1. The global free pointer 417 points to a location within the TPT that is available for allocation.

The algorithm for determining when the global free pointer 417 can be moved back is now described. The TPLRS 415 contains a pointer (TPT_IDX field of Table 33 above) to the location immediately after the last TPT 418 entry for every document level. In addition to the pointer, each level keeps a timestamp (FREE_TIMESTAMP field of Table 33 above) that represents the time when an entry for that level that immediately followed its parent level in the TPT 418 memory was freed. To help the logic know if an entry being freed is immediately following its parent, the TPLRS 415 contains an additional bit (CONTIG_ALLOCATION field of Table 33 above) that indicates if the parent and current level are contiguous within the TPT 418. When a level is freed, it consults this bit. If it is set, then the current timestamp is saved in the TPLRS FREE_TIMESTAMP field for the level being freed.

The allocation logic within the TPT 418 is as follows. When the RCB 129 receives a Start Element message (see Table 23 above), the RCB 129 logic will increment its current document level. After this, it will retrieve the pointer to the end of the document level immediately above the current document level from the TPLRS 415 memory. At the same time, it will retrieve the time that the last free occurred for this level. Note that the only time that the timestamp will not be valid is when the Global Free Pointer is equal to the location immediately following the previous level in the TPT 418. In this case, the distance will never be large enough to force the timestamp to be checked. The logic will compare the global free pointer with the pointer retrieved from the TPLRS 415. If the distance between these two pointers exceeds the threshold configured in the RCB_TPT_ROLLBACK_THRESH.DISTANCE register field (settable by the CPU 71 of FIG. 3), then the logic will check the timestamp read from the TPLRS 415 against the current time. If the difference in time exceeds the RCB_TPT_ROLLBACK_THRESH.TIME register field (settable by the CPU 71 of FIG. 3), the global free pointer is set back to the pointer from the TPLRS 415.

This allocation scheme is required so that pending matches that have not yet been applied at the time of de-allocation of the TPT 418 entry can still safely use the memory without worry of another transaction being allocated that same memory location. The logic will always check the TRANSACTION_NUM (see Table 32 above) that is stored in the memory to ensure that it is less than or equal to the current transaction number for a particular match event (as determined by the TRANSACTION_NUM field of the ATL, see Table 29 above). If it is greater than the current number, then it means that an error has occurred and that the document must be filtered in software. This will happen extremely rarely, if ever. Error recovery logic, described later, allows this rare situation to be handled gracefully.

As mentioned earlier, each TPT 130 entry is a list of sub-entries, with one sub-entry for each subscription that is involved with that particular transaction that the TPT 130 entry is associated with. Inside each sub-entry (see Table 32 above) there is a bitmap (CURR_BITMAP) that keeps track of all the partial matches that have occurred for that subscription. The TCT 131 entry (see Table 30 above) for the same transaction contains the expected bitmap (REQ_BITMAP) that indicates when the transaction has fully satisfied.

Since each sub-entry contains a bitmap that may have been partially set, the logic must do something to initialize these bitmaps before using them in order to prevent set bits from previous documents (or from re-allocated TPT 130 memory within the current document) being interpreted as real partial results. To solve this, each TPT 130 sub-entry (see Table 32 above) contains a TRANSACTION_NUM field. The RCB 129 logic maintains a counter of the number of transactions that have been encountered. This number is stored in the Active Transaction List 116 entry (see Table 21 above) along with the TPT 130 pointer. When the TPT 130 is accessed, the TRANSACTION_NUM field in the sub-entry within the TPT 130 entry is checked against the TRANSACTION_NUM from the ATL 116. If they are not the same, then the sub-entry is considered to be un-initialized and the bitmap is set to zero (internally in the bitmap update logic) before updating it and writing it back to memory. If the transaction numbers are the same, then the sub-entry is valid for this transaction and the bitmap is modified as necessary. When writing the sub-entry back to memory, the current transaction number from the ATL 116 is placed in the TRANSACTION_NUM field. In this manner, a large number of entries in the TPT 130 can be allocated when a new transaction state is entered, without any TPT 130 memory needing to be initialized. When a TPT 130 entry is read, it is automatically determined if it has been initialized yet or not for the current transaction state and subscription. If not, it is automatically initialized as part of updating the entry. Note also that only entries that are needed by the processing of the current documents are eventually initialized when they are written to for the first time. Many entries may be allocated, but never subsequently accessed, and thus they will never be initialized.

The manner in which the RCB block 129 processes the key event messages of Table 23 above (from the NFB block 119) and Table 28 above (from the WAM block 123) is now described.

A New Transaction message (from the NFB block 119) will cause the RCB 129 to read an entry from the Transaction Start Table (TST) 128. This entry will tell the RCB 129 how many TPT 130 entries must be allocated as well as the NFA_LEVEL of that transaction within the NFA tree. The RCB 129 will allocate these entries by storing the current free pointer for the TPT 130 in the ATL 116 and then moving the TPT 130 free pointer ahead by the number of entries required. In addition to the TPT 130 pointer, the ATL 116 also holds a pointer its parent transaction (indicated by the PREV_TRANS_ID field of Table 23) within the ATL 116 and the NFA_LEVEL for the new transaction which was read from the TST 128. The ATL 116 entry to be used is indicated by the TRANS_ID field of Table 23, as previously explained.

A Start Element Event Message (from the NFB block 119) causes the RCB 129 to write the current free TPT 130 pointer to the TPT Level Recovery Stack 133. This allows the TPT 130 entries to be freed when an End Element Event Message is received from the NFB block 119.

An End Element Event Message (from the NFB block) causes the RCB 129 to remove all TPT 130 entries that existed at the current document level. Since the NFB 119 is responsible for allocating ATL 116 entries (via the Transaction ID as explained earlier), nothing needs to be done to the ATL 116. TPT 130 Entries are removed as previously explained above.

A Structural Match Message (from the NFB block 119) causes the RCB 129 to iterate through the Match List (stored in the Match List Table 132) pointed by the Match List Handle contained in the message. Each match list entry (see Table 31 above) indicates either a full match or a partial match. Full matches will cause a match message to be sent to the RSP block 138 with the MATCH_ID from the match entry in the match list. Partial matches will trigger a read from the TCT 131 (using the TCT_IDX from the Match List entry) and a read from the TPT 130. It is necessary to access the ATL 116 to get the address of the appropriate TPT 130 entry. Finding the ATL 116 requires indexing into the ATL 116 using the Transaction ID from the Structural Match message and then following the linked list inside the ATL 116 until the NFA_LEVEL in the ATL 116 matches the NFA_LEVEL within the Match List entry.

A Word or Attribute Match Message (from the WAM block) causes the RCB 129 to iterate through the Match List pointed by the Match List Handle contained in the message. The processing is identical to the Structural Match message above, with the exception that the RCB 129, when examining each entry in the Match List, must validate the conditions WORD_PREFIX and EXACT_LEVEL sent with the Word or Attribute Match message (see Table 28 above), against the required conditions WORD_MATCH_PREFIX an WORD_MATCH_EXACT_LEVEL specified in the Match List Entry (see Table 31 above). For example, if the Match Message indicates a word that is a prefix (as opposed to a complete word), but the Match List Entry indicates that it is only for exact words, then the Match List Entry is skipped. For example, one subscription may be looking for the exact word "foo", while another subscription may be looking for the word "foo*", i.e. a prefix of "foo". The same match handle is used for "foo", regardless if it is an exact word or a prefix. However, the WORD_PREFIX flag of the match message indicates whether it was a prefix or an exact word.

The events 134 dispatched from the RCB block 129 of FIG. 5 to the Result Set Processing Block 138 are shown in Table 34 below.

TABLE 34

Main Output Signals 134 of RCB Block 129 to RSP Block 138

| Signal Name | Description |
|---|---|
| MSG_TYPE | Message Type. This field indicates what type of data is being carried in this message.<br>1: End Document<br>This message is sent at the start of each document. This allows the RCB to do any cleanup required at the end of a document. It also allows the RCB to send a document complete message to the Results Set block in FPGA1.<br>4: Match Message<br>This message is sent for each complete match that has been found.<br>7: Abort Document<br>This message is sent each time the WAM block receives either an end document event where the WAM in a bad state or when the WAM block received an Abort Document event itself. |
| MATCH_ID | Match ID. Taken from the MATCH_ID_TCT_IDX of Table 31 above when a full match has been determined. |
| DOC_ID | Document ID. This is the host processor assigned document ID that is carried with the document through all processing. |
| ERROR_CODE | Error Code. This field contains information about the first error that has occurred before this point in the processing of the document. |

Note that a MATCH_ID, used to indicate a full match that has been found (see Table 34 above), is not the same as a subscription number indicating an XPE, although a unique MATCH_ID could be allocated for each XPE. This flexibility allows for situations such as the following. Referring back to FIG. 1, if subscriber 21 has requested multiple XPEs, indicating different subscriptions of interest, then when a publisher such as 11 publishes a document 61A to content router 2, the content router 2 only wishes to determine whether the document 61A should be sent to subscriber 21 or not. Thus, all the XPEs can be populated into the hardware matching data structures as previously described, but all XPEs from subscriber 21 can be given the same match ID. Thus, even if multiple of the XPEs from subscriber 21 match against document 61A, the match will only be reported once for subscriber 21. This saves the software running on CPU 71 from having to do this determination, and it reduces the number of match events that eventually reach CPU 71 for a document being processed. In another example, some of the XPEs from subscriber 21 may be all treated the same and share a single MATCH_ID, while other XPEs from the same subscriber 21 may require different processing by CPU 71 of FIG. 3 when a match occurs. Such XPEs can be given their own MATCH_ID as needed. Note also that a MATCH_ID does not only have to be used for subscribers. For example, XPEs can be added for publishers in order to match priority rules in order to implement quality of service in content-routed networks, as per the co-filed patent application Ser. No. 60/588,797. Such XPEs can be given MATCH_IDs, either individually or in groups, in order to receive optimum processing by CPU 71. As yet another example, content router 2 of FIG. 1 receives XPEs from other content routers in the network, such as content router 3, as explained in the co-filed patent application Ser. No. 11/012,113. XPEs which require common processing by CPU 71 can be given the same MATCH_ID. For example, all XPEs from a given remote content router in the network, such as content router 3 of FIG. 1, can be given the same MATCH_ID on content router 2. In this way, a given document will be reported as a match against all the XPEs of a given remote content router at most once, just like for subscriber 21 as explained above. The XPEs from a different remote content router, such as content router 4, can be given a different MATCH_ID. This allows the document 61A to be routed in the optimum manner to each remote content router that requires a copy of the document.

Note that the RCB block 129 of FIG. 5 may issue multiple Match messages for the same MATCH_ID to the Result Set Processing Block 138. The Result Set Processing (RSP) block 138 will filter out duplicate MATCH_IDs so that the result set reported back to CPU 71 has a unique set of MATCH_IDs for a given document.

The Result Set Processing (RSP) block 138 is responsible for ensuring that a unique set of MATCH_IDs is produced for a given XML document being processed. The use of the MATCH_ID was explained above. Due to the highly scalable architecture, the MATCH_ID numbering space can be very large, e.g. 21 bits, allowing a very large number of subscriptions to be supported. The RSP block 138 uses a Result Set Table (RST) 135 managed by the Result Set Manager 139. The RST 135 is indexed by the MATCH_ID of a match event (see Table 34 above). The RST 135 uses a document sequence number, which is very wide (e.g. 44 bits). The document sequence number is stored in a register within the RSP block 138, and this number starts at 1 and increments once per document end event (or document abort event), and thus is incremented once per document. This number is made wide enough that it will never wrap within any reasonable amount of time that the hardware is expected to run without a reset, i.e. many years.

The RST 135 stored in external memory is managed by the Result Set Manager 139 as an array of document sequence numbers, indexed by MATCH_ID. When the RSP block 138 receives a Match event message (refer to Table 34 above), the MATCH_ID value is used to index into the RST 135 by the Result Set Manager 139. The table's entry contains sequence numbers and this information is used in the following manner. The table's document sequence number for a given MATCH_ID is compared against the sequence number for the current document (stored in register). If they do not match, then the MATCH_ID has been seen for the first time for the current document, and the current document sequence number is written back by the Result Set Manager 139 at the record indexed by MATCH_ID. The MATCH_ID is then written into a match FIFO in the Master Register Access (MRA) Block 102. If a given MATCH_ID is received in a Match event for a second time for the same current document, then the document sequence number obtained by the Result Set Manager 139 for the MATCH_ID will now match the current document sequence number. As a result, no action is taken, i.e. nothing is registered back to the Result Set Manager 139, and nothing is written to the match FIFO in the MRA block 102. In this way, a MATCH_ID will be reported at most once for each document processed.

The final step in the process is that the CPU 71 reads the match results back from the acceleration hardware, by reading registers in MRA block 102 via PCI subsystem 101. A PCI interrupt is generated to tell the CPU 71 that there is something to read, and then the CPU reads all entries in the results FIFO and then clears the interrupt when there is nothing more to read. This is a technique known in the art. Note that along with each MATCH_ID reported back to the CPU 71, the document ID, which the host CPU first gave to the DRB block 103, is reported along with each match. This allows the host CPU 71 to know which document each MATCH_ID is matched against. Note that this allows multiple documents to be present in the processing pipeline, with no gap needed between documents.

An ERROR_CODE is carried throughout the processing pipeline, and is returned back to the controlling CPU 71 for each document, along with the document ID for the documents. The ERROR_CODE is an 8-bit number, organized into groups. The group that an error code lies in tells the controlling host CPU 71 what action it must take, if any, to recover. The error code groups are shown in Table 35 below. The ERROR_CODE grouping allows the host CPU 71 to intelligently deal with the error and recover, and explained in Table 35 below.

All references mentioned above are herein incorporated by reference.

We claim:

1. A method of matching subscriptions to published documents in a content-router, comprising:
   receiving subscription information;
   receiving published documents;
   storing said subscription information and said published documents in memory;
   instructing a subscription matching accelerator of the locations in memory of said published documents;
   transferring portions of said stored published documents from said memory to said accelerator on an as-needed basis;
   providing said subscription information to said accelerator; and
   processing said portions in said accelerator to perform subscription matching in said subscription matching accelerator independently of other functions performed within the content-router, and
   wherein said accelerator performs said subscription matching for multi-level documents using a non-finite automaton containing normal and self-loop states,
   wherein said normal and self-loop states are written to an execution stack,
   wherein memory slots within said execution stack are associated with respective pointers,

TABLE 35

ERROR_CODE Groups

| Group Type | Range | Description |
|---|---|---|
| No error | 0-0 hex | Indicates no error with the document. The software can process all MATCH_ID generated against the document. |
| Well-Formedness Check or Firewall Violation | 1-3F hex | The document is not well formed, has a malformed or invalid character, has an XML syntax error, or has a firewall violation. An example of a well formedness problem is when the start tag name does not equal the end tag name. An example of a malformed character is a US-ASCII character with the top bit set. An example of a firewall violation is the length of a name (e.g. tag name or attribute name) exceeding a configurable maximum name length. When such an error occurs, the CPU 71 of FIG. 3 discards all MATCH_ID results for the document (if any), and rejects the document. A suitable HTTP error code is returned back to the source of the document. |
| Hardware Limit Reached | 40-7F hex | The processed document is valid, but a hardware limit has been reached. For example, the hardware has a limit on the number of namespaces supported, the number of entity replacements supported, etc.<br>When such an error occurs, the CPU 71 of FIG. 3 discards all MATCH_ID results for the document (if any), and then re-processes the documents through a software slow path running on the CPU. This software slow path utilizes similar logic to the hardware path, but allows much large limits on items such as number of namespaces supported.<br>Note that the hardware limits are set to handle any reasonable XML document, and the need to process a document in the software slow path should be very rare, if ever, due to a hardware limit. However, this mechanism allows for slow path functionality if it is needed. |
| Hardware Soft Error | 80-BF hex | A soft error on the one of the chips 91, 92 memory structure has been detected.<br>When such an error occurs, the CPU 71 of FIG. 3 can re-issue the document to the hardware to have it re-processed. |
| Error in Data Structure Programmed by CPU | C0-FF hex | This range of errors is similar to the Hardware Soft Error category, but is reserved for errors in data structures, tables, etc. that are programmed by the host CPU 71 of FIG. 3.<br>When such an error occurs, the CPU 71 of FIG. 3 discards all MATCH_ID results for the document (if any). Then, the error must be corrected by the host CPU re-programming the entry of the memory address at which the error was detected. Then, the host CPU can re-send the document that failed to the hardware to be processed again. |

It will be appreciated by persons skilled in the art that many variants of the invention are possible.

wherein said normal and self-loop states are organized as distinct groups within said execution stack, wherein each time a new start element event is received the current free pointer for both the normal and self-loop states is written to an execution stack recovery stack which maintains the normal and self-loop free pointers for each document level, wherein when end elements are received the head of the execution recovery stack is read and the free pointers normal and self-loop free pointers are reinitialized to the read values.

2. A method as claimed in claim 1, wherein portions of said stored document are transferred to said accelerator using a direct memory access operation.

3. A method as claimed in claim 1, wherein said published document is parsed by the accelerator by first convening it to a character stream employing a common coding scheme applying a unique code to each character regardless of origin.

4. A method as claimed in claim 3, wherein each character is classified into categories by means of a look-up table.

5. A method as claimed in claim 4, wherein the look-up table comprises a plurality of columns, each of which categorizes each character into one of a limited number of categories.

6. A method as claimed in claim 5, wherein said documents are XML documents and said columns are associated with different XML versions.

7. A method as claimed in claim 6, further comprising a column identifying the nature of the character into one of a limited number of categories.

8. A method as claimed in claim 7, employing case folding, and wherein a folded character is identified by a base character with an offset to map the corresponding case folded character.

9. A method as claimed in claim 5, wherein a limited group of special characters are parsed using an ASCII look-up table with a limited number of bits.

10. A method as claimed in claim 3, further comprising associating with said code a subcode indicating whether the code falls within a predetermined range of characters.

11. A method as claimed in claim 1, wherein the published document is parsed using a finite state machine and the number of states is reduced by storing information about a sequence being searched for in internal memory associated with said accelerator processor 12. A method as claimed in claim 11, wherein allowable patterns are matched in parallel using multiple memories.

13. A method as claimed in claim 12, wherein said multiple memories are pre-loaded with selected entity names.

14. A method as claimed in claim 13, wherein each said multiple memory is associated with a sub-state machine for validating entity names.

15. A method as claimed in claim 14, wherein said sub-state machines operate in parallel using a common address register to match received entity names.

16. A method as claimed in claim 1, wherein subscription matching is performed by looking up words in a lookup table by computing a hash value of an element to be looked up, and looking up said hash value in an element hash table.

17. A method as claimed in claim 16, wherein a match for an element in said element hash table results in a unique handle number which is passed downstream for further processing.

18. A method as claimed in claim 17, wherein subscription matching is performed with the aid of an optimized numerical comparison tree.

19. A method as claimed in claim 18, wherein at least two trees are employed, and said trees are re-balanced when the degree of unbalance exceeds a predefined rebalance threshold.

20. A method as claimed in claim 19, wherein re-balancing is necessary a new tree is constructed in background memory, and when it is ready to be used in hardware, the appropriate value of the new tree is written to the element hash table.

21. A method as claimed in claim 1, which uses a memory allocation algorithm that employs a combination of distance and time to efficiently manage memory allocation.

22. A method as claimed in claim 1, wherein a document is processed in software when a hardware limit has been reached.

23. A method as claimed in claim 1, wherein an error code grouping is used to tell software how to react to the failure of a document to be processed by the hardware.

24. A method as claimed in claim 1, wherein the document is an XML document and a common identifier is used to represent a single matching Xpath Expression or a group of related matching XPath Expressions.

25. A method as claimed in claim 1, which uses a word match stack to handle word searches at a current document level only.

26. A method of matching subscriptions to published documents in a content-routed network as claimed in claim 1, wherein said processing is carried out in a pipeline.

27. A method of matching subscriptions to published documents in a content-router, comprising:
    receiving subscription information;
    receiving published documents;
    storing said subscription information and said published documents in memory;
    instructing a subscription matching accelerator of the locations in memory of said published documents;
    transferring portions of said stored published documents from said memory to said accelerator on an as-needed basis;
    providing said subscription information to said accelerator; and
    processing said portions in said accelerator to perform subscription matching in said subscription matching accelerator independently of other functions performed within the content-router using a non-finite automaton, and
    wherein said non-finite automaton combines a self-loop state and predecessor state into a single data structure, caches a handle when there is only one outgoing arc, indicates whether a collision occurs for any outgoing arcs to reduce memory bandwidth, flags whether a destination state needs to be added to execution stack, splits an execution stack into normal states and self-loop states, and uses a level recovery stack to free allocated memory in the execution stack.

28. An apparatus for matching subscriptions to published documents in a content-routed network, comprising:
    a processor;
    a memory for storing subscription information and a published documents under the control of said processor;
    a subscription matching accelerator for performing subscription matching;
    said processor being configured to transfer portions of said stored published document from said memory to said accelerator on an as-needed basis; and
    wherein subscription matching is performed in said subscription matching accelerator independently of said processor, and wherein said accelerator is configured to perform said subscription matching for multi-level documents using a non-finite automaton containing normal and self-loop states, an execution stack for storing said normal and self-loop states, memory slots within said execution stack being associated with respective pointers, and said normal and self-loot, states being organized as distinct groups within said execution stack, a logic unit for writing the current free pointer for both the normal and self-loop states is written to an execution stack recovery stack which maintains the normal and self-loop free pointers for each document level each time a new start element event is received, the logic unit being configured to read the head of the execution recovery stack when end elements are received and the reinitialize the free pointers normal and self-loop free pointers the read values.

29. An apparatus as claimed in claim 28, wherein said accelerator is configured to receive portions of said stored document using a direct memory access operation.

30. An apparatus as claimed in claim 28, wherein said accelerator includes a parser which converts the published document to a character stream employing a common coding scheme applying a unique code to each character regardless origin.

31. An apparatus as claimed in claim 30, further comprising an element lookup unit for performing word lookup, said lookup table comprising a hash table that returns a unique element handle number in the event of a successful lookup.

32. An apparatus as claimed in claim 28, wherein said pipeline includes a document processing block that inputs said portions of said documents using direct memory access, passes them on as needed, and arranges for the next portion of said documents to be fetched from memory.

33. An apparatus as claimed in claim 28, wherein said pipeline includes a parsing block that takes, as an input, a stream of bytes representing a published document in its native format, and re-encodes the character stream into a unicode encoding scheme, after which it parses the document to ensure that the document is well-formed, and attribute values are normalized.

34. An apparatus as claimed in claim 28, wherein said pipeline includes a tag processing block to identity elements or attributes and replace them by a corresponding event.

35. An apparatus as claimed in claim 34, wherein said pipeline further comprises a word processing block receiving the output of said tag processing block, said word processing block identifying words in said documents and their corresponding event.

36. An apparatus as claimed in claim 28, wherein said pipeline includes an attribute value processing block for identifying attribute value matches for attribute name-value pairs as well as identifying attribute value range matches for numerical comparisons.

37. An apparatus as claimed in claim 28, wherein said pipeline includes said non-finite automaton, which receives document events and performs a non-finite automaton state machine function in order to determine if these events match the structural portion of subscriptions.

38. An apparatus as claimed in claim 28, wherein said pipeline includes a word attribute matching block, which is responsible for determining if a received word or attribute event is required by any of the currently active states in the non-finite automaton block, and wherein when an attribute or word event is received, the word attribute matching block iterates through its list of active states to determine if the event was relevant.

39. An apparatus as claimed in claim 38, wherein said pipeline further includes a results collection block, which results collection block is responsible for receiving match handles from the non-finite automaton and word attribute matching block and converting those handles into lists of subscriptions that have partial and full matches.

40. An apparatus as claimed in claim 39, wherein said pipeline further includes a result set processing block which receives match from identifiers from the results collection block and dispatches them to said processor.

\* \* \* \* \*